US012804659B2

(12) United States Patent
Abdelghaffar et al.

(10) Patent No.: US 12,804,659 B2
(45) Date of Patent: Nov. 17, 2026

(54) DUPLEX SPECIFIC PUCCH TRANSMISSION AND CONFIGURATION

(71) Applicant: QUALCOMM Incorporated, San Diego, CA (US)

(72) Inventors: Muhammad Sayed Khairy Abdelghaffar, San Jose, CA (US); Gokul Sridharan, Sunnyvale, CA (US); Yi Huang, San Diego, CA (US); Abdelrahman Mohamed Ahmed Mohamed Ibrahim, San Diego, CA (US); Ahmed Attia Abotabl, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 310 days.

(21) Appl. No.: 18/403,578

(22) Filed: Jan. 3, 2024

(65) Prior Publication Data

US 2024/0284460 A1 Aug. 22, 2024

Related U.S. Application Data

(60) Provisional application No. 63/485,857, filed on Feb. 17, 2023.

(51) Int. Cl.

| | |
|---|---|
| ***H04W 72/21*** | (2023.01) |
| ***H04L 5/14*** | (2006.01) |
| ***H04W 72/232*** | (2023.01) |
| ***H04W 76/20*** | (2018.01) |

(52) U.S. Cl.

CPC ............... *H04W 72/21* (2023.01); *H04L 5/14* (2013.01); *H04W 72/232* (2023.01); *H04W 76/20* (2018.02)

(58) Field of Classification Search

CPC ... H04L 5/0005; H04L 5/0044; H04L 5/0051; H04L 5/0053; H04L 5/0094; H04L 5/14; H04L 5/1469; H04W 24/08; H04W 52/146; H04W 72/21; H04W 72/232; H04W 72/1263; H04W 76/20; H04W 8/24

See application file for complete search history.

(56) References Cited

U.S. PATENT DOCUMENTS

2022/0109534 A1* 4/2022 Elshafie ................ H04L 5/0005
2022/0369247 A1* 11/2022 Jiang ................... H04W 52/146
2023/0155746 A1* 5/2023 Ouchi ................. H04W 72/232
370/329
2024/0107525 A1* 3/2024 Khan Beigi .......... H04L 5/1469
2024/0107541 A1* 3/2024 Mahama ............... H04L 5/0051
2024/0323961 A1* 9/2024 Liu ....................... H04L 5/0044
2024/0389104 A1* 11/2024 Gou ...................... H04L 5/0053
2025/0105993 A1* 3/2025 Li ..................... H04W 72/1263
2025/0226852 A1* 7/2025 Lu ......................... H04L 5/0094

(Continued)

*Primary Examiner* — Michael Thier
*Assistant Examiner* — Prince A Mensah
(74) *Attorney, Agent, or Firm* — LOZA & LOZA, LLP

(57) ABSTRACT

Aspects relate to mechanisms for duplex-specific physical uplink control channel (PUCCH) configuration and transmission. A UE may receive a first configuration of PUCCH for sub-band full duplex (SBFD) symbols including downlink or flexible symbols with a configured uplink sub-band. In addition, the UE may receive a second configuration of PUCCH for non-SBFD symbols including uplink symbols or flexible symbols configured for uplink communication.

29 Claims, 25 Drawing Sheets

(56) References Cited

U.S. PATENT DOCUMENTS

| | | | | |
|---|---|---|---|---|
| 2025/0240784 | A1 * | 7/2025 | Shariatmadari ... | H04W 72/1263 |
| 2025/0287376 | A1 * | 9/2025 | Choi ....................... | H04W 8/24 |
| 2025/0330849 | A1 * | 10/2025 | Deogun ................ | H04W 24/08 |

* cited by examiner

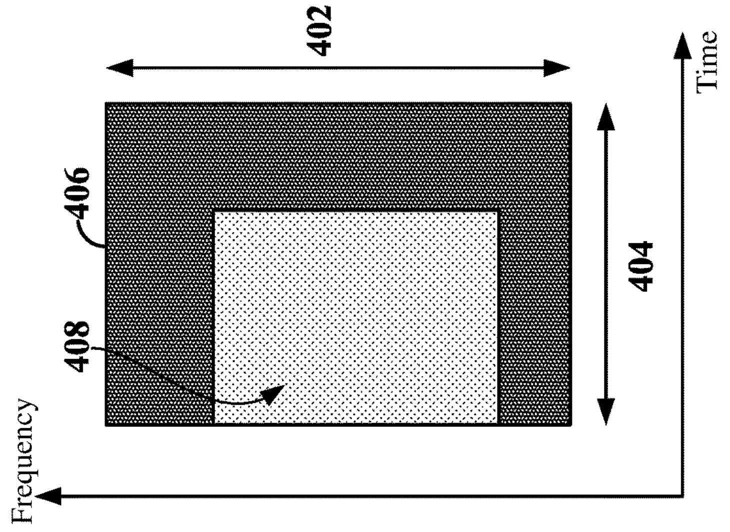
FIG. 4A
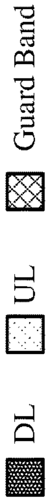
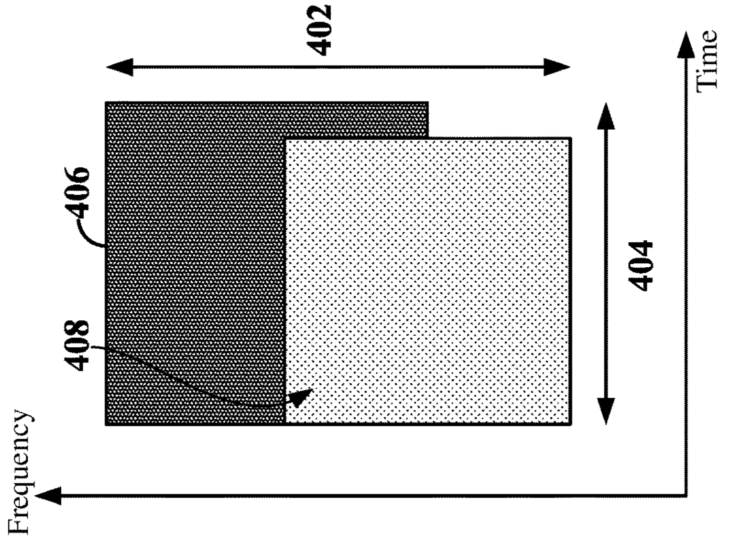
FIG. 4B
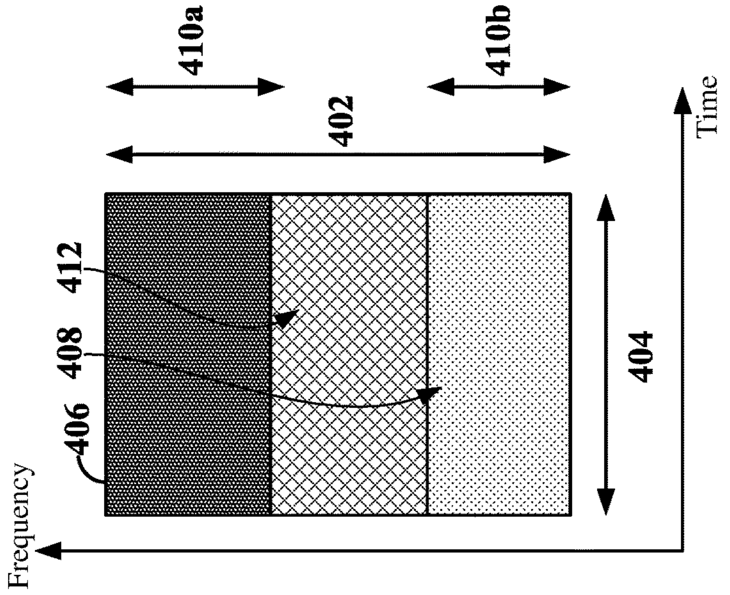
FIG. 4C

1100

| Ref. | DCI format 1_0 | |
|---|---|---|
| 1102 / 1104 | Field | Bits |
| 1106 | Frequency Domain Resource Assignment | Variable |
| 1108 | Time Domain Resource Assignment | X |
| 1110 | VRB-to-PRB mapping | 1 |
| 1112 | Modulation and Coding Scheme | 5 |
| 1114 | New Data Indicator | 1 |
| 1116 | Redundancy Version | 2 |
| 1118 | HARQ Process Number | 4 |
| 1120 | Downlink Assignment Index | 2 |
| 1122 | TPC Command for Scheduled PUCCH | 2 |
| 1124 | PUCCH Resource Indicator | 3 or 4 |
| 1126 | PDSCH-to-HARQ_feedback timing indicator | 3 |
| 1128 | Target Slot | Y |

FIG. 11

TDW 1812 · 1812a · Reset TDW 1814 · Reset TDW 1814a · Reset TDW 1814b

| 1802 | | 1802a | 1802b | 1802c | | 1802d | | 1802e | 1802f | 1802g | 1802h | 1802i | 1802j | 1802k | 1802l |
|---|---|---|---|---|---|---|---|---|---|---|---|---|---|---|---|
| Slot | | 1 | 2 | 3 | 4 | 5 | 6 | 7 | 8 | 9 | 10 | 11 | 12 | 13 | 14 |
| TDD Pattern 1804 | D | SBFD | SBFD | SBFD | U | D | SBFD | SBFD | SBFD | U | D | SBFD | SBFD | SBFD | U |
| Available Slot Index 1806 | | 0 | 1 | 2 | 3 | | 4 | 5 | 6 | 7 | | 8 | 9 | 10 | 11 |
| Relative Slot Index 1808 | | 0 | 1 | 2 | 3 | 4 | 5 | 6 | 7 | 8 | 9 | 10 | 11 | 12 | 13 |
| Frequency Hopping Pattern 1810 | | h1 | h1 | h1 | h2 | h2 | h2 | h1 | h1 | h1 | h2 | h2 | h2 | h1 | h1 |

2002

2002a 2002b 2002c 2002d 2002e 2002f 2002g 2002h 2002i 2002j 2002k 2002l

| | | | | | | | | | | | | | | | |
|---|---|---|---|---|---|---|---|---|---|---|---|---|---|---|---|
| TDD Pattern **2004** | D | SBFD | SBFD | SBFD | U | D | SBFD | SBFD | SBFD | U | D | SBFD | SBFD | SBFD | U |
| Available Slot Index **2006** | | 0 | 1 | 2 | | | 3 | 4 | 5 | | | 6 | 7 | 8 | |

FIG. 20A

2002

2002a 2002b 2002c 2002d 2002e 2002f 2002g 2002h 2002i 2002j 2002k 2002l

| | | | | | | | | | | | | | | | |
|---|---|---|---|---|---|---|---|---|---|---|---|---|---|---|---|
| TDD Pattern **2004** | D | SBFD | SBFD | SBFD | U | D | SBFD | SBFD | SBFD | U | D | SBFD | SBFD | SBFD | U |
| Available Slot Index **2006** | | 0 | 1 | 2 | | | 3 | 4 | 5 | | | 6 | 7 | 8 | |
| Relative Slot Index **2008** | | 0 | 1 | 2 | | | 3 | 4 | 5 | | | 6 | 7 | 8 | |
| Frequency Hopping Pattern **2010** | | h1 | h2 | h1 | | | h2 | h1 | h2 | | | h1 | h2 | h1 | |

FIG. 20B

DUPLEX SPECIFIC PUCCH TRANSMISSION AND CONFIGURATION

CROSS-REFERENCE TO RELATED APPLICATIONS

The present Application for Patent claims priority to and the benefit of U.S. Provisional Application No. 63/485,857, filed Feb. 17, 2023, and assigned to the assignee hereof and hereby expressly incorporated by reference herein as if fully set forth below in its entirety and for all applicable purposes.

TECHNICAL FIELD

The technology discussed below relates generally to wireless communication systems, and more particularly, to duplex-specific physical uplink control channel (PUCCH) configuration and transmission.

INTRODUCTION

Wireless communication systems, such as those specified under fifth generation (5G) systems, which may be referred to as New Radio (NR) systems, and sixth generation (6G) systems, may support a variety of use cases, including, for example, mobile broadband, metaverse, massive Internet of Things (IoT), sidelink, massive spectrum aggregation/duplex, and UE cooperation. In addition, these systems may support emerging technologies, such as full-duplex, radio frequency (RF) sensing, positioning, and physical (PHY) layer security.

These systems may employ one or more duplexing techniques to enable communication between various wireless communication devices. For example, a wireless communications system may include one or more network entities, each supporting wireless communication for one or more user equipment (UE). In various configurations, a network entity may communicate with a user equipment (UE) in a half-duplex mode, in which only one node may transmit at a time (e.g., each time resource may be allocated for either a DL transmission or an UL transmission), or a full-duplex mode, in which one or both nodes may simultaneous transmit and receive (e.g., each time resource may be allocated for both a DL transmission and an UL transmission).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, an apparatus for wireless communication at a user equipment (UE) is provided. The apparatus includes a memory and a processor coupled to the memory. The processor is configured to receive, from a network entity, a first configuration of physical uplink control channel (PUCCH) for sub-band full duplex (SBFD) symbols. The SBFD symbols include downlink (DL) or flexible (FL) symbols with a configured uplink (UL) sub-band. The processor is further configured to receive, from the network entity, a second configuration of PUCCH for non-SBFD symbols. The non-SBFD symbols including UL symbols or flexible symbols configured for UL communication.

Another example provides a method operable at a user equipment (UE). The method includes receiving, from a network entity, a first configuration of physical uplink control channel (PUCCH) for sub-band full duplex (SBFD) symbols. The SBFD symbols include downlink (DL) or flexible (FL) symbols with a configured uplink (UL) sub-band. The method further includes receiving, from the network entity, a second configuration of PUCCH for non-SBFD symbols. The non-SBFD symbols including UL symbols or flexible symbols configured for UL communication.

Another example provides a UE including means for receiving, from a network entity, a first configuration of physical uplink control channel (PUCCH) for sub-band full duplex (SBFD) symbols. The SBFD symbols include downlink (DL) or flexible (FL) symbols with a configured uplink (UL) sub-band. The UE further includes means for receiving, from the network entity, a second configuration of PUCCH for non-SBFD symbols. The non-SBFD symbols including UL symbols or flexible symbols configured for UL communication.

Another example provides a non-transitory computer-readable medium having stored therein instructions executable by one or more processors of a UE to cause the UE to receive, from a network entity, a first configuration of physical uplink control channel (PUCCH) for sub-band full duplex (SBFD) symbols. The SBFD symbols include downlink (DL) or flexible (FL) symbols with a configured uplink (UL) sub-band. The non-transitory computer-readable medium further includes instructions executable by the one or more processors of the UE to cause the UE to receive, from the network entity, a second configuration of PUCCH for non-SBFD symbols. The non-SBFD symbols including UL symbols or flexible symbols configured for UL communication.

Another example provides an apparatus for wireless communication at a network entity. The apparatus includes a memory and a processor coupled to the memory. The processor is configured to provide a first configuration of physical uplink control channel (PUCCH) for sub-band full duplex (SBFD) symbols for a user equipment (UE). The SBFD symbols including downlink (DL) or flexible (FL) symbols with a configured uplink (UL) sub-band. The processor is further configured to provide a second configuration of PUCCH for non-SBFD symbols for a UE. The non-SBFD symbols including UL symbols or flexible symbols configured for UL communication.

Another example provides a method operable at a network entity. The method includes providing a first configuration of physical uplink control channel (PUCCH) for sub-band full duplex (SBFD) symbols for a user equipment (UE). The SBFD symbols including downlink (DL) or flexible (FL) symbols with a configured uplink (UL) sub-band. The method further includes providing a second configuration of PUCCH for non-SBFD symbols for a UE. The non-SBFD symbols including UL symbols or flexible symbols configured for UL communication.

Another example provides a network entity including means for providing a first configuration of physical uplink control channel (PUCCH) for sub-band full duplex (SBFD) symbols for a user equipment (UE). The SBFD symbols including downlink (DL) or flexible (FL) symbols with a configured uplink (UL) sub-band. The network entity further includes means for providing a second configuration of PUCCH for non-SBFD symbols for a UE. The non-SBFD symbols including UL symbols or flexible symbols configured for UL communication.

Another example provides a non-transitory computer-readable medium having stored therein instructions executable by one or more processors of a network entity to cause the network entity to provide a first configuration of physical uplink control channel (PUCCH) for sub-band full duplex (SBFD) symbols for a user equipment (UE). The SBFD symbols including downlink (DL) or flexible (FL) symbols with a configured uplink (UL) sub-band. The non-transitory computer-readable medium further includes instructions executable by the one or more processors of the network entity to cause the network entity to provide a second configuration of PUCCH for non-SBFD symbols for a UE. The non-SBFD symbols including UL symbols or flexible symbols configured for UL communication.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIGS. 4A-4C illustrate examples of full-duplex communication in unpaired spectrum according to some aspects.

FIG. 11 is a diagram illustrating an example of downlink control information (DCI) indicating a non-SBFD or SBFD PUCCH resource according to some aspects.

FIGS. 20A and 20B are diagrams illustrating examples of UE behavior for duplex-specific PUCCH repetition according to some aspects.

DETAILED DESCRIPTION

Figure 1:
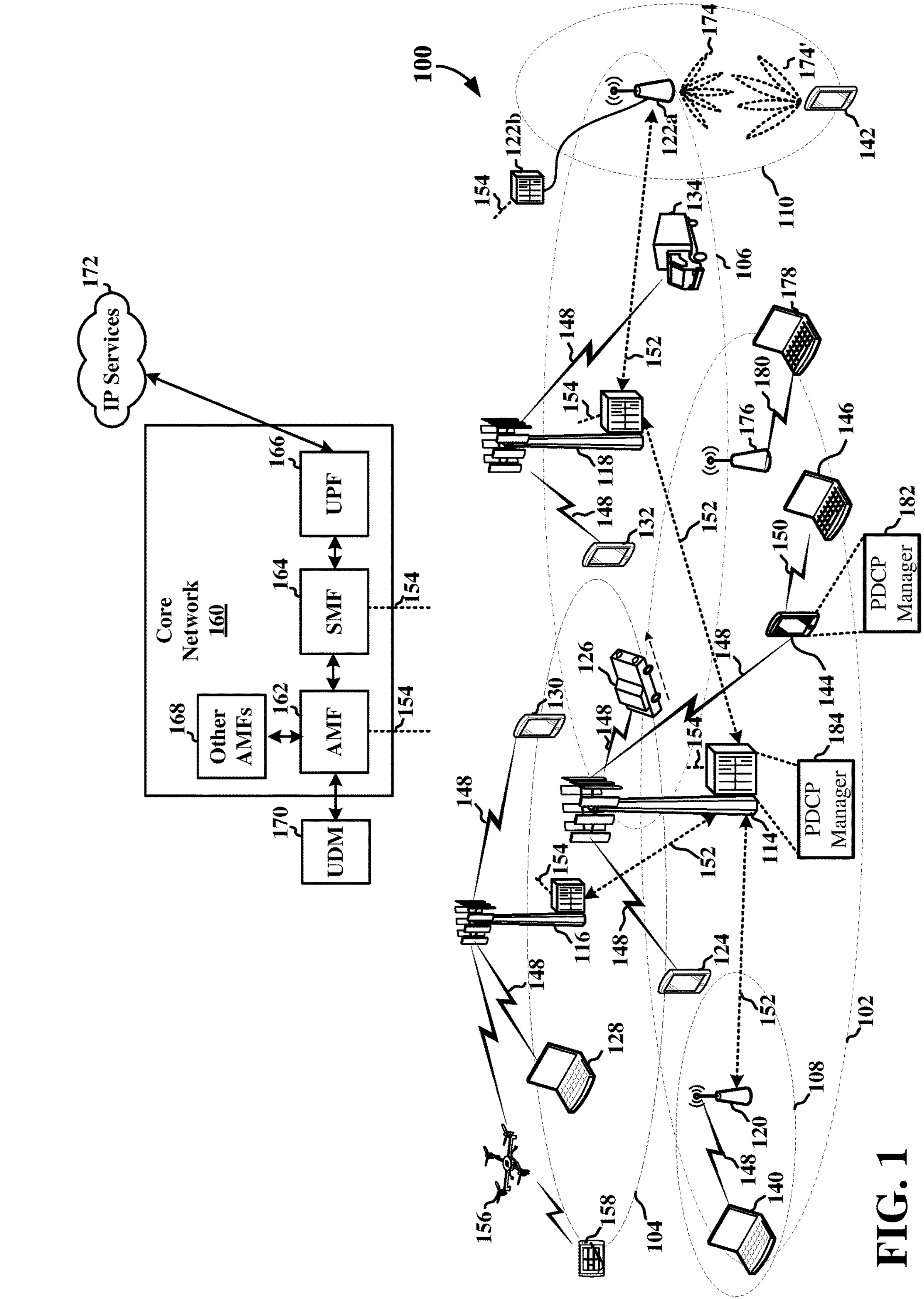
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., network entity and/or UE), end-user devices, etc., of varying sizes, shapes, and constitution.

In wireless communication systems, sub-band full-duplex (SBFD) communication may be implemented within unpaired spectrum where transmissions in different directions occur within different sub-bands of the carrier bandwidth. For example, a downlink slot or symbol may be configured with an uplink sub-band to allow for full-duplex communication within that slot or symbol. In addition, a UE may be configured to transmit a physical uplink control channel (PUCCH) to a network entity in accordance with a semi-static configuration of PUCCH resources provided by the network entity. Each PUCCH resource may indicate time-frequency resources within which a PUCCH transmission carrying uplink control information (UCI) may be transmitted. For example, each PUCCH resource may include a set of M frequency tones and a set of N symbols for a PUCCH transmission. However, in time division duplex (TDD) slot configurations that include both half-duplex and SBFD slots, a half-duplex PUCCH resource may be outside the configured uplink sub-band for SBFD. As a result, PUCCH transmissions may be missed if scheduled within SBFD symbols.

Various aspects are related to duplex-specific PUCCH configuration and transmission. For example, separate configurations of PUCCH for both SBFD and non-SBFD (e.g., half-duplex) may be supported. In some examples, separate radio resource control (RRC) PUCCH configurations may be established for SBFD and non-SBFD. In other examples, separate PUCCH resource sets within an RRC PUCCH configuration may be established for SBFD and non-SBFD. In other examples, separate PUCCH resources within a PUCCH resource set may be established for SBFD and non-SBFD. In addition, UE behaviors for periodic or semi-persistent PUCCH, PUCCH with repetition, and PUCCH with repetition and frequency hopping for SBFD and non-SBFD may further be supported.

The various concepts presented throughout this disclosure may be implemented across a broad variety of telecommunication systems, network architectures, and communication standards. Referring now to FIG. 1, as an illustrative example without limitation, a schematic illustration of a wireless communication network including a radio access network (RAN) 100 and a core network 160 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In other examples, the RAN 100 may operate according to a hybrid of 5G NR and 6G, may operate according to 6G, or may operate according to other future radio access technology (RAT). Of course, many other examples may be utilized within the scope of the present disclosure.

The geographic region covered by the RAN 100 may be divided into a number of cellular regions (cells) that can be uniquely identified by a user equipment (UE) based on an identification broadcasted over a geographical area from one access point or network entity. FIG. 1 illustrates cells 102, 104, 106, 108, and 110 each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective network entity serves each cell. Broadly, a network entity is responsible for radio transmission and reception in one or more cells to or from a UE. A network entity may also be referred to by those skilled in the art as a base station (e.g., an aggregated base station or disaggregated base station), base transceiver station (BTS), a radio base station, a radio transceiver, a transceiver function, a basic service set (BSS), an extended service set (ESS), an access point (AP), a Node B (NB), an evolved NB (eNB), a 5G NB (gNB), a transmission receive point (TRP), or some other suitable terminology. In some examples, a network entity may include two or more TRPs that may be collocated or non-collocated. Each TRP may communicate on the same or different carrier frequency within the same or different frequency band. In examples where the RAN 100 operates according to both the LTE and 5G NR standards, one of the network entities may be an LTE network entity, while another network entity may be a 5G NR network entity.

In some examples, the RAN 100 may employ an open RAN (O-RAN) to provide a standardization of radio interfaces to procure interoperability between component radio equipment. For example, in an O-RAN, the RAN may be disaggregated into a centralized unit (CU), a distributed unit (DU), and a radio unit (RU). The RU is configured to transmit and/or receive (RF) signals to and/or from one or more UEs. The RU may be located at, near, or integrated with, an antenna. The DU and the CU provide computational functions and may facilitate the transmission of digitized radio signals within the RAN 100. In some examples, the DU may be physically located at or near the RU. In some examples, the CU may be located near the core network 160.

The DU provides downlink and uplink baseband processing, a supply system synchronization clock, signal processing, and an interface with the CU. The RU provides downlink baseband signal conversion to an RF signal, and uplink RF signal conversion to a baseband signal. The O-RAN may include an open fronthaul (FH) interface between the DU and the RU. Aspects of the disclosure may be applicable to an aggregated RAN and/or to a disaggregated RAN (e.g., an O-RAN).

Various network entity arrangements can be utilized. For example, in FIG. 1, network entities 114, 116, and 118 are shown in cells 102, 104, and 106; and another network entity 122 is shown controlling a remote radio head (RRH) 122 in cell 110. That is, a network entity can have an integrated antenna or can be connected to an antenna or RRH by feeder cables. In the illustrated example, the cells 102, 104, 106, and 110 may be referred to as macrocells, as the network entities 114, 116, 118, and 122 support cells having a large size. Further, a network entity 120 is shown in the cell 108 which may overlap with one or more macrocells. In this example, the cell 108 may be referred to as a small cell (e.g., a microcell, picocell, femtocell, home base station, home Node B, home eNode B, etc.), as the network entity 120 supports a cell having a relatively small size. Cell sizing can be done according to system design as well as component constraints.

It is to be understood that the RAN 100 may include any number of network entities and cells. Further, a relay node may be deployed to extend the size or coverage area of a given cell. In some examples, a cell may not necessarily be stationary, and the geographic area of the cell may move according to the location of a mobile network entity.

FIG. 1 further includes an unmanned aerial vehicle (UAV) 156, which may be a drone or quadcopter. The UAV 156 may be configured to function as a network entity, or more specifically as a mobile network entity. That is, in some examples, a cell may not necessarily be stationary, and the geographic area of the cell may move according to the location of a mobile network entity such as the UAV 156.

In addition to other functions, the network entities 114, 116, 118, 120, and 122*a*/122*b* may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The network entities 114, 116, 118, 120, and 122*a*/122*b* may communicate directly or indirectly (e.g., through the core network 170) with each other over backhaul links 152 (e.g., X2 interface). The backhaul links 152 may be wired or wireless.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 124, 126, and 144 may be in communication with network entity 114; UEs 128 and 130 may be in communication with network entity 116; UEs 132 and 138 may be in communication with network entity 118; UE 140 may be in communication with network entity 120; UE 142 may be in communication with network entity 122*a* via RRH 122*b*; and UE 158 may be in communication with mobile network entity 156. Here, each network entity 114, 116, 118, 120, 122*a*/122*b*, and 156 may be configured to provide an access point to the core network 170 (not shown) for all the UEs in the respective cells. In another example, a mobile network node (e.g., UAV 156) may be configured to function as a UE. For example, the UAV 156 may operate within cell 104 by communicating with network entity 116. UEs may be located anywhere within a serving cell. UEs that are located closer to a center of a cell (e.g., UE 132) may be referred to as cell center UEs, whereas UEs that are located closer to an edge of a cell (e.g., UE 134) may be referred to as cell edge UEs. Cell center UEs may have a higher signal quality (e.g., a higher reference signal received power (RSRP) or signal-to interference-plus-noise ratio (SINR)) than cell edge UEs.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call facilitated by a network entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE May undertake a handoff or handover from the serving cell to the neighboring (target) cell. For example, UE 126 may move from the geographic area corresponding to its serving cell 102 to the geographic area corresponding to a neighbor cell 106. When the signal strength or quality from the neighbor cell 106 exceeds that of its serving cell 102 for a given amount of time, the UE 126 may transmit a reporting message to its serving network entity 114 indicating this condition. In response, the UE 126 may receive a handover command, and the UE may undergo a handover to the cell 106.

Wireless communication between a RAN 100 and a UE (e.g., UE 124, 126, or 144) may be described as utilizing communication links 148 over an air interface. Transmissions over the communication links 148 between the network entities and the UEs may include uplink (UL) (also referred to as reverse link) transmissions from a UE to a network entity and/or downlink (DL) (also referred to as forward link) transmissions from a network entity to a UE. For example, DL transmissions may include unicast or broadcast transmissions of control information and/or data (e.g., user data traffic or other type of traffic) from a network entity (e.g., network entity 114) to one or more UEs (e.g., UEs 124, 126, and 144), while UL transmissions may include transmissions of control information and/or traffic information originating at a UE (e.g., UE 124). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The communication links 148 may use multiple-input and multiple-output (MIMO) antenna technology, including spatial multiplexing, beamforming, and/or transmit diversity. For example, as shown in FIG. 1, network entity 122*a*/122*b* may transmit a beamformed signal to the UE 142 via one or more beams 174 in one or more transmit directions. The UE 142 may further receive the beamformed signal from the network entity 122*a*/122*b* via one or more beams 174' in one or more receive directions. The UE 142 may also transmit a beamformed signal to the network entity 122*a*/122*b* via the one or more beams 174' in one or more transmit directions. The network entity 122*a*/122*b* may further receive the beamformed signal from the UE 142 via the one or more beams 174 in one or more receive directions. The network entity 122*a*/122*b* and the UE 142 may perform beam training to determine the best transmit and receive beams 174/174' for communication between the network entity 122*a*/122*b* and the UE 142. The transmit and receive beams for the network entity 122*a*/122*b* may or may not be the same. The transmit and receive directions for the UE 142 may or may not be the same.

The communication links 148 may utilize one or more carriers. The network entities and UEs may use spectrum up to Y MHZ (e.g., 5, 10, 15, 20, 100, 400, etc. MHZ) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The communication links 148 in the RAN 100 may further utilize one or more multiplexing and multiple access algorithms to enable simultaneous communication of the various devices. For example, 5G NR specifications provide multiple access for UL or reverse link transmissions from UEs 124, 126, and 144 to network entity 114, and for multiplexing DL or forward link transmissions from the network entity 114 to UEs 124, 126, and 144 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the network entity 114 to UEs 124, 126, and 144 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the communication links 148 in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the communication links 148 in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FRI (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples, access to the air interface may be scheduled, wherein a scheduling entity (e.g., a network entity 114) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 124), which may be scheduled entities, may utilize resources allocated by the scheduling entity 114.

Network entities are not the only entities that may function as scheduling entities. That is, in some examples, a UE may function as a scheduling entity, scheduling resources for one or more scheduled entities (e.g., one or more other UEs). For example, two or more UEs (e.g., UEs 144 and 146) may communicate with each other using peer to peer (P2P) or sidelink signals via a sidelink 150 therebetween without relaying that communication through a network entity (e.g., network entity 114). In some examples, the UEs 144 and 146 may each function as a scheduling entity or transmitting sidelink device and/or a scheduled entity or a receiving sidelink device to communicate sidelink signals therebetween without relying on scheduling or control information from a network entity (e.g., network entity 114). In other examples, the network entity 114 may allocate resources to the UEs 144 and 146 for sidelink communication. For example, the UEs 144 and 146 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from the network entity 114 via D2D links (e.g., sidelink 150). For example, one or more UEs (e.g., UE 144) within the coverage area of the network entity 114 may operate as a relaying UE to extend the coverage of the network entity 114, improve the transmission reliability to one or more UEs (e.g., UE 146), and/or to allow the network entity to recover from a failed UE link due to, for example, blockage or fading.

The wireless communications system may further include a Wi-Fi access point (AP) 176 in communication with Wi-Fi stations (STAs) 178 via communication links 180 in a 5 GHz unlicensed frequency spectrum. When communicating in an unlicensed frequency spectrum, the STAs 170/AP 176 may perform a clear channel assessment (CCA) prior to communicating in order to determine whether the channel is available.

The network entities 114, 116, 118, 120, and 122*a*/122*b* provide wireless access points to the core network 160 for any number of UEs or other mobile apparatuses via core network backhaul links 154. The core network backhaul links 154 may provide a connection between the network entities 114, 116, 118, 120, and 122*a*/122*b* and the core network 170. In some examples, the core network backhaul links 154 may include backhaul links 152 that provide interconnection between the respective network entities. The core network may be part of the wireless communication system and may be independent of the radio access technology used in the RAN 100. Various types of backhaul interfaces may be employed, such as a direct physical connection (wired or wireless), a virtual network, or the like using any suitable transport network.

The core network 160 may include an Access and Mobility Management Function (AMF) 162, other AMFs 168, a Session Management Function (SMF) 164, and a User Plane Function (UPF) 166. The AMF 162 may be in communication with a Unified Data Management (UDM) 170. The AMF 162 is the control node that processes the signaling between the UEs and the core network 160. Generally, the AMF 162 provides QoS flow and session management. All user Internet protocol (IP) packets are transferred through the UPF 166. The UPF 166 provides UE IP address allocation as well as other functions. The UPF 166 is configured to couple to IP Services 172. The IP Services 172 may include the Internet, an intranet, an IP Multimedia Subsystem (IMS), a PS Streaming Service, and/or other IP services.

NR 5G wireless communication systems may support one or more frequency ranges, including FR1, FR2 or a legacy LTE frequency range. For example, the LTE frequency range may include the E-UTRA frequency bands between 350 MHz and 3.8 GHz. In some examples, each cell may support a single frequency range (e.g., FR1, FR2 or legacy LTE) and may further support one or more frequency bands (e.g., carrier frequencies) within a particular frequency range. In addition, one or more cells may operate as anchor cells enabling dual connectivity with neighbor cell(s) supporting a different frequency range. In some examples, one or more cells may be NR dual connectivity (NR DC) cells that support dual connectivity between FR1 and FR2 (e.g., FR1+FR2 DC). For example, a NR DC anchor cell may be configured for communication with UEs in the cell over FR1, and may further support dual connectivity by the UEs to enable simultaneous communication over FR1 with the NR DC anchor cell and over FR2 with one or more neighbor NR cells. In other examples, one or more cells may be Evolved-Universal Terrestrial Radio Access New Radio dual connectivity (EN-DC) that support dual connectivity between an LTE frequency band and either FR1 or FR2, as described in more detail below in connection with FIG. 5. For example, an LTE anchor cell may be configured for communication with UEs in the cell over an LTE frequency band, and may further support dual connectivity by the UEs to enable simultaneous communication over the LTE frequency band with the LTE anchor cell and over either FR1 or FR2 with one or more neighbor NR cells.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
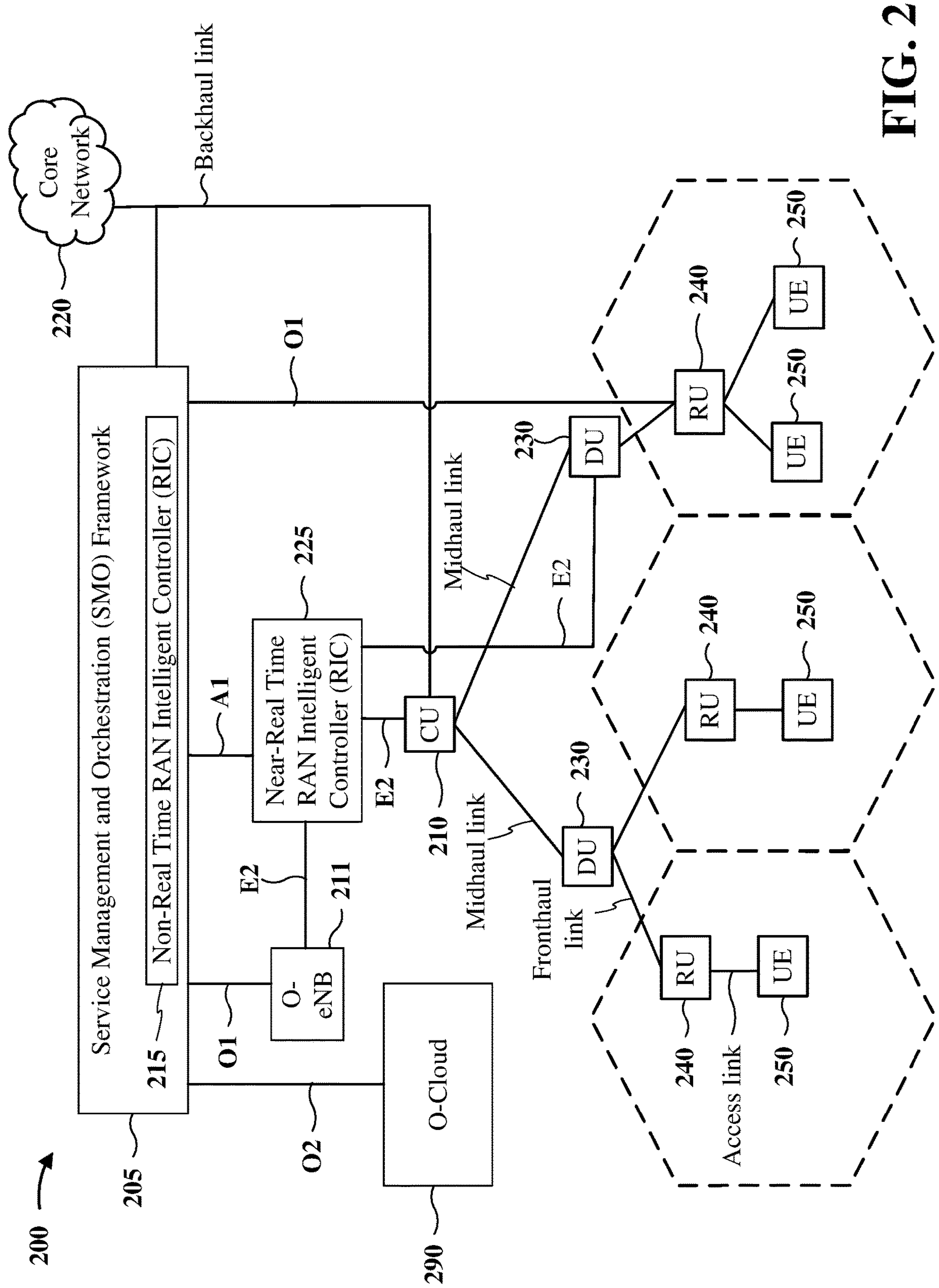
FIG. 2 is a diagram providing a high-level illustration of one example of a configuration of a disaggregated base station according to some aspects.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 250 via one or more radio frequency (RF) access links. In some implementations, the UE 250 may be simultaneously served by multiple RUs 240.

Each of the units, i.e., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 250. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 5G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
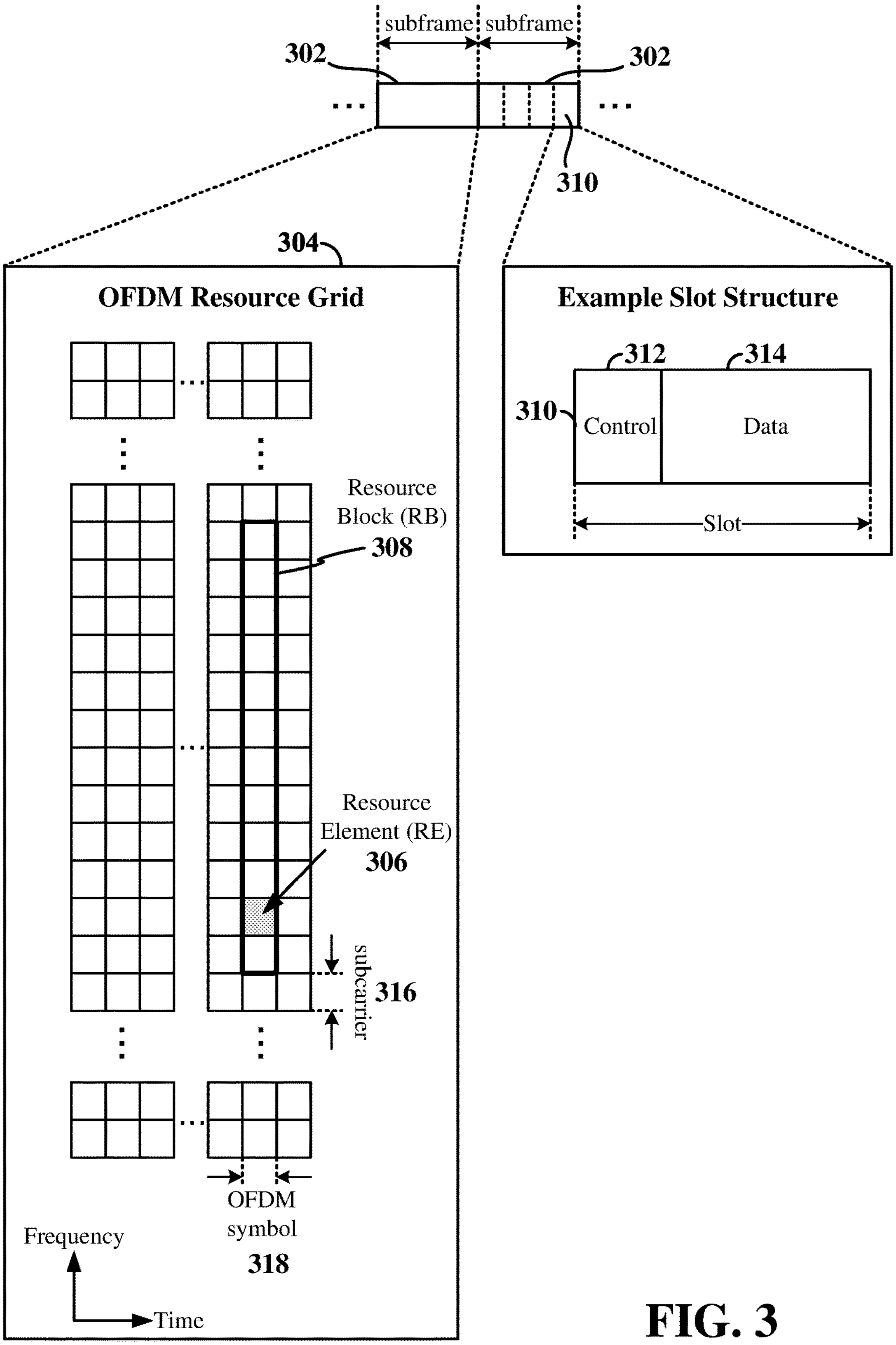
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a network entity, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a network entity) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgement (ACK) or negative acknowledgement (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A network entity may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSc) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

A transport block may be communicated between a network entity (e.g., an aggregated base station, an RU, a DU, a CU, an integrated access backhaul (IAB) node or other network device) and a scheduled entity (e.g., a UE or IAB node) over downlink resources or uplink resources allocated in a slot for the transport block. When operating in a full-duplex mode, both downlink and uplink resources may be allocated within symbols of the same slot for the transmission of both a downlink transport block and an uplink transport block, respectively. In some examples, the downlink and uplink resources may overlap in time (e.g., one or more symbols of the slot may carry both the downlink transport block and the uplink transport block). For example, simultaneous transmissions in different directions (uplink and downlink) may utilize frequency division duplex (FDD) in paired spectrum (e.g., the transmissions in different directions are carried on different carrier frequencies) or in unpaired spectrum (e.g., the transmissions in different directions are carried on a single carrier bandwidth).

FIGS. 4A-4C illustrate examples of full-duplex communication in unpaired spectrum. In the examples shown in FIGS. 4A-4C, time is in the horizontal direction and frequency is in the vertical direction. Here, a carrier bandwidth 402 (or set of one or more active bandwidth parts (BWPs)) is illustrated along the frequency axis and a slot 404 is illustrated along the time axis.

FIGS. 4A and 4B illustrate in-band full-duplex (IBFD) communication, while FIG. 4C illustrates sub-band FD communication. For IBFD communication, as shown in FIGS. 4A and 4B, downlink and uplink transmissions occur on the same time and frequency resources. For example, downlink resources 406 allocated for transmissions in the downlink direction overlap in both time and frequency with uplink resources 408 allocated for transmissions in the uplink direction. The overlap may be full (as shown in FIG. 4A) or partial (as shown in FIG. 4B).

For sub-band FD communication, as shown in FIG. 4C, the carrier bandwidth 402 (or active BWP) may be divided into sub-bands 410*a* and 410*b*. Each sub-band 410*a* and 410*b* may be allocated for communication in a single direction. For example, sub-band 410*a* may be allocated for downlink transmissions, while sub-band 410*b* may be allocated for uplink transmissions. Thus, downlink resources 406 allocated for transmissions in the downlink direction overlap in time, but not in frequency, with uplink resources 408 allocated for transmissions in the uplink direction. The downlink resources 406 may further be separated from the uplink resources 408 in the frequency domain by a guard band 412 to isolate the uplink and downlink transmissions in frequency.

Figure 5A:
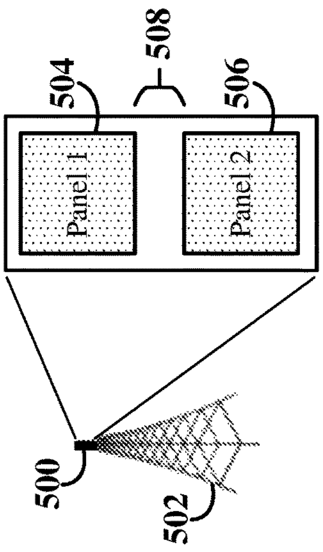
FIG. 5A is a schematic diagram of a network entity including an antenna array configured for full-duplex communication according to some aspects.

FIG. 5A is a schematic diagram of a network entity 502 (e.g., an aggregated base station, an RU, a DU, a CU, an IAB node or other network device) including an antenna array 500 configured for full-duplex communication according to some aspects. The antenna array 500 is divided into two panels (panel 1 504, panel 2 506) with a physical separation 508 therebetween. Each of the two panels may be a subarray of antennas. A given panel may transmit and/or receive a beam or a beam group. In one example, the panels may be physically separated from one another by a distance selected to provide improved isolation between simultaneous transmission (Tx) and reception (Rx) operations in full-duplex mode, thereby mitigating at least a portion of self-interference resulting from signals being simultaneously transmitted/received. The multi-panel antenna configuration shown in FIG. 5A may also be applicable to UEs to enable full-duplex communication at the UE.

Figure 5B:
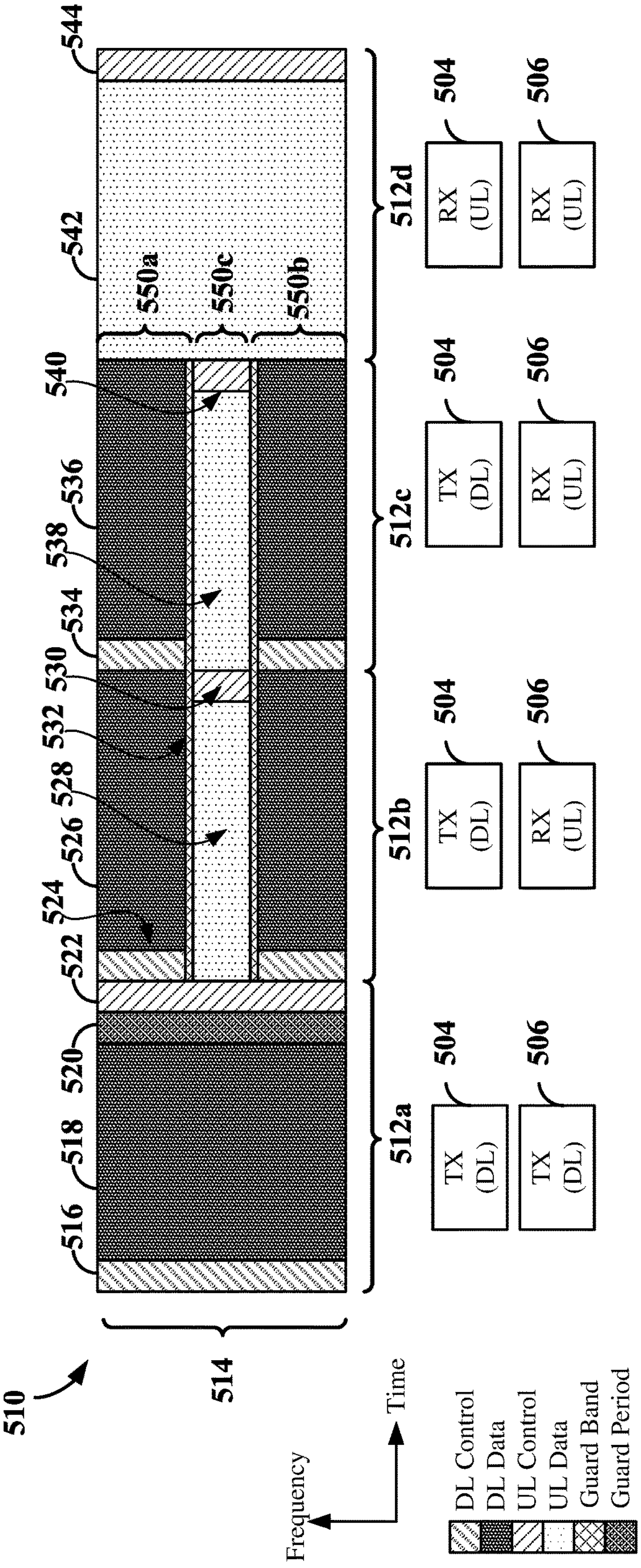
FIG. 5B is a schematic illustration of an example of full-duplex wireless communication using the multi-panel antenna array shown in FIG. 5A according to some aspects.

FIG. 5B is schematic illustration of an example of sub-band full-duplex wireless communication 510 using the multi-panel antenna array 500 shown in FIG. 5A according to some aspects. In the example shown in FIG. 5B, time is in the horizontal direction with units of slots 512*a*-512*d*, each including a plurality of OFDM symbols; and frequency is in the vertical direction. Here, a carrier bandwidth 514 (or set of one or more active BWPs) is illustrated along the frequency axis. The carrier bandwidth 514 (or active BWPs)

may be divided into a number of sub-bands 550*a*-550*c* for sub-band FD full-duplex operation.

In the example shown in FIG. 5B, in slot 512*a*, the antenna array 500 is first configured for downlink (DL) communication (e.g., DL burst 516 and DL data portion 518). The DL burst 516 may include DL control transmitted within the first few symbols of the slot 512*a*. The DL control 516 may include, for example, a physical downlink control channel (PDCCH) carrying DCI that may be related to the slot 512*a* or a previous or subsequent slot. In an example, the DCI may include common DCI or UE-specific DCI. The common DCI may include, for example, common control information broadcast to a group of UEs or all UEs in the cell. The UE-specific DCI may include, for example, HARQ feedback information (e.g., ACK/NACK), scheduling information for scheduling a downlink data transmission and/or uplink transmission in the slot 512*a* or a subsequent slot (e.g., slot 512*b*, 512*c*, and/or 512*d*), and other suitable information. The DL burst 516 may further include various DL reference signals (e.g., SSB and/or CSI-RS). In this example, both panel 1 504 and panel 2 506 may be configured for DL transmission. The DL data portion 518 may include DL data carried within, for example, a PDSCH. In addition to the DL data, the DL data portion 518 may further include DL reference signals (e.g., DMRS) for use in demodulating and decoding the DL data.

Slot 512*a* may also include a common uplink (UL) burst 522 at the end of slot 512*a*. The common UL burst 522 may include, for example, a PUCCH carrying UCI. As illustrated in FIG. 5B, the end of the DL data portion 518 may be separated in time from the beginning of the UL burst 522. This time separation 520 may sometimes be referred to as a gap, a guard period, a guard interval, and/or various other suitable terms. This separation may provide time for the base station and UE to perform a switch-over between transmitting and receiving, or vice-versa. In this example, both panel 1 504 and panel 2 506 may be configured for UL transmission during the UL burst 522.

In slots 512*b* and 512*c*, the antenna array 500 is configured for both DL communication and UL communication. For example, in slots 512*b* and 512*c*, the carrier bandwidth 514 (or active BWP) is shown partitioned between uplink transmissions and downlink transmissions. Sub-bands 550*a* and 550*b* are allocated for downlink transmissions, while sub-band 550*c* is allocated for uplink transmissions. In an example operation of the sub-band full-duplex configuration shown in FIGS. 5A and 5B, panel 1 504 may be configured for DL transmission at both edges (e.g., sub-bands 550*a* and 550*b*) of the carrier bandwidth 514 (or active BWPs) and panel 2 506 may be configured for UL reception in the middle (e.g., sub-band 550*c*) of the carrier bandwidth 514 (or active BWPs).

In each of the sub-band FD slots 512*b* and 512*c*, the DL sub-bands 550*a* and 550*b* include a DL burst 524 and 534, respectively, which may include a PDCCH carrying DCI and/or DL reference signals, in the initial portion of the slots 512*b* and 512*c*. Following the DL bursts 524 and 534, slots 512*b* and 512*c* each include a DL data portion 526 and 536, respectively, for transmitting DL data within sub-bands 550*a* and 550*b*. For example, the DL data may be transmitted within a PDSCH. In addition to the DL data, the DL data portions 526 and 536 may further include DL reference signals (e.g., DMRS) for use in demodulating and decoding the DL data.

In the uplink (UL) sub-band 550*c*, the slots 512*b* and 512*c* each include an UL data portion 528 and 538, respectively, for transmitting UL data. For example, the UL data may be transmitted within a PUSCH. Following the UL data portions 528 and 538, the UL sub-band 550*c* of slots 512*b* and 512*c* each include an UL burst 530 and 540, respectively. The UL burst 530 and 540 may include, for example, a PUCCH including UCI. Guard bands 532 are further provided between the UL sub-band 550*c* and the DL sub-bands 550*a* and 550*b* to mitigate self-interference between simultaneous DL transmissions in the DL sub-bands 550*a* and 550*b* and UL transmissions in the UL sub-band 550*c*.

Slots 512*b* and 512*c* are sub-band full-duplex FDD slots utilizing FDM for multiplexing uplink and downlink transmissions in frequency. The sub-band full-duplex slot configurations shown in FIG. 5 are merely exemplary, and other configurations of sub-band full-duplex slots may be utilized in various aspects of the disclosure. For example, sub-band full-duplex slots including other configurations of UL and DL sub-bands (e.g., the configuration shown in FIG. 4C or other suitable sub-band configurations) may be employed in various aspects.

In slot 512*d*, the antenna array 500 is configured for UL communication. For example, slot 512*d* includes an UL data portion 542 followed by an UL burst 544. The UL data portion 542 and UL burst 544 may include UL control information and/or UL data, as discussed above. In this example, both panel 1 504 and panel 2 506 may be configured for UL reception. Slots 512*a* and 512*d* are half-duplex TDD slots utilizing TDM for multiplexing DL transmissions and UL transmissions in time.

In 5G NR, downlink transmissions of, for example, the PDCCH and PDSCH, are transmitted using a CP-OFDM waveform. For uplink transmissions, there are two waveform options, either CP-OFDM or DFTs-OFDM (e.g., SC-FDM). For example, the PUCCH may be transmitted using a CP-OFDM waveform or a DFT-s-OFDM waveform based on the PUCCH format used. Each 5G NR PUCCH format may be pre-configured within, for example, 3GPP Technical Specification (TS) 36.211, Release 15, Release 16, or Release 17. Thus, each PUCCH format may be fixed based on the specification.

The resources (e.g., time-frequency resources, such as the number of PRBs, starting PRB, starting symbol, and number of symbols) to be used for the PUCCH, hereinafter referred to as PUCCH resources, may be predefined or dynamically configured. For example, the PUCCH resources may be dynamically configured via a radio resource control (RRC) message (e.g., PUCCH-Config).

Figure 6:
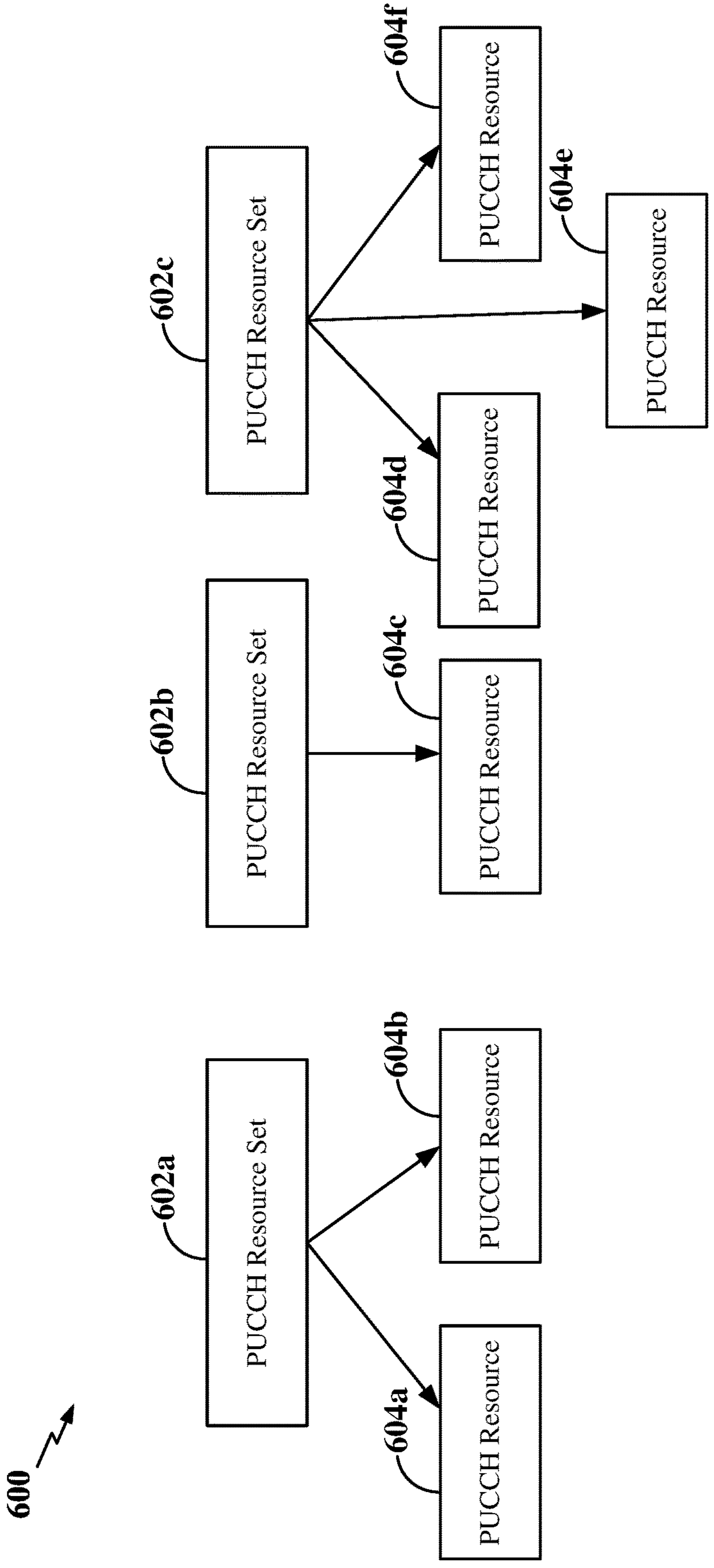
FIG. 6 is a diagram illustrating an exemplary configuration of physical uplink control channel (PUCCH) resources according to some aspects.

FIG. 6 is a diagram illustrating an exemplary configuration 600 of PUCCH resources according to some aspects. In some examples, the configuration 600 shown in FIG. 6 may be a radio resource control (RRC) configuration (e.g., PUCCH-config) transmitted from the network entity to the UE. The PUCCH configuration 600 includes one or more PUCCH resource sets 602*a*-602*c*, each including respective PUCCH resources 604*a*-604*f* according to some aspects. Each PUCCH resource set may include one or more PUCCH resources. For example, PUCCH resource set 602*a* includes PUCCH resources 604*a* and 604*b*, PUCCH resource set 602*b* includes PUCCH resource 604*c*, and PUCCH resource set 602*c* includes PUCCH resource sets 604*d*, 604*c*, and 604*f*.

As indicated in FIG. 6, multiple PUCCH resource sets 602*a*-602*c* may be configured for a UE. For example, a UE may be configured with up to four PUCCH resource sets for UCI transmissions including HARQ-ACK bits, where each PUCCH resource set may be used to transmit UCI within a range of payload sizes. Within each PUCCH resource set 602*a*-602*c*, a UE may be configured with up to sixteen PUCCH resources. Each PUCCH resource 604$a$-604$f$ is indicative of a set of time-frequency resources (e.g., REs). In addition, each PUCCH resource set 602$a$-602$c$ may be configured to be periodic, aperiodic, or semi-persistent, such that each of the PUCCH resources within the corresponding PUCCH resource set are periodic, aperiodic, or semi-persistent, respectively.

Each PUCCH resource 604$a$-604$f$ includes a set of PUCCH resource parameters configuring the PUCCH resource. For example, the PUCCH resource parameters may include a PUCCH format (e.g., PUCCH format 0-4). Each PUCCH format includes a respective length (in number of OFDM symbols), a respective number of UCI bits, and a respective waveform. For example, PUCCH formats 0 and 2 are short formats having a length of one to two OFDM symbols. In addition, PUCCH formats 1, 3, and 4 are long formats having a length between four and fourteen OFDM symbols. PUCCH format 3 does not have a multiplexing capability, while PUCCH format 4 does have a multiplexing capability (e.g., multiplexing with other UEs). Furthermore, PUCCH formats 0 and 1 have a small payload size of one or two bits (e.g., ≤2 UCI bits), whereas PUCCH formats 2, 3, and 4 have a larger payload size of more than two bits (e.g., >2 UCI bits). PUCCH formats 0 and 1 are further transmitted using a computer-generated sequence (CGS) waveform, PUCCH format 2 is transmitted using the CP-OFDM waveform, whereas PUCCH formats 3 and 4 are transmitted using the DFT-s-OFDM waveform. In addition, intra-slot frequency hopping may be enabled for all PUCCH formats, whereas inter-slot frequency hopping may be enabled only for PUCCH formats 1, 2, 3, and 4.

The PUCCH resource parameters may further include additional time domain parameters, such as the first symbol (e.g., startingsymbolIndex), a specific number of symbols (e.g., nrofSymbols) in accordance with the PUCCH format, and an indication of whether repetition is enabled (e.g., $$N_{PUCCH}^{repeat},$$

given by pucch-RepetitionNrofSlot or nrofSlots). In addition, the PUCCH resource parameters may further include frequency domain parameters, including, for example, a starting resource block (PRB) or PRB offset for the UCI, a number of PRBs, and a second hop PRB for frequency hopping. The PUCCH configuration 600 may further indicate whether DMRS bundling is enabled. If DMRS bundling is enabled, the PUCCH configuration 600 may further include a configuration of a time domain window (TDW) length of consecutive slots within which repetition of a PUCCH transmission occurs and a frequency hopping interval length, which indicates a number of consecutive slots for PUCCH with the same hopping offset.

A network entity (e.g., aggregated or disaggregated base station) may semi-statically configure a UE with one or more PUCCH resource sets 602$a$-602$c$ via, for example, radio resource control (RRC) signaling (e.g., PUCCH-config). In some examples, the network entity may transmit an RRC message including an RRC configuration (e.g., RRC configuration information elements (IEs)) indicating the PUCCH configuration of one or more PUCCH resource set 602$a$-602$c$.

In some examples, a UE can select one of the configured PUCCH resource sets 502$a$-502$c$ based on the UCI payload size. The UE can then further select a specific single PUCCH resource within the selected PUCCH resource set. For example, DCI may include a PUCCH resource indicator (PRI) identifying the specific PUCCH resource to use for a PUCCH transmission. The PRI may be, for example, a 3-bit field within DCI Format 1_0 or DCI Format 1_1. In some examples, the PUCCH format and time domain resource allocation may be determined by the PUCCH resource configuration, but the frequency domain resource allocation may not be explicitly specified. In this example, the frequency domain resource allocation may be determined by the DCI and the control channel element (CCE) location of the PDCCH carrying the DCI (e.g., based on the index of the first CCE of the PDCCH and the number of CCEs in a control resource set (CORESET) of the PDCCH).

In wireless communication networks that employ SBFD, the PUCCH resource may be outside the configured uplink sub-band. As a result, PUCCH transmissions may be missed if scheduled within SBFD symbols. Therefore, various aspects are related to configurations of PUCCH resources dedicated for SBFD operations. In some examples, separate RRC PUCCH configurations may be established for SBFD (e.g., downlink slots/symbols with a configured uplink sub-band) and non-SBFD (e.g., uplink or flexible slots/symbols). In other examples, separate PUCCH resource sets within an RRC PUCCH configuration may be established for SBFD and non-SBFD. In other examples, separate PUCCH resources within a PUCCH resource set may be established for SBFD and non-SBFD.

Figure 7:
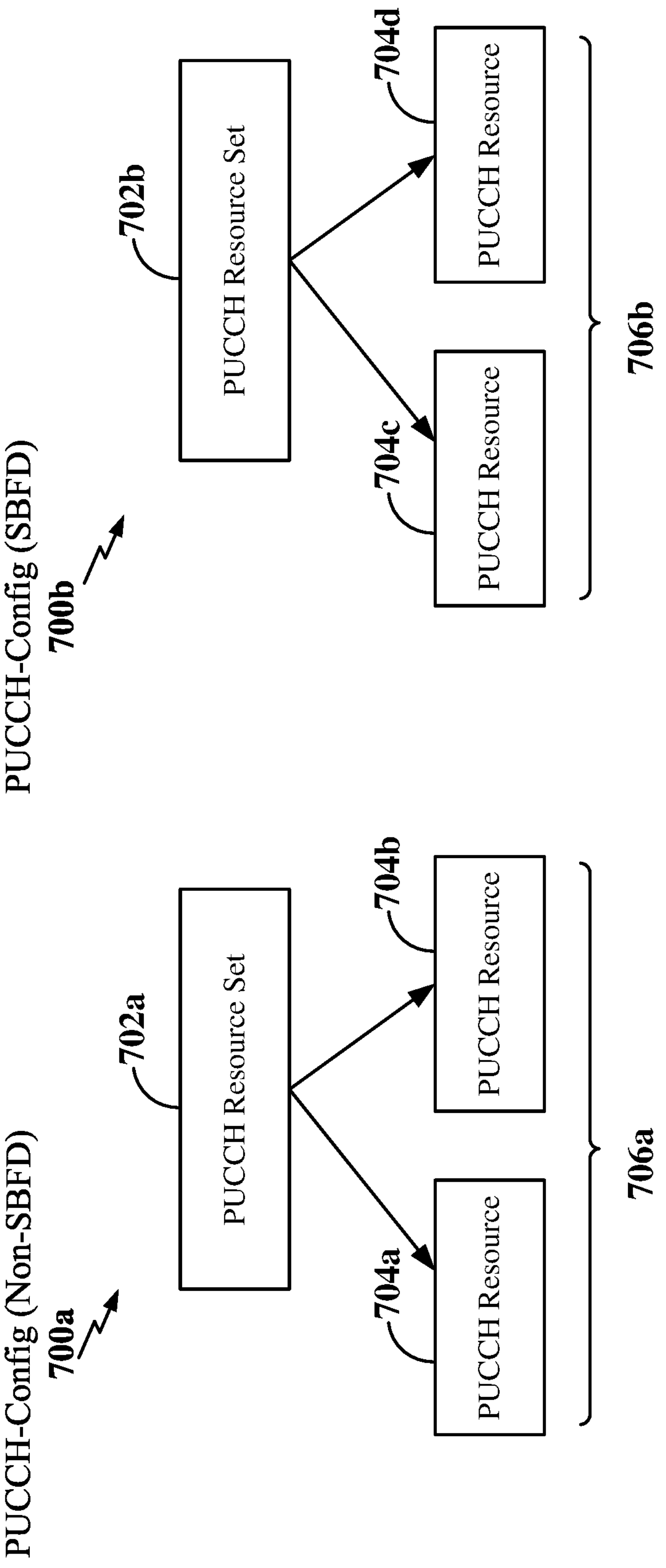
FIG. 7 is a diagram illustrating an exemplary configuration of PUCCH resources for SBFD and non-SBFD according to some aspects.

FIG. 7 is a diagram illustrating an exemplary configuration of PUCCH resources for SBFD and non-SBFD according to some aspects. In the example shown in FIG. 7, the PUCH resources for SBFD and non-SBFD may be configured using separate radio resource control (RRC) PUCCH configurations (e.g., PUCCH-config) 700$a$ and 700$b$ transmitted from the network entity to the UE. Each PUCCH configuration 700$a$ and 700$b$ includes one or more PUCCH resource sets, each including respective PUCCH resources. Each RRC PUCCH configuration 700$a$ and 700$b$ may include up to four PUCCH resource sets, and each PUCCH resource set may contain multiple PUCCH resources.

In the example shown in FIG. 7, a non-SBFD PUCCH configuration 700$a$ (PUCCH-Config (Non-SBFD)) includes PUCCH resource set 702$a$, which includes PUCCH resources 704$a$ and 704$b$. In addition, a SBFD PUCCH configuration 700$b$ (PUCCH-Config (SBFD)) includes PUCCH resource set 702$b$, which includes PUCCH resources 704$c$ and 704$d$. Thus, PUCCH resources 704$a$ and 704$b$ collectively form non-SBFD PUCCH resources 706$a$, while PUCCH resources 704$c$ and 704$d$ collectively form SBFD PUCCH resources 706$b$.

In some examples, the network entity may configure the UE with each of the separate RRC PUCCH configurations 700$a$ and 700$b$ to enable the UE to transmit a PUCCH transmission in either non-SBFD (e.g., uplink/flexible) slots/symbols or SBFD (e.g., downlink/flexible with configured uplink sub-band) slots/symbols. Based on the PUCCH configuration 800$a$ or 800$b$, the UE may then select a PUCCH resource set from the corresponding one of the PUCCH configurations 700$a$ or 700$b$ based on the UCI payload size. The UE can then further select a specific single PUCCH resource within the selected PUCCH resource set (e.g., based on the PRI included in DCI).

Figure 8:
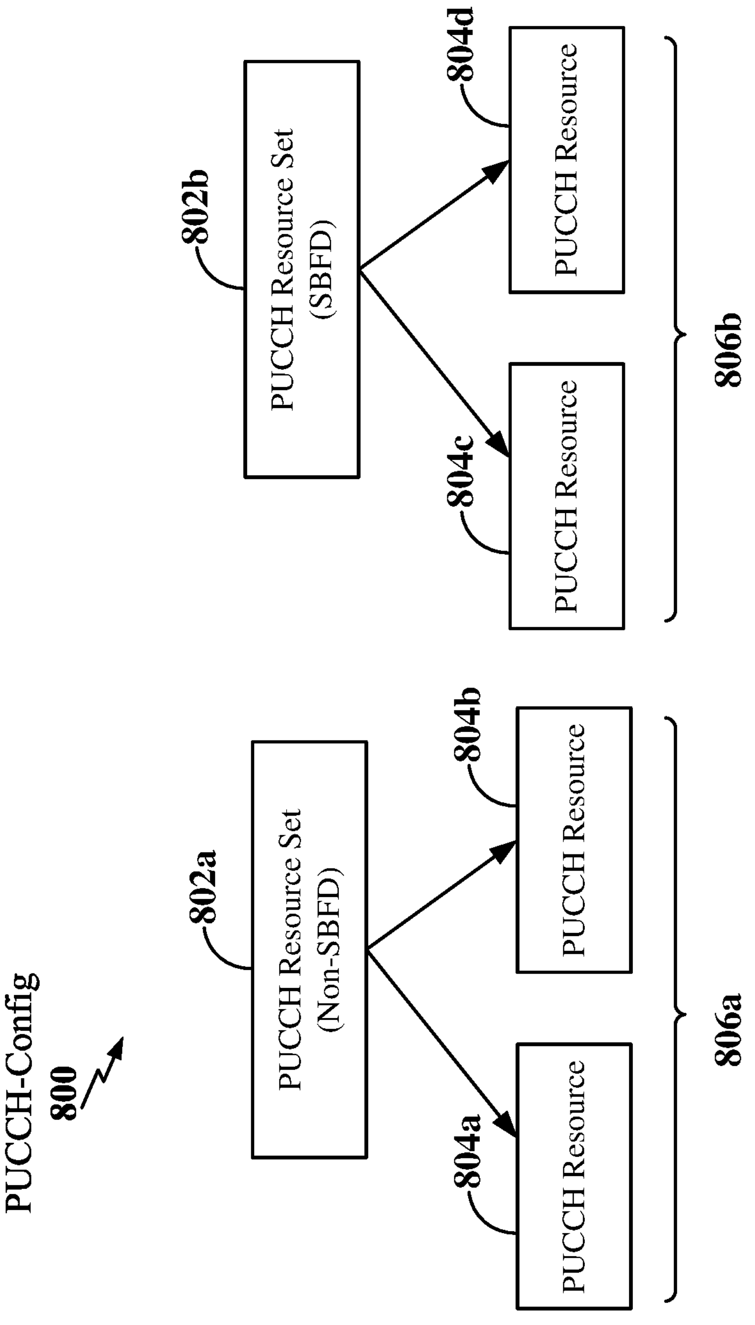
FIG. 8 is a diagram illustrating another exemplary configuration of PUCCH resources for SBFD and non-SBFD according to some aspects.

FIG. 8 is a diagram illustrating another exemplary configuration of PUCCH resources for SBFD and non-SBFD according to some aspects. In the example shown in FIG. 8, the PUCH resources for SBFD and non-SBFD may be configured using separate PUCCH resource sets 802$a$ and 802$b$ within a single RRC PUCCH configuration (e.g., PUCCH-config) 800. Each PUCCH resource set 802*a* and 802*b* may include respective PUCCH resources. For example, a non-SBFD PUCCH resource set 802*a* may include PUCCH resources 804*a* and 804*b*, while an SBFD PUCCH resource set 802*b* may include PUCCH resources 804*c* and 804*d*. Thus, PUCCH resources 804*a* and 804*b* collectively form non-SBFD PUCCH resources 806*a*, while PUCCH resources 804*c* and 804*d* collectively form SBFD PUCCH resources 806*b*.

The RRC PUCCH configuration 800 may include up to four SBFD PUCCH resource sets and up to four non-SBFD resource sets, with each PUCCH resource set containing multiple PUCCH resources. Thus, the number of PUCCH resource sets 802*a* and 802*b* within a combined non-SBFD/SBFD PUCCH configuration 800 may be increased (e.g., doubled) as compared to a non-SBFD PUCCH configuration. The SBFD-specific PUCCH resource set(s) 802*b* may be indicated via a dedicated RRC parameter within the PUCCH configuration 800 or via the respective PUCCH resource index identifier (ID). For example, a PUCCH resource index ID associated with PUCCH resource set 802*b* may indicate that the PUCCH resource set 802*b* is a SBFD PUCCH resource set.

In some examples, the network entity may configure the UE with the RRC PUCCH configuration 800 containing separate SBFD and non-SBFD PUCCH resource sets 802*a* and 802*b* to enable the UE to transmit a PUCCH transmission in either non-SBFD (e.g., uplink/flexible) slots/symbols or SBFD (e.g., downlink/flexible with configured uplink sub-band) slots/symbols. Based on the symbol/slot within which a PUCCH transmission is scheduled and the UCI payload size, the UE may then select a PUCCH resource set 802 or 802*b* from the PUCCH configuration 800. The UE can then further select a specific single PUCCH resource within the selected PUCCH resource set (e.g., based on the PRI included in DCI).

Figure 9:
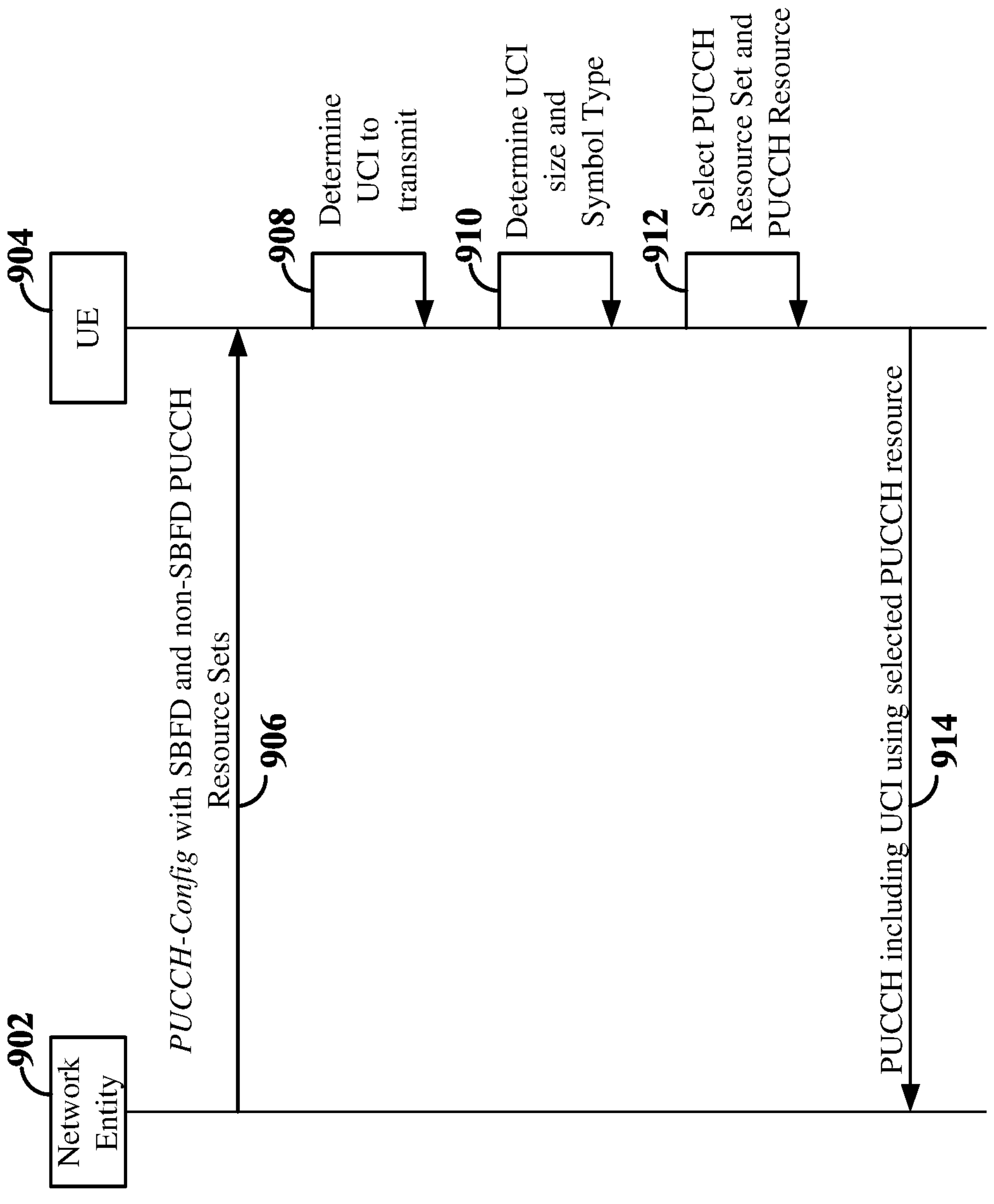
FIG. 9 is a signaling diagram illustrating exemplary signaling between a network entity and a UE for duplex specific PUCCH transmission based on separate PUCCH resource sets according to some aspects.

FIG. 9 is a signaling diagram illustrating exemplary signaling between a network entity 902 and a UE 904 for duplex specific PUCCH transmission based on separate PUCCH resource sets according to some aspects. The network entity 902 may correspond to any of the base stations or other network entities shown in FIGS. 1, 2, and/or 5A. For example, the network entity 902 may correspond to an aggregated base station, an RU, a DU, a CU, an IAB node or other network device. The UE 904 may correspond to any of the UEs shown in FIG. 1.

At 906, the network entity may transmit an RRC PUCCH configuration (e.g., PUCCH-config) including both an SBFD PUCCH resource set and a non-SBFD PUCCH resource set to the UE 904. Each of the SBFD PUCCH resource set and the non-SBFD PUCCH resource set may include one or more PUCCH resources. As such, the SBFD PUCCH resource set includes a set of SBFD PUCCH resources for SBFD slots/symbols and the non-SBFD PUCCH resource set includes a set of non-SBFD PUCCH resources for non-SBFD slots/symbols. Here, the SBFD slots/symbols include downlink symbols or flexible symbols with a configured uplink sub-band, and the non-SBFD slots/symbols include uplink symbols or flexible symbols configured for uplink communication.

At 908, the UE 904 may determine that the UE 904 has uplink control information (UCI) to transmit to the network entity 902. In some examples, the network entity 902 may transmit DCI to the UE 904 scheduling a PUCCH transmission for the UCI. At 910, the UE 904 may further determine a size of the UCI and a symbol type (e.g., SBFD or non-SBFD) of the symbol(s) on which a PUCCH transmission including the UCI may be transmitted to the network entity 902. Based on the UCI size and symbol type, at 912, the UE 904 may select the PUCCH resource set for the PUCCH transmission. In addition, the UE 904 may further select a specific PUCCH resource from the PUCCH resource set for the UCI transmission (e.g., based on the PRI within the DCI). At 914, the UE 904 may transmit the PUCCH transmission including the UCI to the network entity 902 using the selected PUCCH resource.

Figure 10:
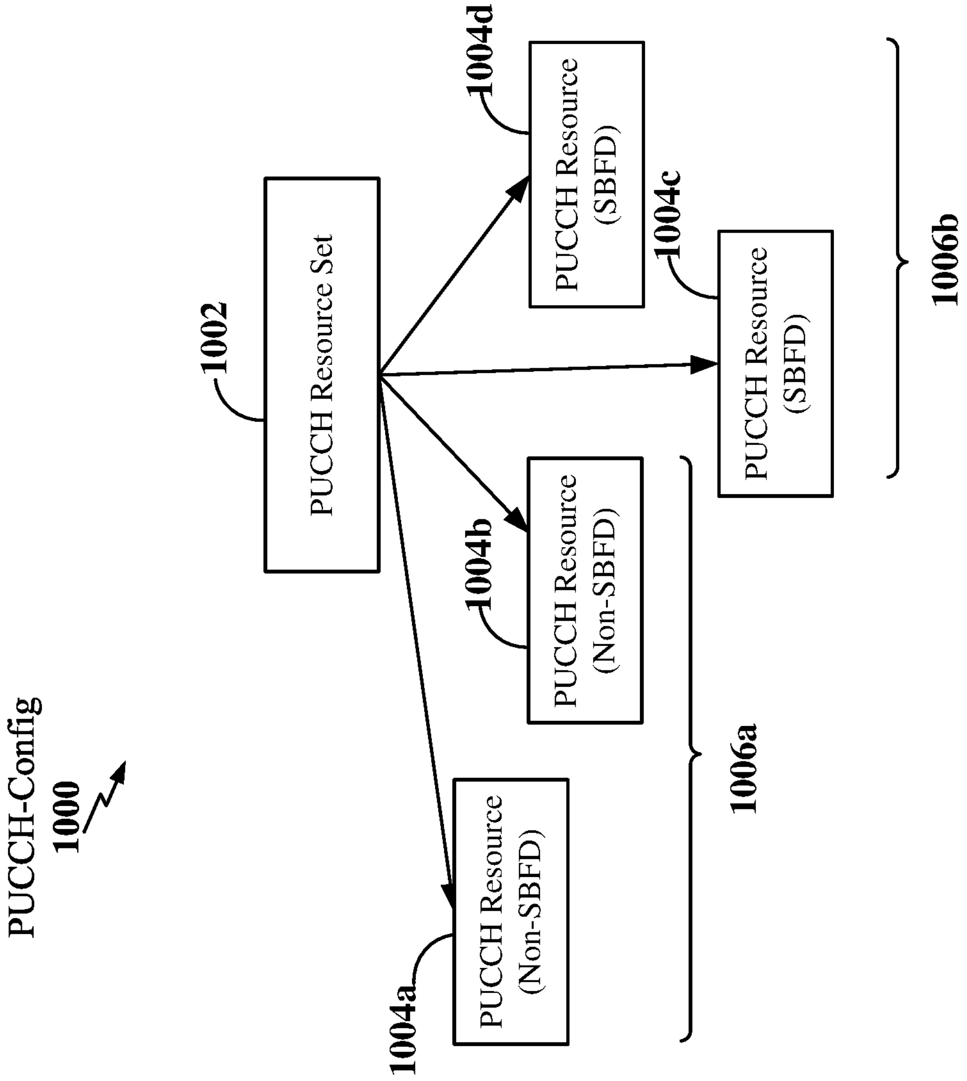
FIG. 10 is a diagram illustrating another exemplary configuration of PUCCH resources for SBFD and non-SBFD according to some aspects.

FIG. 10 is a diagram illustrating another exemplary configuration of PUCCH resources for SBFD and non-SBFD according to some aspects. In the example shown in FIG. 10, the PUCH resources for SBFD and non-SBFD may be configured using separate PUCCH resources 1004*a*-1004*d* within a PUCCH resource set 1002 of an RRC PUCCH configuration (e.g., PUCCH-config) 1000. For example, the PUCCH resource set 1002 may include non-SBFD PUCCH resources 1006*a* (e.g., PUCCH resources 1004*a* and 1004*b*) and SBFD PUCCH resources 1006*b* (e.g., PUCCH resources 1004*c* and 1004*d*).

As indicated above, the RRC PUCCH configuration 1000 may include up to four PUCCH resource sets, each including respective groups of one or more non-SBFD resources 1006*a* and one or more SBFD resources 1006*b*. Thus, the number of PUCCH resources 1004*a*-1004*b* within a combined non-SBFD/SBFD PUCCH resource set 1002 may be increased (e.g., doubled) as compared to a non-SBFD PUCCH resource set configuration. In some examples, to accommodate the increased number of PUCCH resources within a PUCCH resource set, the DCI bitfield carrying the PUCCH resource indicator (PRI) may be increased by one bit to select the PUCCH resource. In other examples, instead of increasing the number of bits of the PRI, a target slot for the PUCCH transmission may be implicitly or explicitly determined based on the DCI. For example, the DCI may include a dedicated bitfield indicating the target slot. Based on the duplex type of the target slot, the UE may select the correct group of PUCCH resources (e.g., non-SBFD or SBFD PUCCH resources). The UE may then select a specific single PUCCH resource within the selected group (e.g., based on the PRI within the DCI).

In some examples, the network entity may configure the UE with the RRC PUCCH configuration 1000 containing separate groups of SBFD and non-SBFD PUCCH resources 1006*a* and 1006*b* within each of one or more PUCCH resource sets 1002 to enable the UE to transmit a PUCCH transmission in either non-SBFD (e.g., uplink/flexible) slots/symbols or SBFD (e.g., downlink/flexible with configured uplink sub-band) slots/symbols. The UE may then select a PUCCH resource set 1002 from the PUCCH configuration 1000 and a specific single PUCCH resource (e.g., non-SBFD or SBFD PUCCH resource) within the selected PUCCH resource set.

FIG. 11 is a diagram illustrating an example of downlink control information (DCI) indicating a non-SBFD or SBFD PUCCH resource according to some aspects. The example shown in FIG. 11 is associated with DCI format 1_0. However, it should be understood that features shown in FIG. 11 may be equally applicable to other DCI formats.

The DCI 1100 includes a plurality of fields 1102, each including a respective number of bits 1104. For example, the DCI 1100 may include a frequency domain resource assignment field 1106 for a PDSCH with a variable number of bits based on the downlink BWP, a time domain resource assignment field 1108 for the PDSCH with X number of bits, a virtual resource block (VRB)-to-PRB mapping field 1110 with one bit, a modulation and coding scheme (MCS) field 1112 with five bits, a new data indicator (NDI) field 1114 with one bit, a HARQ redundancy version field 1116 with two bits, a HARQ process number field 1118 with four bits, a downlink assignment index (DAI) field 1120 with two bits, a transmit power control (TPC) command for a scheduled PUCCH field 1122 with two bits, a PUCCH resource indicator (PRI) field with three or four bits, and a PDSCH-to-HARQ feedback timing indicator field with three bits. As shown in FIG. 11, the PRI field may be raised from three bits to four bits to indicate both SBFD and non-SBFD PUCCH resources of a PUCCH resource set. In some examples, the DCI 1100 may further optionally include an additional target slot field 1128 with Y number of bits to indicate a target slot and corresponding duplex type (e.g., SBFD or non-SBFD slot) for the PUCCH transmission.

A UE may be semi-statically configured (e.g., via RRC signaling) with SBFD-dedicated PUCCH resources or non-SBFD PUCCH resources that are periodic or semi-persistent (e.g., PUCCH carrying periodic/semi-persistent channel state information (CSI), periodic/semi-persistent PUCCH for scheduling requests (SRs) or periodic/semi-persistent PUCCH for buffer status reports (BSRs)). Based on the periodicity and time division duplex (TDD) slot configuration, PUCCH transmission occasions for a periodic PUCCH resource may fall within SBFD slots or non-SBFD slots. However, since the uplink resources (e.g., frequency domain resources) for SBFD and non-SBFD may be different, a PUCCH transmission occasion falling within an opposite duplex type (e.g., an SBFD slot for a periodic non-SBFD PUCCH resource) may not be able to be transmitted. For example, a PUCCH transmission in accordance with a non-SBFD PUCCH resource that is transmitted within an SBFD slot may fall outside the configured uplink sub-band.

Figure 12:
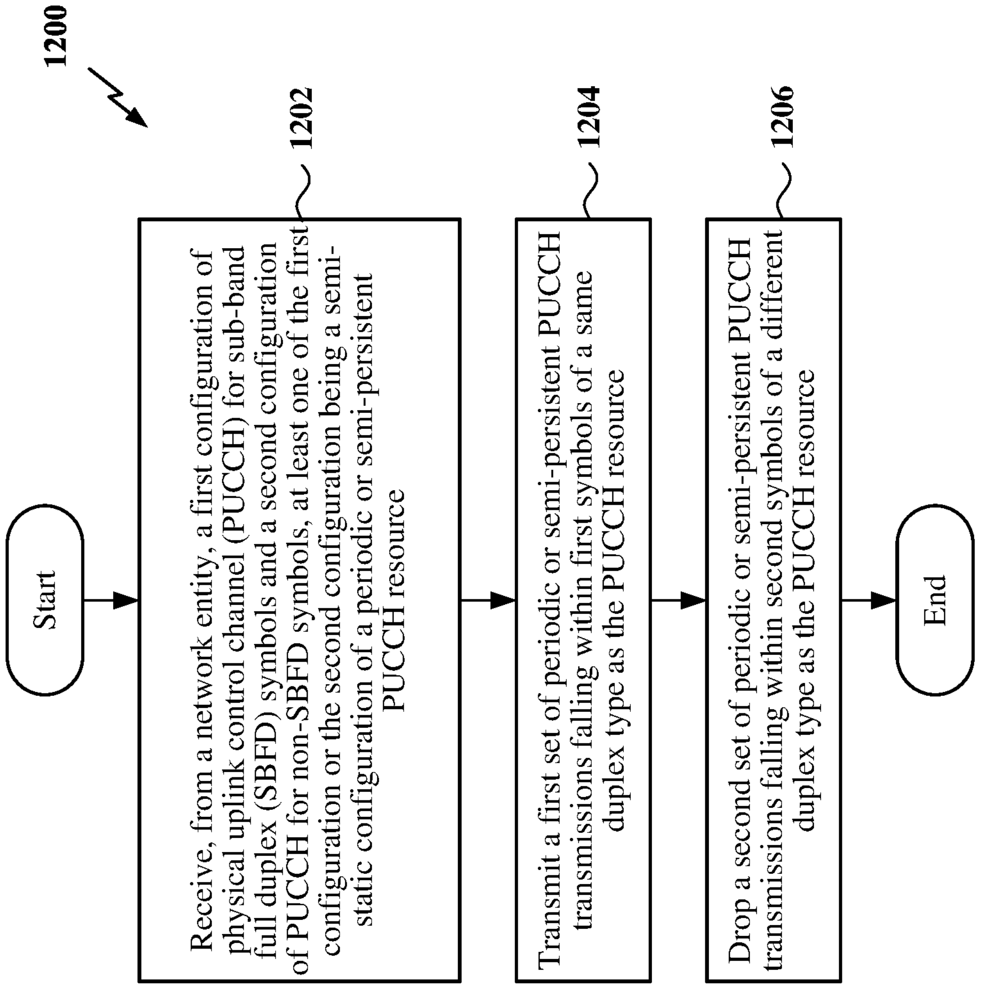
FIG. 12 is a flow chart illustrating an exemplary process for duplex-specific periodic or semi-persistent PUCCH according to some aspects.

FIG. 12 is a flow chart illustrating an exemplary process 1200 for duplex-specific periodic or semi-persistent PUCCH according to some aspects. As described below, some or all illustrated features may be omitted in a particular implementation within the scope of the present disclosure, and some illustrated features may not be required for implementation of all embodiments. In some examples, the process 1200 may be carried out by the UE 2200 illustrated in FIG. 22. In some examples, a reverse of the process 1200 may be carried out by the network entity 2400 shown in FIG. 24. In some examples, the process 1200 may be carried out by any suitable apparatus or means for carrying out the functions or algorithm described below.

At 1202, the UE may receive, from a network entity, a first configuration of PUCCH for sub-band full duplex (SBFD) symbols and a second configuration of PUCCH for non-SBFD symbols. At least one of the first configuration or the second configuration may be a semi-static configuration of a periodic or semi-persistent PUCCH resource.

For example, the UE may receive separate RRC PUCCH configurations of SBFD and non-SBFD PUCCH resources, a single RRC PUCCH configuration including separate SBFD and non-SBFD PUCCH resource sets, or separate SBFD and non-SBFD PUCCH resources within each of one or more PUCCH resource sets of a single RRC PUCCH configuration. At least one of the SBFD and/or non-SBFD PUCCH resources (e.g., within a PUCCH resource set of an RRC PUCCH configuration) may be a periodic/semi-persistent PUCCH resource. For example, an RRC PUCCH configuration may include a periodic/semi-persistent PUCCH resource set including only periodic/semi-persistent SBFD PUCCH resources, only periodic/semi-persistent non-SBFD PUCCH resources, or both periodic/semi-persistent SBFD PUCCH resources and periodic/semi-persistent non-SBFD PUCCH resources. In some examples, an RRC PUCCH configuration may include both a periodic/semi-persistent SBFD PUCCH resource set and a periodic/semi-persistent non-SBFD PUCCH resource set. In some examples, the UE may receive separate RRC PUCCH configurations for SBFD and non-SBFD, each including a respective periodic/semi-persistent PUCCH resource set.

At 1204, the UE may transmit a first set of periodic or semi-persistent PUCCH transmissions falling within first symbols of a same duplex type as the PUCCH resource. At 1206, the UE may drop a second set of periodic or semi-persistent PUCCH transmissions falling within second symbols of a different duplex type as the PUCCH resource. For example, if the periodic/semi-persistent PUCCH resource is an SBFD PUCCH resource, the UE may transmit periodic/semi-persistent PUCCH transmissions associated with PUCCH transmission occasions within SBFD slots/symbols based on the periodicity thereof and may drop periodic/semi-persistent PUCCH transmissions associated with PUCCH transmission occasions within non-SBFD slots/symbols based on the periodicity thereof. Similarly, if the periodic/semi-persistent PUCCH resource is a non-SBFD PUCCH resource, the UE may transmit periodic/semi-persistent PUCCH transmissions associated with PUCCH transmission occasions within non-SBFD slots/symbols based on the periodicity thereof and may drop periodic/semi-persistent PUCCH transmissions associated with PUCCH transmission within SBFD slots/symbols based on the periodicity thereof.

Figure 13:
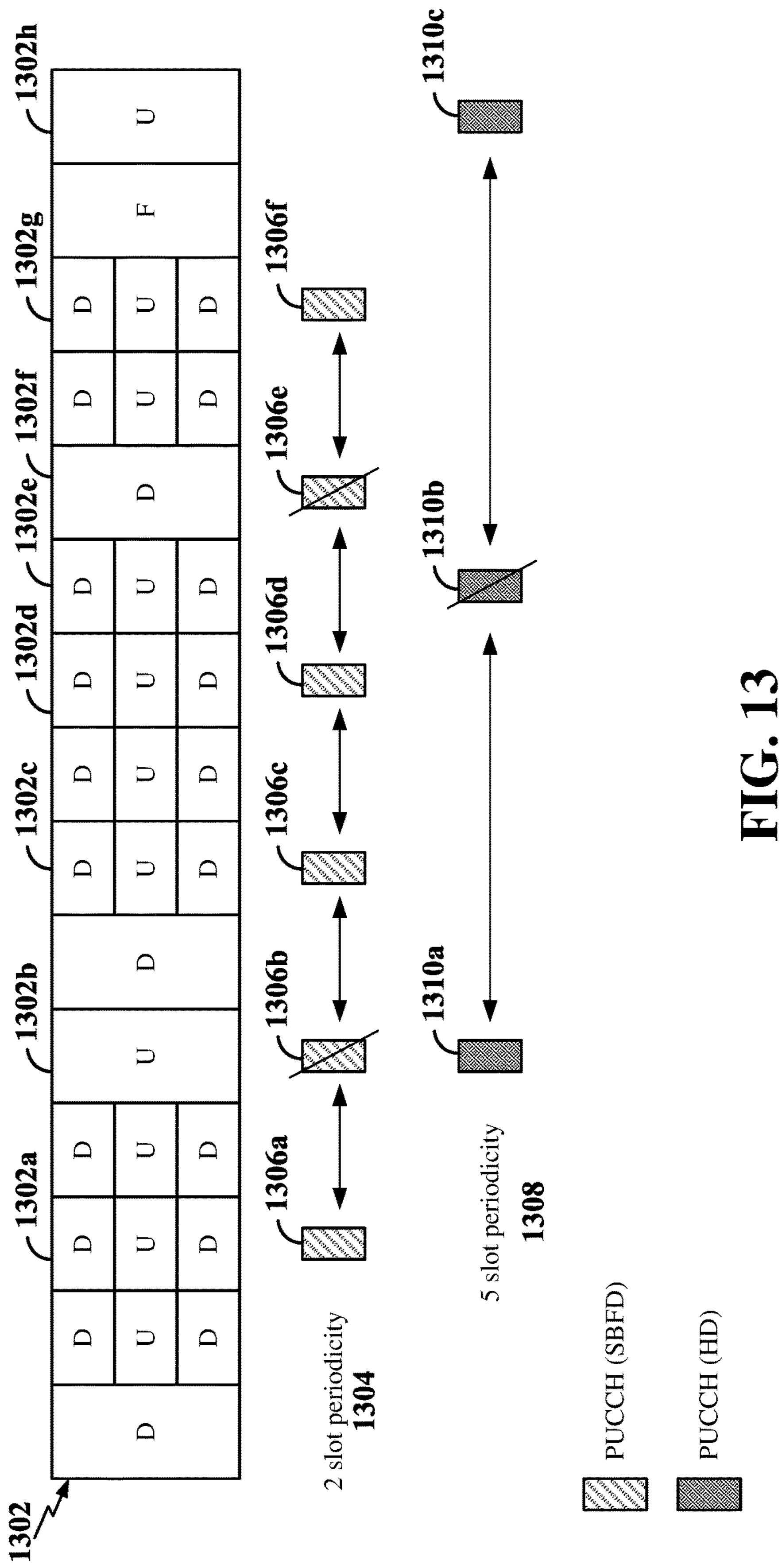
FIG. 13 is a diagram illustrating an example of UE behavior for duplex-specific periodic or semi-persistent PUCCH according to some aspects.

FIG. 13 is a diagram illustrating an example of UE behavior for duplex-specific periodic or semi-persistent PUCCH according to some aspects. It should be understood that similar behavior may be implemented at the network entity. In the example shown in FIG. 13, a plurality of time division duplex (TDD) slots 1302 are configured including both SBFD slots (e.g., slots 1302*a*, 1302*c*, 1302*d*, 1302*e*, and 1302*g*) and half-duplex (e.g., non-SBFD) slots (e.g., slots 1302*b*, 1302*f*, and 1302*h*).

As further shown in FIG. 13, a periodic/semi-persistent (SP) SBFD PUCCH resource has a periodicity 1304 of two slots with PUCCH transmission occasions falling within slots 1302*a*, 1302*b*, 1302*c*, 1302*d*, 1302*f*, and 1302*g*. Since slots 1302*a*, 1302*c*, 1302*d*, and 1302*g* are SBFD slots, a respective PUCCH transmission 1306*a*, 1306*c*, 1306*d*, and 1306*f* may be transmitted within each of the slots. However, slots 1302*b* and 1302*f* are half-duplex (e.g., non-SBFD) slots. As such, the PUCCH transmissions 1306*b* and 1306*e* falling within these slots are dropped.

In addition, a periodic/semi-persistent (SP) non-SBFD PUCCH resource has a periodicity 1308 of five slots with PUCCH transmission occasions falling within slots 1302*b*, 1302*e*, and 1302*h*. Since slots 1302*b* and 1302*h* are non-SBFD slots, a respective PUCCH transmission 1310*a* and 1310*c* may be transmitted within each of the slots. However, slot 1302*e* is a half-duplex (e.g., non-SBFD) slots. As such, the PUCCH transmission 1310*b* falling within this slot is dropped.

Figure 14:
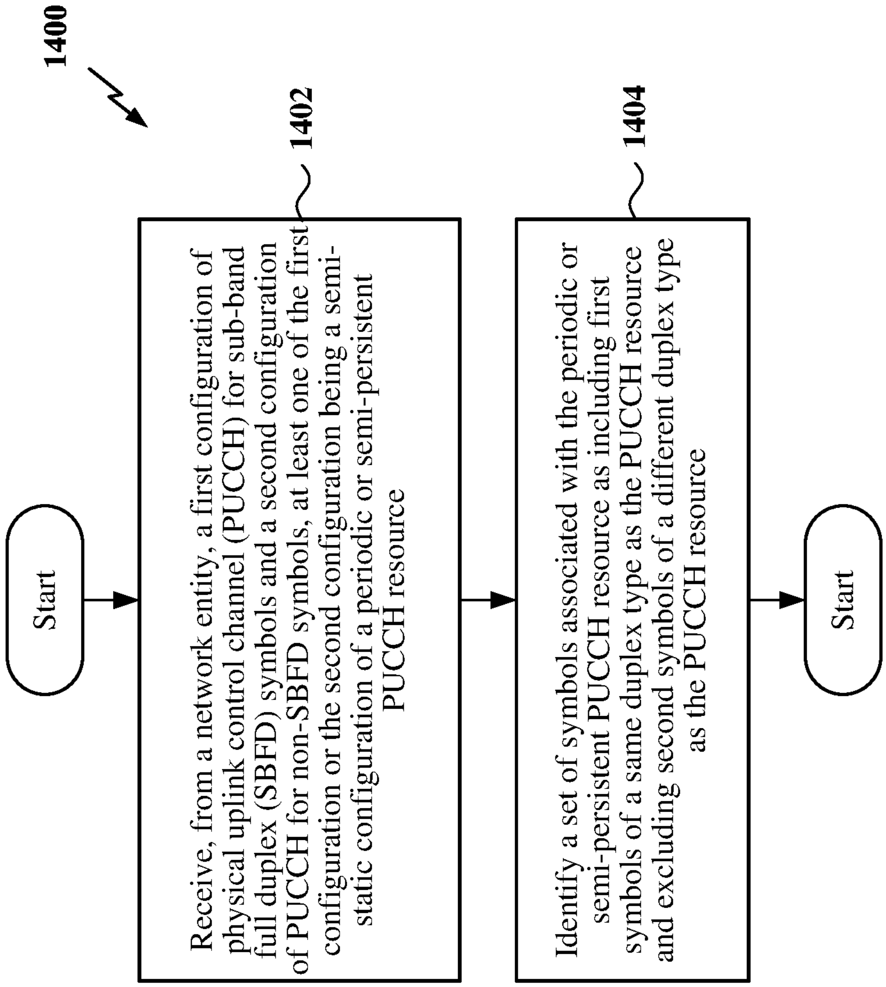
FIG. 14 is a flow chart illustrating an exemplary process for duplex-specific periodic or semi-persistent PUCCH according to some aspects.

FIG. 14 is a flow chart illustrating an exemplary process 1400 for duplex-specific periodic or semi-persistent PUCCH according to some aspects. As described below, some or all illustrated features may be omitted in a particular implementation within the scope of the present disclosure, and some illustrated features may not be required for implementation of all embodiments. In some examples, the process 1400 may be carried out by the UE 2200 illustrated in FIG. 22. In some examples, a reverse of the process 1400 may be carried out by the network entity 2400 shown in FIG. 24. In some examples, the process 1400 may be carried out by any suitable apparatus or means for carrying out the functions or algorithm described below.

At block 1402, the UE may receive, from a network entity, a first configuration of PUCCH for sub-band full duplex (SBFD) symbols and a second configuration of PUCCH for non-SBFD symbols. At least one of the first configuration or the second configuration may be a semi-static configuration of a periodic or semi-persistent PUCCH resource.

For example, the UE may receive separate RRC PUCCH configurations of SBFD and non-SBFD PUCCH resources, a single RRC PUCCH configuration including separate SBFD and non-SBFD PUCCH resource sets, or separate SBFD and non-SBFD PUCCH resources within each of one or more PUCCH resource sets of a single RRC PUCCH configuration. At least one of the SBFD and/or non-SBFD PUCCH resources (e.g., within a PUCCH resource set of an RRC PUCCH configuration) may be a periodic/semi-persistent PUCCH resource. For example, an RRC PUCCH configuration may include a periodic/semi-persistent PUCCH resource set including only periodic/semi-persistent SBFD PUCCH resources, only periodic/semi-persistent non-SBFD PUCCH resources, or both periodic/semi-persistent SBFD PUCCH resources and periodic/semi-persistent non-SBFD PUCCH resources. In some examples, an RRC PUCCH configuration may include both a periodic/semi-persistent SBFD PUCCH resource set and a periodic/semi-persistent non-SBFD PUCCH resource set. In some examples, the UE may receive separate RRC PUCCH configurations for SBFD and non-SBFD, each including a respective periodic/semi-persistent PUCCH resource set.

At block 1404, the UE may identify a set of symbols associated with the periodic or semi-persistent PUCCH resource as including first symbols of a same duplex type as the PUCCH resource and excluding second symbols of a different duplex type as the PUCCH resource. For example, if the periodic/semi-persistent PUCCH resource is an SBFD PUCCH resource, the UE may compute the periodicity of PUCCH transmission occasions of the PUCCH resource by counting SBFD slots/symbols and not counting non-SBFD slots/symbols. Thus, the UE may include SBFD slots/symbols when counting the slots/symbols between periodic PUCCH transmission occasions and exclude non-SBFD slots/symbols when counting the slots/symbols between periodic PUCCH transmission occasions. Similarly, if the periodic/semi-persistent PUCCH resource is a non-SBFD PUCCH resource, the UE may compute the periodicity of PUCCH transmission occasions of the PUCCH resource by counting non-SBFD slots/symbols and not counting SBFD slots/symbols. Thus, the UE may include non-SBFD slots/symbols when counting the slots/symbols between periodic/semi-persistent PUCCH transmission occasions and exclude SBFD slots/symbols when counting the slots/symbols between periodic/semi-persistent PUCCH transmission occasions.

Figure 15:
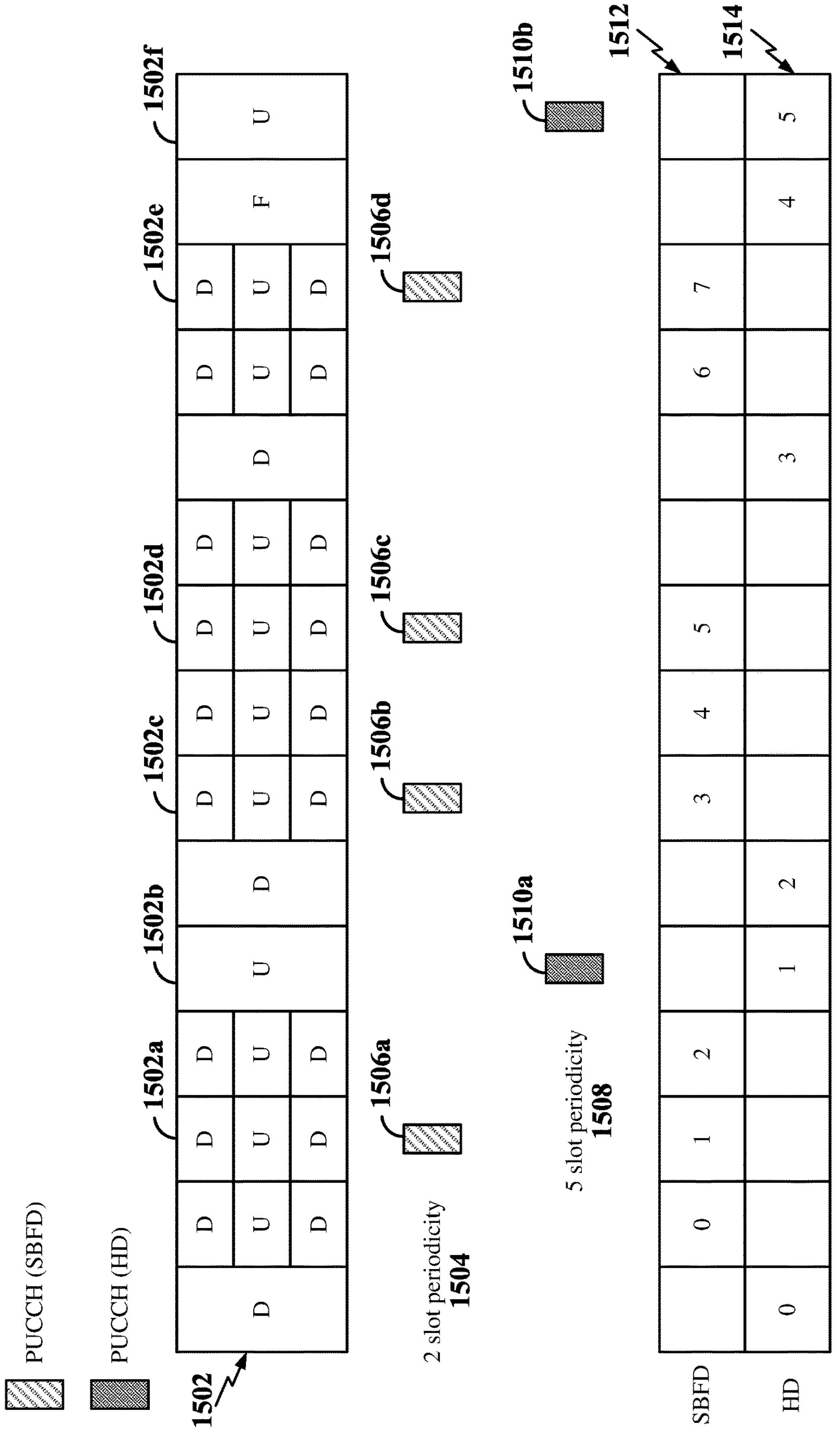
FIG. 15 is a diagram illustrating an example of UE behavior for duplex-specific periodic or semi-persistent PUCCH according to some aspects.

FIG. 15 is a diagram illustrating an example of UE behavior for duplex-specific periodic or semi-persistent PUCCH according to some aspects. It should be understood that similar behavior may be implemented at the network entity. In the example shown in FIG. 15, a plurality of time division duplex (TDD) slots 1502 are configured including both SBFD slots (e.g., slots 1502*a*, 1502*c*, 1502*d*, and 1502*e*) and half-duplex (e.g., non-SBFD) slots (e.g., slots 1502*b* and 1502*f*).

As further shown in FIG. 15, a periodic/semi-persistent (SP) SBFD PUCCH resource has a periodicity 1504 of two slots. To identify the slots/symbols having PUCCH transmission occasions associated with the periodicity 1504 of the SBFD PUCCH resource, the UE may count 1512 the slots by including the SBFD slots and excluding the non-SBFD slots in the count 1512. Thus, SBFD PUCCH transmission occasions fall within SBFD slots 1502*a* 1502*c*, 1502*d*, and 1502*e*, and a respective PUCCH transmission 1506*a*, 1506*b*, 1506*c*, and 1506*d* may be transmitted within each of the slots.

In addition, a periodic/semi-persistent (SP) non-SBFD PUCCH resource has a periodicity 1508 of five slots. To identify the slots/symbols having PUCCH transmission occasions associated with the periodicity 1508 of the non-SBFD PUCCH resource, the UE may count 1514 the slots by including the nonSBFD slots and excluding the SBFD slots in the count 1514. Thus, non-SBFD PUCCH transmission occasions fall within SBFD slots 1502*b* and 1502*f*, and a respective PUCCH transmission 1510*a* and 1510*b* may be transmitted within each of the slots.

A UE may further be semi-statically configured (e.g., via RRC signaling) with SBFD-dedicated PUCCH resources with repetition or non-SBFD PUCCH resources with repetition. The PUCCH resource configured with repetition can be triggered by DCI (e.g., AP PUCCH transmission) or could be a periodic/semi-persistent (P/SP) PUCCH. For example, a UE may be semi-statically configured with an SBFD-dedicated PUCCH resource that is indicated or configured with $$N_{PUCCH}^{repeat}$$

repetition given by pucch-RepetitionNrofSlot, if configured, or nrofSlots. As another example, a UE may be semi-statically configured with a non-SBFD-dedicated PUCCH resource that is indicated or configured with $$N_{PUCCH}^{repeat}$$

repetition given by pucch-RepetitionNrofSlot, if configured, or nrofSlots. Based on the time division duplex (TDD) slot configuration, repetitions of a PUCCH transmission associated with a PUCCH resource may fall within SBFD slots or non-SBFD slots. Therefore, to identify the available slots for PUCCH repetitions, the UE may either consider slots of the same duplex type as the PUCCH resource or slots of both duplex types.

Figure 16:
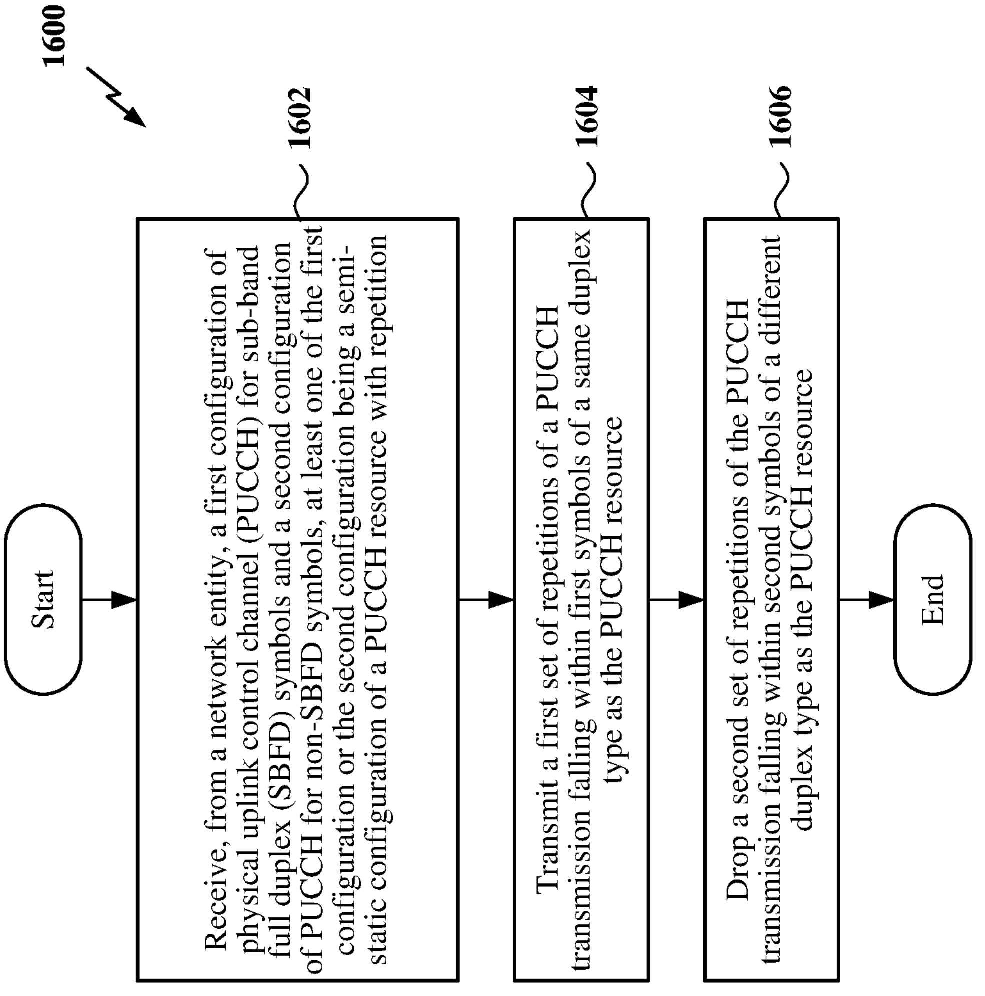
FIG. 16 is a flow chart illustrating an exemplary process for duplex-specific PUCCH repetition according to some aspects.

FIG. 16 is a flow chart illustrating an exemplary process 1600 for duplex-specific PUCCH repetition according to some aspects. As described below, some or all illustrated features may be omitted in a particular implementation within the scope of the present disclosure, and some illustrated features may not be required for implementation of all embodiments. In some examples, the process 1600 may be carried out by the UE 2200 illustrated in FIG. 22. In some examples, a reverse of the process 1600 may be carried out by the network entity 2400 shown in FIG. 24. In some examples, the process 1600 may be carried out by any suitable apparatus or means for carrying out the functions or algorithm described below.

At block 1602, the UE may receive, from a network entity, a first configuration of PUCCH for sub-band full duplex (SBFD) symbols and a second configuration of PUCCH for non-SBFD symbols. At least one of the first configuration or the second configuration may be a semi-static configuration of a PUCCH resource with repetition.

For example, the UE may receive separate RRC PUCCH configurations of SBFD and non-SBFD PUCCH resources, a single RRC PUCCH configuration including separate SBFD and non-SBFD PUCCH resource sets, or separate SBFD and non-SBFD PUCCH resources within each of one or more PUCCH resource sets of a single RRC PUCCH configuration. At least one of the SBFD and/or non-SBFD PUCCH resources (e.g., within a PUCCH resource set of an RRC PUCCH configuration) may be a PUCCH resource with repetition. For example, an RRC PUCCH configuration may include a PUCCH resource set including only SBFD PUCCH resources with repetition, only non-SBFD PUCCH resources with repetition, or both SBFD PUCCH resources with repetition and non-SBFD PUCCH resources with repetition.

At block 1604, the UE may transmit a first set of repetitions of a PUCCH transmission falling within first symbols of a same duplex type as the PUCCH resource. At block 1606, the UE may drop a second set of repetitions of a PUCCH transmission falling within second symbols of a different duplex type as the PUCCH resource. For example, if the PUCCH resource with repetition is an SBFD PUCCH resource, the UE may transmit repetitions of a PUCCH transmission within SBFD slots/symbols and may drop repetitions of the PUCCH transmission within non-SBFD slots/symbols. Similarly, if the PUCCH resource with repetition is a non-SBFD PUCCH resource, the UE may transmit repetitions of a PUCCH transmission within non-SBFD slots/symbols and may drop repetitions of the PUCCH transmission within SBFD slots/symbols.

Figure 17A:
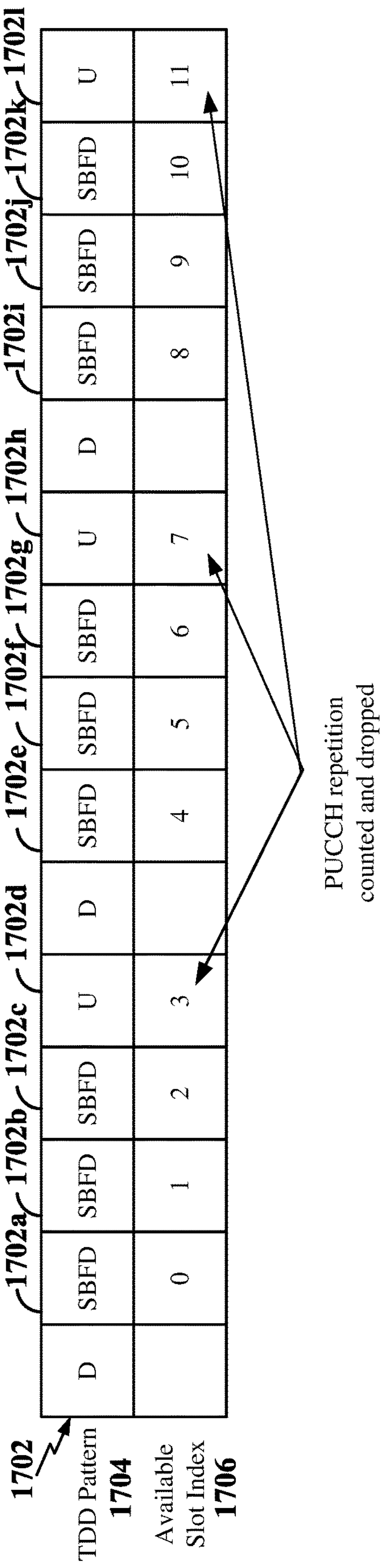
FIGS. 17A and 17B are diagrams illustrating examples of UE behavior for duplex-specific PUCCH repetition according to some aspects.
Figure 17B:
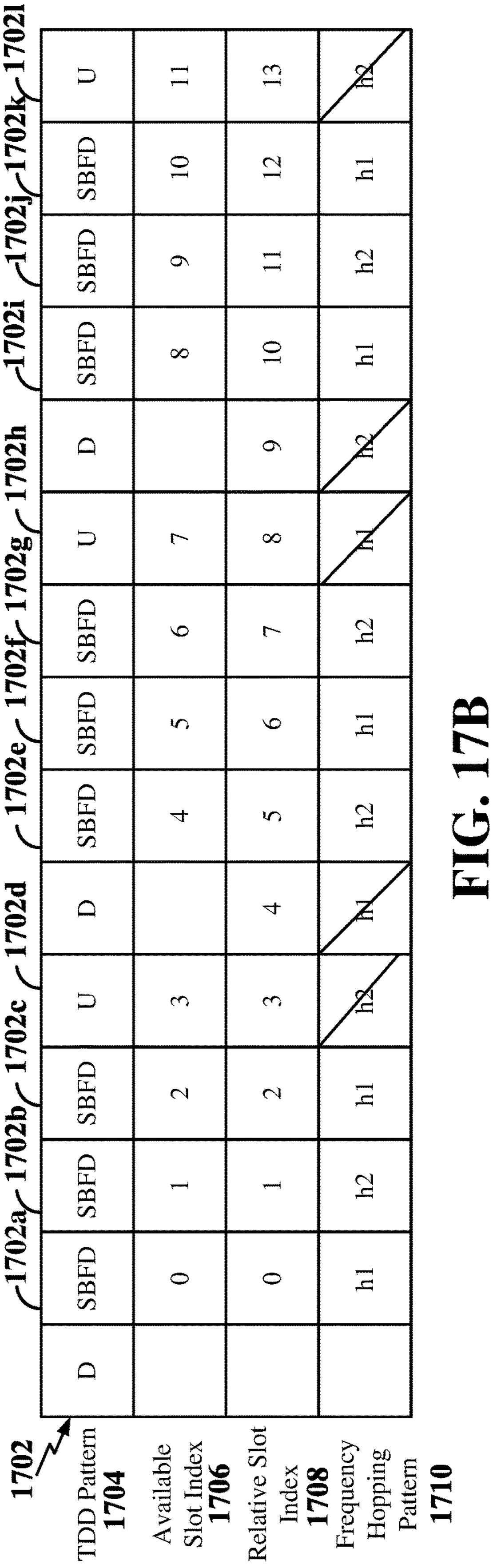

FIGS. 17A and 17B are diagrams illustrating examples of UE behavior for duplex-specific PUCCH repetition according to some aspects. It should be understood that similar behavior may be implemented at the network entity. In the example shown in FIGS. 17A and 17B, a plurality of slots 1702 are configured in a TDD pattern 1704. The TDD pattern 1704 of slots 1702 includes both SBFD slots (e.g., slots 1702*a*, 1702*b*, 1702*c*, 1702*e*, 1702*f*, 1702*g*, 1702*i*, 1702*j*, and 1702*k*) and half-duplex (e.g., non-SBFD) slots (e.g., slots 1702*d*, 1702*h*, and 1702*l*).

A UE may identify available slots 1706 for PUCCH repetitions based on a set of slots of both duplex types (e.g., SBFD and non-SBFD) if the slot accommodates the PUCCH time resources (e.g., startSymbol and nrofsymbols) configured in the PUCCH resource. For example, the available slots for PUCCH repetitions may include each of the SBFD slots and UL/flexible half-duplex slots that accommodate the PUCCH time resources. In the example shown in FIGS. 17A and 17B, the available slots include slots 1702*a*-1702*l*. However, if the PUCCH resource with repetition is a SBFD PUCCH resource, as shown in FIG. 17A, PUCCH repetitions in half-duplex (e.g., non-SBFD) slots may be dropped. Thus, PUCCH repetitions may be counted and then dropped in slots 1702*d*, 1702*h*, and 1702*l*. In addition, PUCCH repetitions may be transmitted in slots 1702*a*, 1702*b*, 1702*c*, 1702*e*, 1702*f*, 1702*g*, 1702*i*, 1702*j*, and 1702*k*. If, instead, the PUCCH resource with repetition is a non-SBFD PUCCH resource, PUCCH repetitions may be dropped in SBFD slots. For example, if the initial PUCCH repetition occurs in slot 1702*d*, PUCCH repetitions thereof may be counted then dropped in slots 1702*e*, 1702*f*, 1702*g*, 1702*i*, 1702*j*, and 1702*k*. In addition, PUCCH repetitions may be transmitted in slots 1702*d*, 1702*h* and 1702*l*.

In some examples, a PUCCH resource with repetition may further be configured with frequency hopping, where each hop is indicated by a different respective starting resource block (RB). By configuration, the network entity should ensure that the frequency resources of the hopped PUCCH are valid (e.g., within the UL sub-band for SBFD-specific PUCCH). This applies to both intra-slot and inter-slot frequency hopping.

As further shown in FIG. 17B, an inter-slot frequency hopping pattern 1710 is based on relative slot indices 1708 from the first PUCCH transmission. In the example shown in FIG. 17B, the relative slot index 1708 is determined based on physical slots regardless of the duplex type. Thus, the relative slot index begins at slot 1702*a* with the first PUCCH transmission and increments by one with each consecutive subsequent slot. As such, in the example of FIG. 17B, the relative slots include sequential slots based on slot index regardless of a duplex type associated with each of the sequential slots.

The frequency hopping pattern 1710 is then determined based on the relative slot index, resulting in the hopping pattern 1710 shown in FIG. 17B of alternating between a first hop (h1) and a second hop (h2) in each of the consecutive subsequent slots, in which the even relative slots are associated with the first hop and odd relative slots are associated with the second hop. For example, slot 1702*a* carrying the initial PUCCH transmission is transmitted with the first hop (h1), slot 1702*b* carrying the next PUCCH transmission is transmitted with the second hop (h2), and so on. However, for a SBFD PUCCH resource with repetition and frequency hopping, PUCCH repetitions with frequency hopping in half-duplex (e.g., non-SBFD UL or flexible) slots may be dropped, as indicated above. For example, no PUCCH transmission occurs in slots 1702*d*, 1702*h*, or 1702*l*.

In some examples, the frequency hopping configuration of a PUCCH resource with repetition may further be configured with DMRS bundling that indicates a number of consecutive slots over which the same frequency hop is maintained. For example, the DMRS bundling configuration may include a time domain window (TDW) length of two or more consecutive slots within which repetitions of a PUCCH transmission are transmitted on a same set of frequencies (e.g., a same hop).

Figures 18A, 18B:
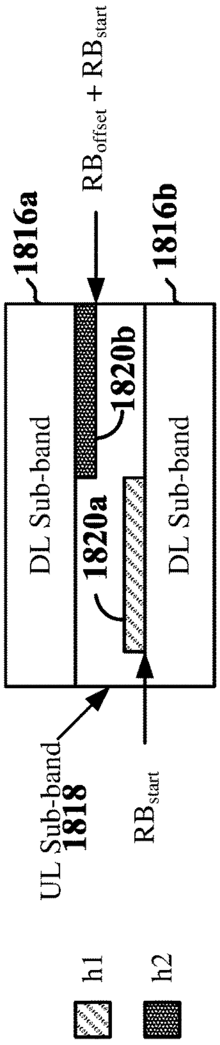
FIGS. 18A and 18B are diagrams illustrating an example of UE behavior for duplex-specific PUCCH repetition with DMRS bundling according to some aspects.

FIGS. 18A and 18B are diagrams illustrating an example of UE behavior for duplex-specific PUCCH repetition with DMRS bundling according to some aspects. It should be understood that similar behavior may be implemented at the network entity. In the example shown in FIG. 18A, a plurality of slots 1802 are configured in a TDD pattern 1804. The TDD pattern 1804 of slots 1802 includes both SBFD slots (e.g., slots 1802*a*, 1802*b*, 1802*c*, 1802*e*, 1802*f*, 1802*g*, 1802*i*, 1802*j*, and 1802*k*) and half-duplex (e.g., non-SBFD) slots (e.g., slots 1802*d*, 1802*h*, and 1802*l*).

Similar to the examples shown in FIGS. 17A and 17B, in the example shown in FIG. 18A, a UE may identify available slots 1806 for PUCCH repetitions based on slots of both duplex types (e.g., SBFD and non-SBFD) if the slot accommodates the PUCCH time resources (e.g., startSymbol and nrofsymbols) configured in the PUCCH resource. For example, the available slots for PUCCH repetitions may include each of the SBFD slots and UL/flexible half-duplex slots that accommodate the PUCCH time resources. In the example shown in FIG. 18A, the available slots include slots 1802*a*-1802*l*. As further shown in FIG. 18A, an inter-slot frequency hopping pattern 1810 is based on relative slot indices 1808 from the first PUCCH transmission. Similar to the example shown in FIG. 17B, in the example shown in FIG. 18A, the relative slot index 1808 is determined based on physical slots regardless of the duplex type.

The same frequency hop offset is maintained across N consecutive slots, where N is given by the frequency hopping interval. For example, as shown in FIG. 18B, repetitions of PUCCH transmissions 1820*a* and 1820*b* may be transmitted within an UL sub-band 1818 of SBFD slots that include the UL sub-band 1818 between respective DL sub-bands 1816*a* and 1816. In the example shown in FIG. 18B, PUCCH repetition 1820*a* may be transmitted at a first hop (h1), indicated by a first RB ($RB_{start}$) and PUCCH repetition 1820*b* may be transmitted at a second hop (h2) indicated by an offset from the first RB (e.g., $RB_{offset}$+$RB_{start}$).

In addition, as further shown in FIG. 18A, DMRS bundling may be enabled with a TDW 1812 having a length of three slots. Thus, the frequency hopping pattern 1810 maintains the same hop for three slots before switching to the next hop. For example, slots 1802*a*, 1802*b*, and 1802*c* include the same first hop (h1), slots 1802*d*, 1802*e*, and 1802*f* include the same second hop (h2), and so on. However, since the TDW crosses the boundary between SBFD and non-SBFD slots at slot 1802*e*, between slots 1802*g* and 1802*h*, and at slot 1802*i*, the TDW length may be reset or restarted at those boundaries. For example, the UE may reset the TDW 1812 based on a duplex change to create an actual (reset) TDW 1814 spanning one or more of the set of consecutive slots of the original TDW 1812 that are of a same duplex type. For example, nominal (original) TDW 1812*a* of length three may be reset into two actual (reset) TDWs 1814*a* and 1814*b* of lengths two and one, respectively.

Figure 19:
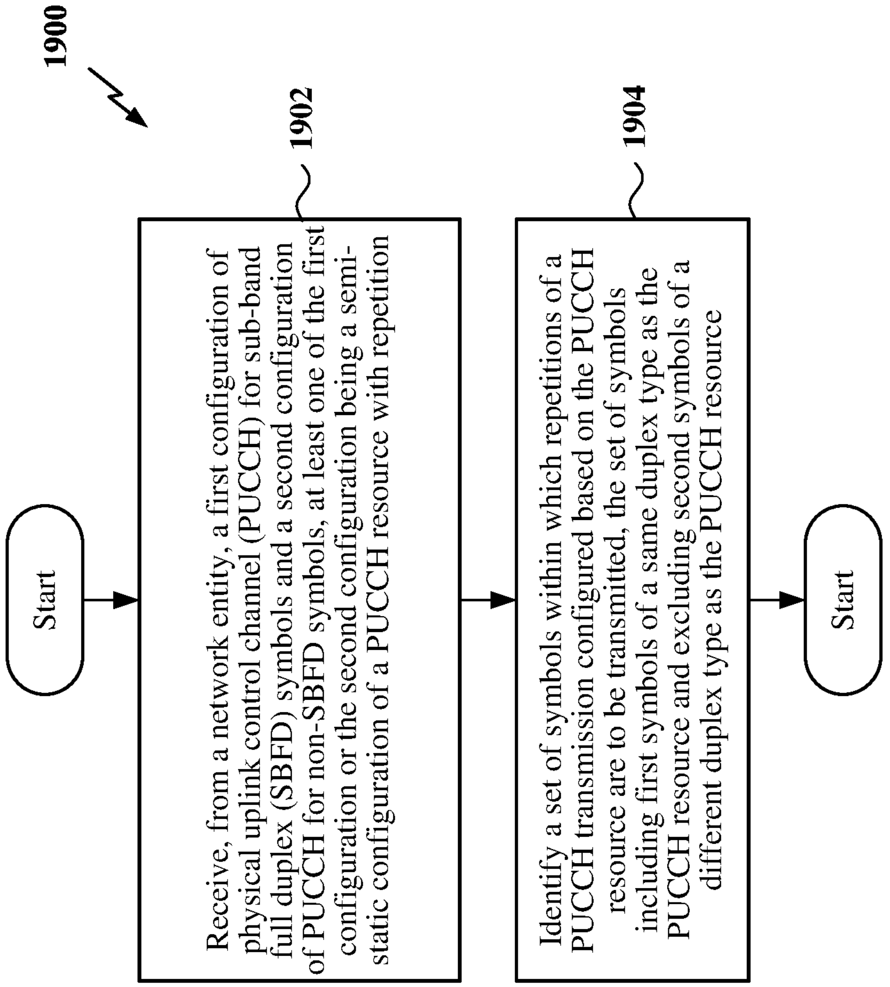
FIG. 19 is a flow chart illustrating another exemplary process 1900 for duplex-specific PUCCH repetition according to some aspects.

FIG. 19 is a flow chart illustrating another exemplary process 1900 for duplex-specific PUCCH repetition according to some aspects. As described below, some or all illustrated features may be omitted in a particular implementation within the scope of the present disclosure, and some illustrated features may not be required for implementation of all embodiments. In some examples, the process 1900 may be carried out by the UE 2200 illustrated in FIG. 22. In some examples, a reverse of the process 1900 may be carried out by the network entity 2400 shown in FIG. 24. In some examples, the process 1900 may be carried out by any suitable apparatus or means for carrying out the functions or algorithm described below.

At block 1902, the UE may receive, from a network entity, a first configuration of PUCCH for sub-band full duplex (SBFD) symbols and a second configuration of PUCCH for non-SBFD symbols. At least one of the first configuration or the second configuration may be a semi-static configuration of a PUCCH resource with repetition.

For example, the UE may receive separate RRC PUCCH configurations of SBFD and non-SBFD PUCCH resources, a single RRC PUCCH configuration including separate SBFD and non-SBFD PUCCH resource sets, or separate SBFD and non-SBFD PUCCH resources within each of one or more PUCCH resource sets of a single RRC PUCCH configuration. At least one of the SBFD and/or non-SBFD PUCCH resources (e.g., within a PUCCH resource set of an RRC PUCCH configuration) may be a PUCCH resource with repetition. For example, an RRC PUCCH configuration may include a PUCCH resource set including only SBFD PUCCH resources with repetition, only non-SBFD PUCCH resources with repetition, or both SBFD PUCCH resources with repetition and non-SBFD PUCCH resources with repetition.

At block 1904, the UE may identify a set of symbols within which repetitions of a PUCCH transmission configured based on the PUCCH resource are to be transmitted. The set of symbols may include first symbols of a same duplex type as the PUCCH resource and exclude second symbols of a different duplex type as the PUCCH resource. For example, if the PUCCH resource is an SBFD PUCCH resource, the UE may determine that only SBFD slots are available slots for PUCCH transmission if the SBFD slot accommodates the PUCCH time sources. In this example, all repetitions may be counted in SBFD slots, while repetitions are not counted in non-SBFD slots. Thus, the UE may include SBFD slots/symbols when counting the slots/symbols for PUCCH repetitions and exclude non-SBFD slots/symbols when counting the slots/symbols for PUCCH repetitions. Similarly, if the PUCCH resource is a non-SBFD PUCCH resource, the UE may determine that only SBFD slots are available slots for PUCCH transmission if the SBFD slot accommodates the PUCCH time sources. In this example, all repetitions may be counted in SBFD slots, while repetitions are not counted in non-SBFD slots. Thus, the UE may include non-SBFD slots/symbols when counting the slots/symbols for PUCCH repetitions and exclude SBFD slots/symbols when counting the slots/symbols for PUCCH repetitions.

FIGS. 20A and 20B are diagrams illustrating examples of UE behavior for duplex-specific PUCCH repetition according to some aspects. It should be understood that similar behavior may be implemented at the network entity. In the example shown in FIGS. 20A and 20B, a plurality of slots 2002 are configured in a TDD pattern 2004. The TDD pattern 2004 of slots 2002 includes both SBFD slots (e.g., slots 2002*a*, 2002*b*, 2002*c*, 2002*e*, 2002*f*, 2002*g*, 2002*i*, 2002*j*, and 2002*k*) and half-duplex (e.g., non-SBFD) slots (e.g., slots 2002*d*, 2002*h*, and 2002*l*).

A UE may identify available slots 2006 for PUCCH repetitions from a group of slots of a same duplex type as a PUCCH resource if the slot accommodates the PUCCH time resources (e.g., startSymbol and nrofsymbols) configured in the PUCCH resource. For example, the available slots for PUCCH repetitions may include each of the SBFD slots that accommodates the PUCCH time resources. In the example shown in FIGS. 20A and 20B, the available slots include slots 2002*a*, 2002*b*, 2002*c*, 2002*e*, 2002*f*, 2002*g*, 2002*i*, 2002*j*, and 2002*k*. Thus, if the PUCCH resource is an SBFD PUCCH resource, PUCCH repetitions may be counted and transmitted in slots 2002*a*, 2002*b*, 2002*c*, 2002*e*, 2002*f*, 2002*g*, 2002*i*, 2002*j*, and 2002*k*. If, instead, the PUCCH resource with repetition is a non-SBFD PUCCH resource, PUCCH repetitions may be counted and then transmitted in slots 2002*d*, 2002*h* and 2002*l*.

In examples in which the PUCCH resource with repetition is further configured with frequency hopping, as shown in FIG. 20B, an inter-slot frequency hopping pattern 2010 is based on relative slot indices 2008 from the first PUCCH transmission. In the example shown in FIG. 20B, the relative slot index 2008 is determined based on slots of the same duplex type as the PUCCH resource. Thus, the relative slot index begins at slot 2002*a* with the first PUCCH transmission and increments by one with each subsequent slot of the same duplex type.

The frequency hopping pattern 2010 is then determined based on the relative slot index, resulting in the hopping pattern 2010 shown in FIG. 20B of alternating between a first hop (h1) and a second hop (h2) in each of the relative slots. For example, slot 2002*a* carrying the initial PUCCH transmission is transmitted with the first hop (h1), slot 2002*b* carrying a PUCCH repetition is transmitted with the second hop (h2), slot 2002*c* carrying the next PUCCH repetition is transmitted with the first hop (h1), slot 2002*e* carrying the next PUCCH repetition is transmitted with the second hop (h2), and so on.

Figure 21:
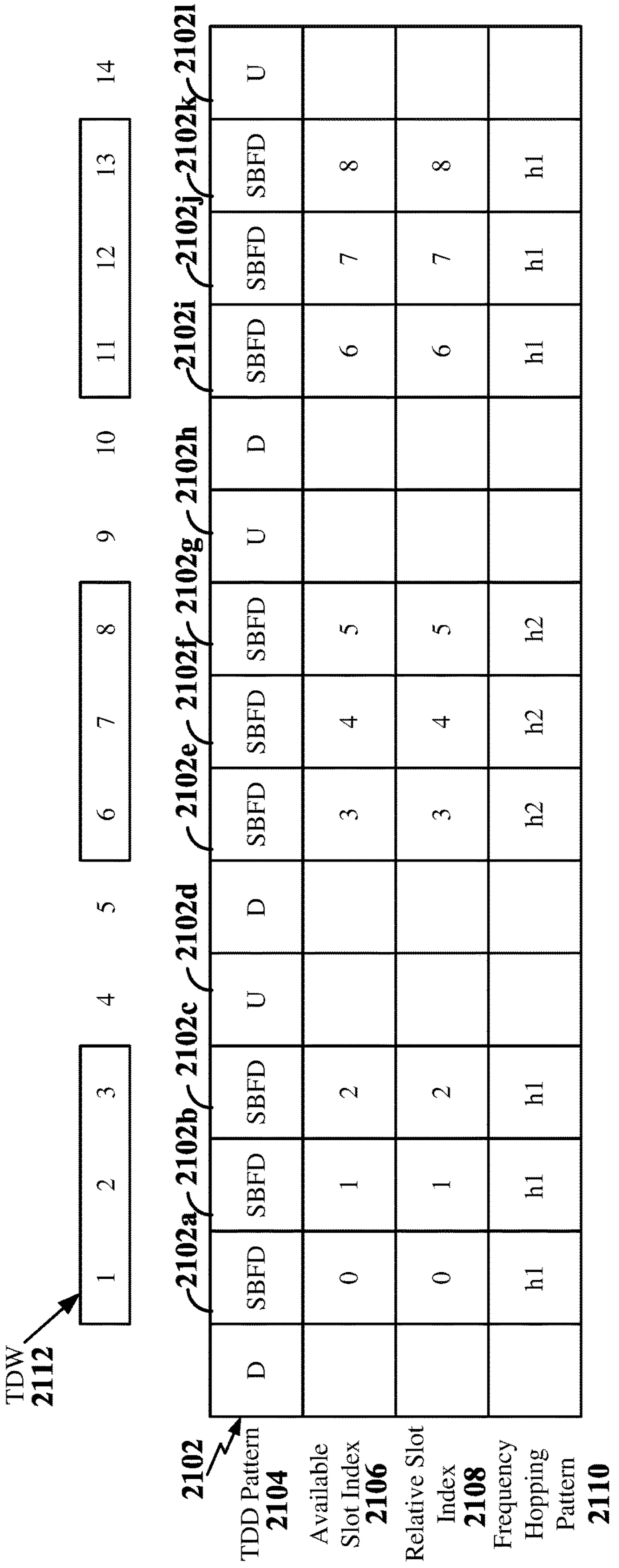
FIG. 21 is a diagram illustrating another example of UE behavior for duplex-specific PUCCH repetition with DMRS bundling according to some aspects.

FIG. 21 is a diagram illustrating another example of UE behavior for duplex-specific PUCCH repetition with DMRS bundling according to some aspects. It should be understood that similar behavior may be implemented at the network entity. In the example shown in FIG. 21, a plurality of slots 2102 are configured in a TDD pattern 2104. The TDD pattern 2104 of slots 2102 includes both SBFD slots (e.g., slots 2102*a*, 2102*b*, 2102*c*, 2102*e*, 2102*f*, 2102*g*, 2102*i*, 2102*j*, and 2102*k*) and half-duplex (e.g., non-SBFD) slots (e.g., slots 2102*d*, 2102*h*, and 2102*l*).

Similar to the examples shown in FIGS. 20A and 20B, in the example shown in FIG. 21, a UE may identify available slots 2106 for PUCCH repetitions based on slots of the same duplex type as the PUCCH resource if the slot accommodates the PUCCH time resources (e.g., startSymbol and nrofsymbols) configured in the PUCCH resource. For example, the available slots for PUCCH repetitions may include each of the SBFD slots that accommodate the PUCCH time resources. In the example shown in FIGS. 21, the available slots include slots 2102*a*, 2102*b*, 2102*c*, 2102*e*, 2102*f*, 2102*g*, 2102*i*, 2102*j*, and 2102*k*. As further shown in FIG. 21, an inter-slot frequency hopping pattern 2110 is based on relative slot indices 2108 from the first PUCCH transmission. Similar to the example shown in FIG. 20B, in the example shown in FIG. 21, the relative slot index 2108 is determined based on slots of the same duplex type as the PUCCH resource.

In addition, as further shown in FIG. 21, DMRS bundling may be enabled with a TDW 2112 having a length of three slots. Thus, the frequency hopping pattern 2110 maintains the same hop for three slots before switching to the next hop based on the relative slot index. For example, slots 2102*a*, 2102*b*, and 2102*c* include the same first hop (h1), slots 2102*e*, 2102*f*, and 2102*g* include the same second hop (h2), and so on.

Figure 22:
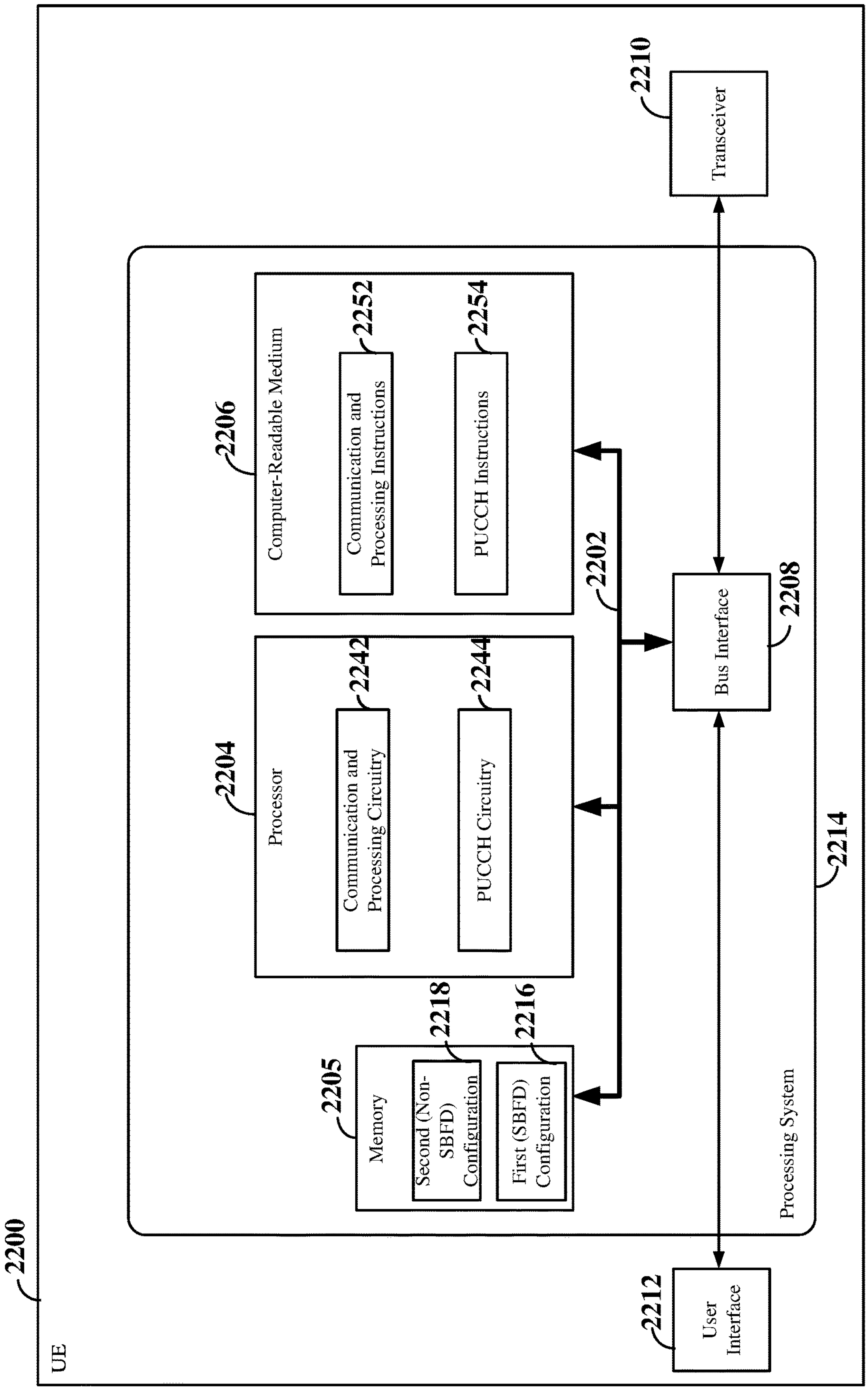
FIG. 22 is a block diagram illustrating an example of a hardware implementation for a UE employing a processing system according to some aspects.

FIG. 22 is a block diagram illustrating an example of a hardware implementation of a user equipment (UE) 2200 employing a processing system 2214 according to some aspects. For example, the UE 2200 may correspond to any of the UEs or other scheduled entities shown and described above in reference to FIGS. 1, 2, and/or 9.

In accordance with various aspects of the disclosure, an element, or any portion of an element, or any combination of elements may be implemented with a processing system 2214 that includes one or more processors, such as processor 2204. Examples of processors 2204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 2200 may be configured to perform any one or more of the functions described herein. That is, the processor 2204, as utilized in the UE 2200, may be used to implement any one or more of the methods or processes described and illustrated, for example, in FIGS. 9, 12, 14, 16, 19, and/or 23.

The processor 2204 may in some instances be implemented via a baseband or modem chip and in other implementations, the processor 2204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 2214 may be implemented with a bus architecture, represented generally by the bus 2202. The bus 2202 may include any number of interconnecting buses and bridges depending on the specific application of the processing system 2214 and the overall design constraints. The bus 2202 communicatively couples together various circuits, including one or more processors (represented generally by the processor 2204), a memory 2205, and computer-readable media (represented generally by the computer-readable medium 2206). The bus 2202 may also link various other circuits such as timing sources, peripherals, voltage regulators, and power management circuits, which are well known in the art, and therefore, are not described any further.

A bus interface 2208 provides an interface between the bus 2202, a transceiver 2210, and one or more antenna arrays 2230 (e.g., one or more antenna panels). The transceiver 2210 may be, for example, a wireless transceiver. The transceiver 2210 provides a means for communicating with various other apparatus over a transmission medium (e.g., air interface). The transceiver 2210 may further be coupled to the antenna array(s) for beamforming. The bus interface 2208 further provides an interface between the bus 2202 and a user interface 2212 (e.g., keypad, display, touch screen, speaker, microphone, control features, etc.). Of course, such a user interface 2212 may be omitted in some examples.

The computer-readable medium 2206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2206 may reside in the processing system 2214, external to the processing system 2214, or distributed across multiple entities including the processing system 2214. The computer-readable medium 2206 may be embodied in a computer program product. By way of example, a computer program product may include a computer-readable medium in packaging materials. In some examples, the computer-readable medium 2206 may be part of the memory 2205. Those skilled in the art will recognize how best to implement the described functionality presented throughout this disclosure depending on the particular application and the overall design constraints imposed on the overall system. In some examples, the computer-readable medium 2206 may be implemented on an article of manufacture, which may further include one or more other elements or circuits, such as the processor 2204 and/or memory 2205.

The computer-readable medium 2206 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 2204, may be responsible for managing the bus 2202 and general processing, including the execution of the software (e.g., instructions or computer-executable code) stored on the computer-readable medium 2206. The software, when executed by the processor 2204, causes the processing system 2214 to perform the various processes and functions described herein for any particular apparatus. The computer-readable medium 2206 and/or the memory 2205 may also be used for storing data that may be manipulated by the processor 2204 when executing software. For example, the memory 2205 may store one or more of a first (SBFD) configuration 2216 and a second (non-SBFD) configuration 2218.

In some aspects of the disclosure, the processor 2204 may include circuitry configured for various functions. For example, the processor 2204 may include communication and processing circuitry 2242 configured to communicate with one or more UEs and/or one or more network entities. In some examples, the communication and processing circuitry 2242 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 2242 may include one or more transmit/receive chains. The communication and processing circuitry 2242 may further be configured to execute communication and processing software 2252 stored on the computer-readable medium 2206 to implement one or more functions described herein.

In some implementations where the communication involves receiving information, the communication and processing circuitry 2242 may obtain information from a component of the UE 2200 (e.g., from the transceiver 2210 that receives the information via radio frequency signaling or some other type of signaling suitable for the applicable communication medium), process (e.g., decode) the information, and output the processed information. For example, the communication and processing circuitry 2242 may output the information to another component of the processor 2204, to the memory 2205, or to the bus interface 2208. In some examples, the communication and processing circuitry 2242 may receive one or more of signals, messages, other information, or any combination thereof. In some examples, the communication and processing circuitry 2242 may receive information via one or more channels. In some examples, the communication and processing circuitry 2242 may include functionality for a means for receiving. In some examples, the communication and processing circuitry 2242 may include functionality for a means for processing, including a means for demodulating, a means for decoding, etc.

In some implementations where the communication involves sending (e.g., transmitting) information, the communication and processing circuitry 2242 may obtain information (e.g., from another component of the processor 2204, the memory 2205, or the bus interface 2208), process (e.g., modulate, encode, etc.) the information, and output the processed information. For example, the communication and processing circuitry 2242 may output the information to the transceiver 2210 (e.g., that transmits the information via radio frequency signaling or some other type of signaling suitable for the applicable communication medium). In some examples, the communication and processing circuitry 2242 may send one or more of signals, messages, other information, or any combination thereof. In some examples, the communication and processing circuitry 2242 may send information via one or more channels. In some examples, the communication and processing circuitry 2242 may include functionality for a means for sending (e.g., a means for transmitting). In some examples, the communication and processing circuitry 2242 may include functionality for a means for generating, including a means for modulating, a means for encoding, etc.

The communication and processing circuitry 2242 may further be configured to receive, from a network entity, a first configuration of physical uplink control channel (PUCCH) for sub-band full duplex (SBFD) symbols. The SBFD symbols may include downlink (DL) or flexible (FL) symbols with a configured uplink (UL) sub-band. The communication and processing circuitry 2242 may further be configured to receive, from the network entity, a second configuration of PUCCH for non-SBFD symbols. The non-SBFD symbols may include UL symbols or flexible symbols configured for UL communication. The communication and processing circuitry 2242 may further be configured to execute communication and processing instructions (software) 2252 stored on the computer-readable medium 2206 to implement one or more of the functions described here.

The processor 2204 may further include PUCCH circuitry 2244, configured to implement duplex-specific PUCCH. The PUCCH circuitry 2244 may be configured to process and utilize the first (SBFD) configuration of PUCCH 2216 and the second (non-SBFD) configuration 2218 of PUCCH. For example, the PUCCH circuitry 2244 may be configured to store the first (SBFD) configuration 2216 and the second (non-SBFD) configuration 2218 within, for example, memory 2205. In some examples, the first configuration includes a first radio resource control (RRC) PUCCH configuration and the second configuration includes a second RRC PUCCH configuration separate from the first RRC configuration. The first RRC configuration includes one or more first PUCCH resource sets, each including one or more first PUCCH resources. The second RRC configuration includes one or more second PUCCH resource sets, each including one or more second PUCCH resources.

In other examples, the first configuration includes one or more first PUCCH resource sets within a radio resource control (RRC) PUCCH configuration, each including one or more first PUCCH resources, and the second configuration includes one or more second PUCCH resource sets within the same RRC configuration, each including one or more second PUCCH resources. The PUCCH circuitry 2244 may further be configured to select one of the first PUCCH resource set or the second PUCCH resource set based on a payload size of uplink control information (UCI) and a symbol type of a symbol within which to transmit the UCI.

In other examples, the first configuration includes a first group of one or more first PUCCH resources within a PUCCH resource set of a radio resource control (RRC) PUCCH configuration, and the second configuration includes a second group of one or more second PUCCH resources within the same PUCCH resource set of the RRC PUCCH configuration. In some examples, the PUCCH circuitry 2244 may further be configured to receive, via the communication and processing circuitry 2242 and transceiver 2210, downlink control information (DCI) including a PUCCH resource indicator (PRI) indicating a PUCCH resource of the one or more first PUCCH resources or the one or more second PUCCH resources for a PUCCH transmission carrying uplink control information (UCI). In some examples, the PUCCH circuitry 2244 may further be configured to receive, via the communication and processing circuitry 2242 and transceiver 2210, downlink control information (DCI) including a bit field identifying a target slot indicating a selected group of the first group and the second group, the DCI further including a PUCCH resource indicator (PRI) indicating a PUCCH resource of the selected group for a PUCCH transmission carrying uplink control information (UCI). In some examples, the PUCCH circuitry 2244 may further be configured to receive, via the communication and processing circuitry 2242 and transceiver 2210, downlink control information (DCI) scheduling an uplink control information (UCI) transmission from the UE to the network entity. In this example, the PUCCH circuitry 2244 may further be configured to identify a target slot indicating a selected group of the first group and the second group. The DCI may further include a PUCCH resource indicator (PRI) indicating a PUCCH resource of the selected group for a PUCCH transmission carrying the UCI.

In some examples, at least one of the first configuration or the second configuration is a semi-static configuration of a PUCCH resource and the PUCCH resource includes a periodic or semi-persistent PUCCH resource. In some examples, the PUCCH circuitry 2244 may further be configured to transmit, via the communication and processing circuitry 2242 and transceiver 2210, a first set of periodic or semi-persistent PUCCH transmissions falling within first symbols of a same duplex type as the PUCCH resource. In addition, the PUCCH circuitry 2244 may be configured to drop a second set of periodic or semi-persistent PUCCH transmissions falling within second symbols of a different duplex type as the PUCCH resource. In some examples, the PUCCH circuitry 2244 may further be configured to identify a set of symbols associated with the PUCCH resource based on the semi-static configuration. The set of symbols can include first symbols of a same duplex type as the PUCCH resource and exclude second symbols of a different duplex type as the PUCCH resource.

In some examples, at least one of the first configuration or the second configuration includes a PUCCH resource configured with repetition. In this example, the PUCCH circuitry 2244 may be configured to identify available slots for PUCCH repetitions associated with the PUCCH resource based on slots of a same duplex type as the PUCCH resource. In some examples, the PUCCH circuitry 2244 may be configured to transmit, via the communication and processing circuitry 2242 and transceiver 2210, a first set of repetitions of a PUCCH transmission falling within first symbols of a same duplex type as the PUCCH resource. In addition, the PUCCH circuitry 2244 may be configured to drop a second set of repetitions of the PUCCH transmission falling within second symbols of a different duplex type as the PUCCH resource.

In some examples, the PUCCH circuitry 2244 may be configured to identify available slots for PUCCH repetitions associated with the PUCCH resource based on slots of both a SBFD duplex type and a non-SBFD duplex type. In some examples, the PUCCH circuitry 2244 may be configured to identify a set of symbols within which repetitions of a PUCCH transmission configured based on the PUCCH resource are to be transmitted. The set of symbols can include first symbols of a same duplex type as the PUCCH resource and exclude second symbols of a different duplex type as the PUCCH resource.

In some examples, the PUCCH resource further includes a frequency hopping configuration. In some examples, a frequency hopping pattern of the frequency hopping configuration is based on relative slots with respect to a first available slot for a PUCCH transmission associated with the PUCCH resource. In some examples, the relative slots include slots of a same duplex type as the PUCCH resource. In other examples, the relative slots include sequential slots based on slot index regardless of a duplex type associated with each of the sequential slots.

In some examples, the frequency hopping configuration further includes demodulation reference signal (DMRS) bundling including a time domain window (TDW) length of two or more consecutive slots within which repetitions of a PUCCH transmission associated with the PUCCH resource are transmitted on a same set of frequencies. In some examples, the two or more consecutive slots include slots of a same duplex type as the PUCCH resource. In other examples, the two or more consecutive slots include a set of sequential slots based on slot index regardless of a duplex type associated with each of the sequential slots. In this example, the PUCCH circuitry 2244 may be configured to reset the TDW based on a duplex change to create an actual TDW spanning one or more of the set of consecutive slots of a same duplex type. The PUCCH circuitry 2244 may further be configured to execute PUCCH instructions (software) 2254 stored on the computer-readable medium 2206 to implement one or more functions described herein.

Figure 23:
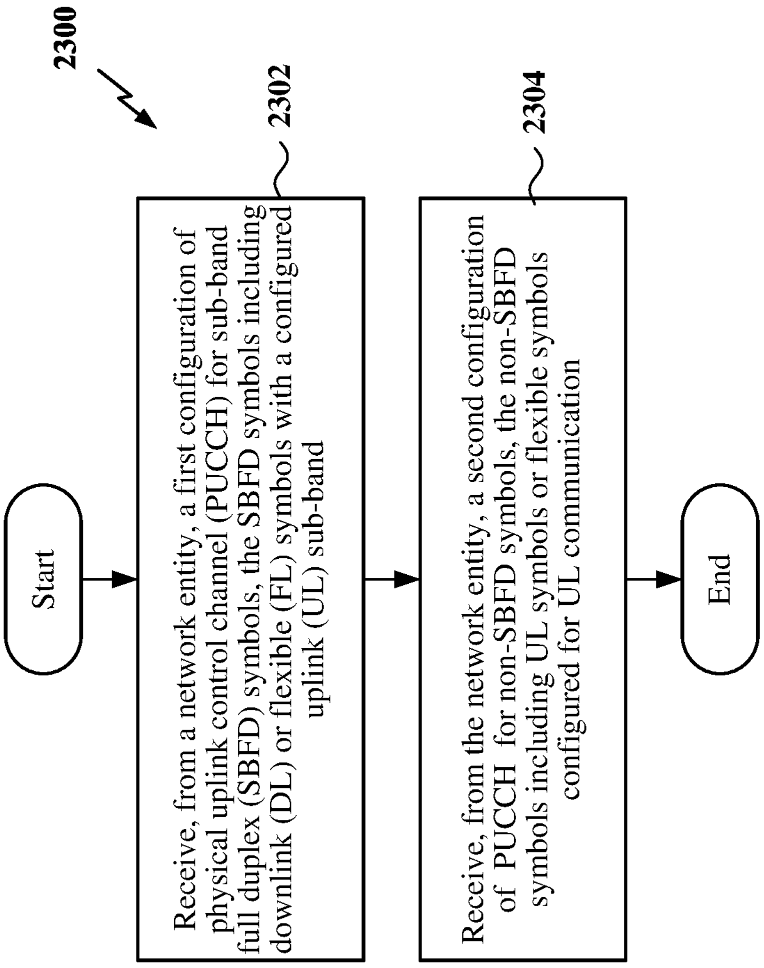
FIG. 23 is a flow chart of an exemplary process for duplex-specific PUCCH according to some aspects.

FIG. 23 is a flow chart illustrating an exemplary process 2300 for duplex-specific PUCCH according to some aspects. As described below, some or all illustrated features may be omitted in a particular implementation within the scope of the present disclosure, and some illustrated features may not be required for implementation of all embodiments. In some examples, the process 2300 may be carried out by the UE 2200 illustrated in FIG. 22. In some examples, the process 2300 may be carried out by any suitable apparatus or means for carrying out the functions or algorithm described below.

At block 2302, the UE may receive, from a network entity, a first configuration of physical uplink control channel (PUCCH) for sub-band full duplex (SBFD) symbols, the SBFD symbols including downlink (DL) or flexible (FL) symbols with a configured uplink (UL) sub-band. For example, the communication and processing circuitry 2242 together with the PUCCH circuitry 2244 and transceiver 2210, shown and described above in connection with FIG. 22 may provide a means to receive the first configuration.

At block 2304, the UE may receive, from the network entity, a second configuration of PUCCH for non-SBFD symbols, the non-SBFD symbols including UL symbols or flexible symbols configured for UL communication. For example, the communication and processing circuitry 2242, together with the PUCCH circuitry 2244 and transceiver 2210, shown and described above in connection with FIG. 22 may provide a means to receive the second configuration.

In some examples, the first configuration includes a first radio resource control (RRC) PUCCH configuration and the second configuration includes a second RRC PUCCH configuration separate from the first RRC configuration. The first RRC configuration includes one or more first PUCCH resource sets, each including one or more first PUCCH resources. The second RRC configuration includes one or more second PUCCH resource sets, each including one or more second PUCCH resources.

In other examples, the first configuration includes one or more first PUCCH resource sets within a radio resource control (RRC) PUCCH configuration, each including one or more first PUCCH resources, and the second configuration includes one or more second PUCCH resource sets within the same RRC configuration, each including one or more second PUCCH resources. The UE may further be configured to select one of the first PUCCH resource set or the second PUCCH resource set based on a payload size of uplink control information (UCI) and a symbol type of a symbol within which to transmit the UCI.

In other examples, the first configuration includes a first group of one or more first PUCCH resources within a PUCCH resource set of a radio resource control (RRC) PUCCH configuration, and the second configuration includes a second group of one or more second PUCCH resources within the same PUCCH resource set of the RRC PUCCH configuration. In some examples, the UE may further be configured to receive downlink control information (DCI) including a PUCCH resource indicator (PRI) indicating a PUCCH resource of the one or more first PUCCH resources or the one or more second PUCCH resources for a PUCCH transmission carrying uplink control information (UCI). In some examples, the UE may further be configured to receive downlink control information (DCI) including a bit field identifying a target slot indicating a selected group of the first group and the second group, the DCI further including a PUCCH resource indicator (PRI) indicating a PUCCH resource of the selected group for a PUCCH transmission carrying uplink control information (UCI). In some examples, the UE may further be configured to receive downlink control information (DCI) scheduling an uplink control information (UCI) transmission from the UE to the network entity. In this example, the UE may further be configured to identify a target slot indicating a selected group of the first group and the second group. The DCI may further include a PUCCH resource indicator (PRI) indicating a PUCCH resource of the selected group for a PUCCH transmission carrying the UCI.

In some examples, at least one of the first configuration or the second configuration is a semi-static configuration of a PUCCH resource and the PUCCH resource includes a periodic or semi-persistent PUCCH resource. In some examples, the UE may further be configured to transmit a first set of periodic or semi-persistent PUCCH transmissions falling within first symbols of a same duplex type as the PUCCH resource. In addition, the UE may be configured to drop a second set of periodic or semi-persistent PUCCH transmissions falling within second symbols of a different duplex type as the PUCCH resource. In some examples, the UE may further be configured to identify a set of symbols associated with the PUCCH resource based on the semi-static configuration. The set of symbols can include first symbols of a same duplex type as the PUCCH resource and exclude second symbols of a different duplex type as the PUCCH resource.

In some examples, at least one of the first configuration or the second configuration includes a PUCCH resource configured with repetition. In this example, the UE may be configured to identify available slots for PUCCH repetitions associated with the PUCCH resource from a group of slots of a same duplex type as the PUCCH resource. In some examples, the UE may be configured to transmit a first set of repetitions of a PUCCH transmission falling within first symbols of a same duplex type as the PUCCH resource. In addition, the UE may be configured to drop a second set of repetitions of the PUCCH transmission falling within second symbols of a different duplex type as the PUCCH resource.

In some examples, the UE may be configured to identify available slots for PUCCH repetitions associated with the PUCCH resource based on a set of slots of both a SBFD duplex type and a non-SBFD duplex type. In some examples, the UE may be configured to identify a set of symbols within which repetitions of a PUCCH transmission configured based on the PUCCH resource are to be transmitted. The set of symbols can include first symbols of a same duplex type as the PUCCH resource and exclude second symbols of a different duplex type as the PUCCH resource.

In some examples, the PUCCH resource further includes a frequency hopping configuration. In some examples, a frequency hopping pattern of the frequency hopping configuration is based on relative slots with respect to a first available slot for a PUCCH transmission associated with the PUCCH resource. In some examples, the relative slots include slots of a same duplex type as the PUCCH resource. In other examples, the relative slots include sequential slots based on slot index regardless of a duplex type associated with each of the sequential slots.

In some examples, the frequency hopping configuration further includes demodulation reference signal (DMRS) bundling including a time domain window (TDW) length of two or more consecutive slots within which repetitions of a PUCCH transmission associated with the PUCCH resource are transmitted on a same set of frequencies. In some examples, the two or more consecutive slots include slots of a same duplex type as the PUCCH resource. In other examples, the two or more consecutive slots include a set of sequential slots based on slot index regardless of a duplex type associated with each of the sequential slots. In this example, the UE may be configured to reset the TDW based on a duplex change to create an actual TDW spanning one or more of the set of consecutive slots of a same duplex type.

In one configuration, the UE includes means for receiving, from a network entity, a first configuration of physical uplink control channel (PUCCH) for sub-band full duplex (SBFD) symbols, the SBFD symbols comprising downlink (DL) or flexible (FL) symbols with a configured uplink (UL) sub-band, and means for receiving, from the network entity, a second configuration of PUCCH for non-SBFD symbols, the non-SBFD symbols comprising UL symbols or flexible symbols configured for UL communication. In one aspect, the aforementioned means may be the processor 2204 shown in FIG. 22 configured to perform the functions recited by the aforementioned means. In another aspect, the aforementioned means may be a circuit or any apparatus configured to perform the functions recited by the aforementioned means.

Of course, in the above examples, the circuitry included in the processor 2204 is merely provided as an example, and other means for carrying out the described functions may be included within various aspects of the present disclosure, including but not limited to the instructions stored in the computer-readable storage medium 2206, or any other suitable apparatus or means described in any one of the FIGS. 1, 2, 9, and/or 22, and utilizing, for example, the processes and/or algorithms described herein in relation to FIGS. 9, 12, 14, 16, 19, and/or 23.

Figure 24:
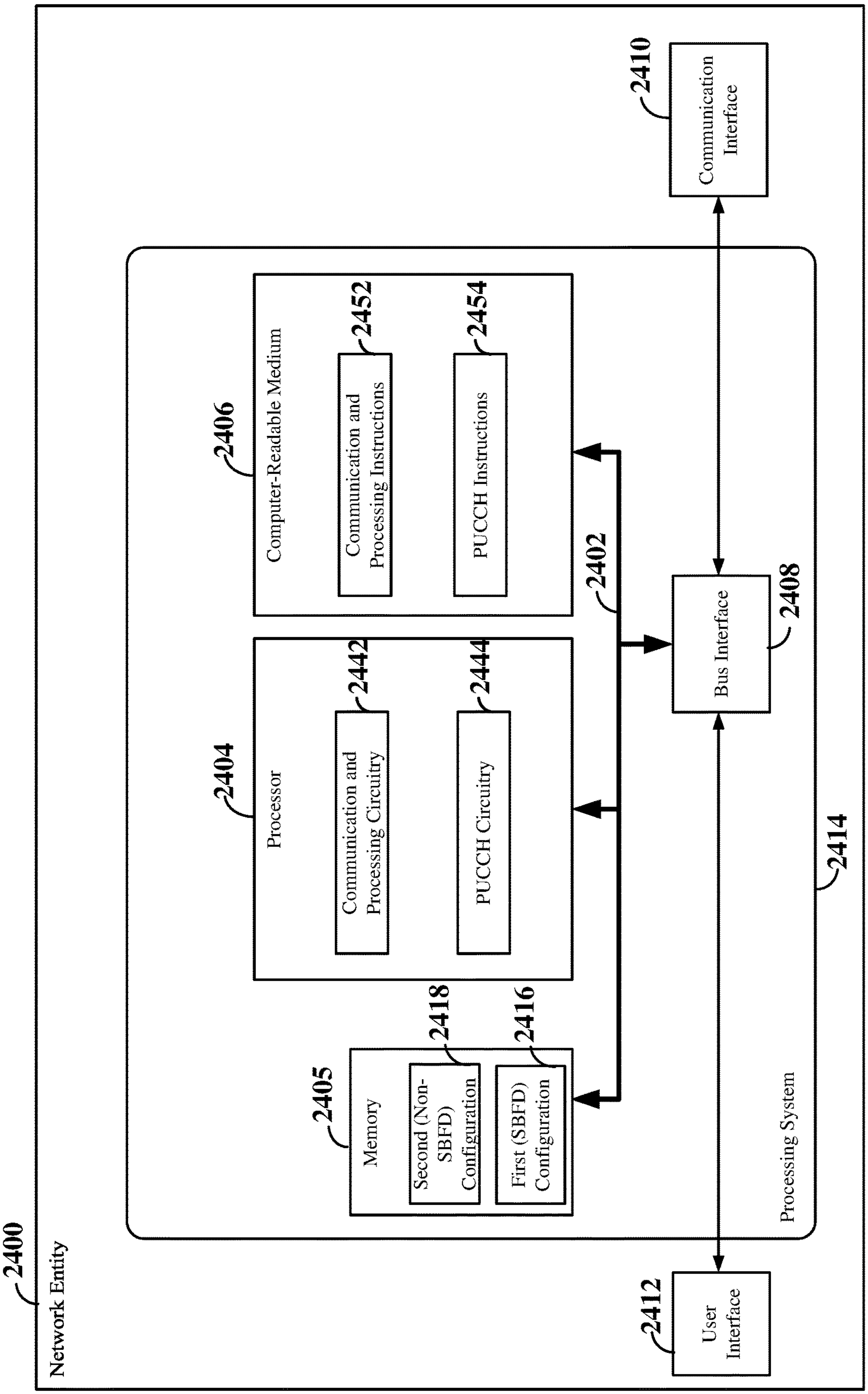
FIG. 24 is a block diagram illustrating an example of a hardware implementation for a network entity employing a processing system according to some aspects.

FIG. 24 is a block diagram illustrating an example of a hardware implementation of a network entity 2400 employing a processing system 2414 according to some aspects. The network entity 2400 may be, for example, any base station (e.g., gNB, eNB) or other scheduling entity as illustrated in any one or more of FIGS. 1, 2, and/or 9. The network entity 2400 may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In addition, the network entity 2400 may be a stationary network entity or a mobile network entity.

In accordance with various aspects of the disclosure, an element, or any portion of an element, or any combination of elements may be implemented with a processing system 2414 that includes one or more processors, such as processor 2404. Examples of processors 2404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 2400 may be configured to perform any one or more of the functions described herein. That is, the processor 2404, as utilized in the network entity 2400, may be used to implement any one or more of the methods or processes described and illustrated, for example, in FIGS. 9, 12, 14, 16, 19, and/or 25.

The processor 2404 may in some instances be implemented via a baseband or modem chip and in other implementations, the processor 2404 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 2414 may be implemented with a bus architecture, represented generally by the bus 2402. The bus 2402 may include any number of interconnecting buses and bridges depending on the specific application of the processing system 2414 and the overall design constraints. The bus 2402 communicatively couples together various circuits, including one or more processors (represented generally by the processor 2404), a memory 2405, and computer-readable media (represented generally by the computer-readable medium 2406). The bus 2402 may also link various other circuits such as timing sources, peripherals, voltage regulators, and power management circuits, which are well known in the art, and therefore, are not described any further.

A bus interface 2408 provides an interface between the bus 2402, a transceiver 2410, and one or more antenna arrays 2430 (e.g., one or more antenna panels). The transceiver 2410 may be, for example, a wireless transceiver. The transceiver 2410 provides a means for communicating with various other apparatus over a transmission medium (e.g., air interface). The transceiver 2410 may further be coupled to the antenna array(s) for beamforming. The bus interface 2408 further provides an interface between the bus 2402 and a user interface 2412 (e.g., keypad, display, touch screen, speaker, microphone, control features, etc.). Of course, such a user interface 2412 may be omitted in some examples.

The computer-readable medium 2406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2406 may reside in the processing system 2414, external to the processing system 2414, or distributed across multiple entities including the processing system 2414. The computer-readable medium 2406 may be embodied in a computer program product. By way of example, a computer program product may include a computer-readable medium in packaging materials. In some examples, the computer-readable medium 2406 may be part of the memory 2405. Those skilled in the art will recognize how best to implement the described functionality presented throughout this disclosure depending on the particular application and the overall design constraints imposed on the overall system. In some examples, the computer-readable medium 2406 may be implemented on an article of manufacture, which may further include one or more other elements or circuits, such as the processor 2404 and/or memory 2405.

The computer-readable medium 2406 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 2404, may be responsible for managing the bus 2402 and general processing, including the execution of the software (e.g., instructions or computer-executable code) stored on the computer-readable medium 2406. The software, when executed by the processor 2404, causes the processing system 2414 to perform the various processes and functions described herein for any particular apparatus. The computer-readable medium 2406 and/or the memory 2405 may also be used for storing data that may be manipulated by the processor 2404 when executing software. For example, the memory 2405 may store one or more of a first (SBFD) configuration 2416 and a second (non-SBFD) configuration 2418.

In some aspects of the disclosure, the processor 2404 may include circuitry configured for various functions. For example, the processor 2404 may include communication and processing circuitry 2442 configured to communicate with one or more UEs and/or one or more neighbor network entities. In addition, the communication and processing circuitry 2442 may be configured to communicate with a central network entity (e.g., CU, real-time or non-real-time intelligent controller or core network node) via a midhaul link and/or backhaul link. In some examples, the communication and processing circuitry 2442 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 2442 may include one or more transmit/receive chains. The communication and processing circuitry 2442 may further be configured to execute communication and processing software 2452 stored on the computer-readable medium 2406 to implement one or more functions described herein.

In some implementations where the communication involves receiving information, the communication and processing circuitry 2442 may obtain information from a component of the network entity 2400 (e.g., from the transceiver 2410 that receives the information via radio frequency signaling or some other type of signaling suitable for the applicable communication medium), process (e.g., decode) the information, and output the processed information. For example, the communication and processing circuitry 2442 may output the information to another component of the processor 2404, to the memory 2405, or to the bus interface 2408. In some examples, the communication and processing circuitry 2442 may receive one or more of signals, messages, other information, or any combination thereof. In some examples, the communication and processing circuitry 2442 may receive information via one or more channels. In some examples, the communication and processing circuitry 2442 may include functionality for a means for receiving. In some examples, the communication and processing circuitry 2442 may include functionality for a means for processing, including a means for demodulating, a means for decoding, etc.

In some implementations where the communication involves sending (e.g., transmitting) information, the communication and processing circuitry 2442 may obtain information (e.g., from another component of the processor 2404, the memory 2405, or the bus interface 2408), process (e.g., modulate, encode, etc.) the information, and output the processed information. For example, the communication and processing circuitry 2442 may output the information to the transceiver 2410 (e.g., that transmits the information via radio frequency signaling or some other type of signaling suitable for the applicable communication medium). In some examples, the communication and processing circuitry 2442 may send one or more of signals, messages, other information, or any combination thereof. In some examples, the communication and processing circuitry 2442 may send information via one or more channels. In some examples, the communication and processing circuitry 2442 may include functionality for a means for sending (e.g., a means for transmitting). In some examples, the communication and processing circuitry 2442 may include functionality for a means for generating, including a means for modulating, a means for encoding, etc.

The communication and processing circuitry 2442 may further be configured to provide a first configuration of physical uplink control channel (PUCCH) for sub-band full duplex (SBFD) symbols for a UE. The SBFD symbols may include downlink (DL) or flexible (FL) symbols with a configured uplink (UL) sub-band. The communication and processing circuitry 2442 may further be configured to provide a second configuration of PUCCH for non-SBFD symbols for a UE. The non-SBFD symbols may include UL symbols or flexible symbols configured for UL communication. The communication and processing circuitry 2442 may further be configured to execute communication and processing instructions (software) 2452 stored on the computer-readable medium 2406 to implement one or more of the functions described here.

The processor 2404 may further include PUCCH circuitry 2444, configured to implement duplex-specific PUCCH. The PUCCH circuitry 2444 may be configured to process and utilize the first (SBFD) configuration of PUCCH 2416 and the second (non-SBFD) configuration 2418 of PUCCH. For example, the PUCCH circuitry 2444 may be configured to store the first (SBFD) configuration 2416 and the second (non-SBFD) configuration 2418 within, for example, memory 2405. In some examples, the first configuration includes a first radio resource control (RRC) PUCCH configuration and the second configuration includes a second RRC PUCCH configuration separate from the first RRC configuration. The first RRC configuration includes one or more first PUCCH resource sets, each including one or more first PUCCH resources. The second RRC configuration includes one or more second PUCCH resource sets, each including one or more second PUCCH resources.

In other examples, the first configuration includes one or more first PUCCH resource sets within a radio resource control (RRC) PUCCH configuration, each including one or more first PUCCH resources, and the second configuration includes one or more second PUCCH resource sets within the same RRC configuration, each including one or more second PUCCH resources.

In other examples, the first configuration includes a first group of one or more first PUCCH resources within a PUCCH resource set of a radio resource control (RRC) PUCCH configuration, and the second configuration includes a second group of one or more second PUCCH resources within the same PUCCH resource set of the RRC PUCCH configuration. In some examples, the PUCCH circuitry 2444 may further be configured to provide, via the communication and processing circuitry 2442 and transceiver 2410, downlink control information (DCI) including a PUCCH resource indicator (PRI) indicating a PUCCH resource of the one or more first PUCCH resources or the one or more second PUCCH resources for a PUCCH transmission carrying uplink control information (UCI). In some examples, the PUCCH circuitry 2444 may further be configured to provide, via the communication and processing circuitry 2442 and transceiver 2410, downlink control information (DCI) including a bit field identifying a target slot indicating a selected group of the first group and the second group, the DCI further including a PUCCH resource indicator (PRI) indicating a PUCCH resource of the selected group for a PUCCH transmission carrying uplink control information (UCI). In some examples, the PUCCH circuitry 2444 may further be configured to provide, via the communication and processing circuitry 2442 and transceiver 2410, downlink control information (DCI) scheduling an uplink control information (UCI) transmission from the UE to the network entity. The DCI may further include a PUCCH resource indicator (PRI) indicating a PUCCH resource of a selected group of the first group and the second group for a PUCCH transmission carrying the UCI.

In some examples, at least one of the first configuration or the second configuration is a semi-static configuration of a PUCCH resource and the PUCCH resource includes a periodic or semi-persistent PUCCH resource. In some examples, the PUCCH circuitry 2444 may further be configured to receive, via the communication and processing circuitry 2442 and transceiver 2410, a first set of periodic or semi-persistent PUCCH transmissions falling within first symbols of a same duplex type as the PUCCH resource, the first set excluding a second set of periodic or semi-persistent PUCCH transmissions falling within second symbols of a different duplex type as the PUCCH resource. In some examples, the PUCCH circuitry 2444 may further be configured to identify a set of symbols associated with the PUCCH resource based on the semi-static configuration. The set of symbols can include first symbols of a same duplex type as the PUCCH resource and exclude second symbols of a different duplex type as the PUCCH resource.

In some examples, at least one of the first configuration or the second configuration includes a PUCCH resource configured with repetition. In this example, the PUCCH circuitry 2444 may be configured to identify available slots for PUCCH repetitions associated with the PUCCH resource based on slots of a same duplex type as the PUCCH resource. In some examples, the PUCCH circuitry 2444 may be configured to receive, via the communication and processing circuitry 2442 and transceiver 2410, a first set of repetitions of a PUCCH transmission falling within first symbols of a same duplex type as the PUCCH resource, the first set excluding a second set of repetitions of the PUCCH transmission falling within second symbols of a different duplex type as the PUCCH resource.

In some examples, the PUCCH circuitry 2444 may be configured to identify available slots for PUCCH repetitions associated with the PUCCH resource based on a set of slots of both a SBFD duplex type and a non-SBFD duplex type. In some examples, the PUCCH circuitry 2444 may be configured to identify a set of symbols within which repetitions of a PUCCH transmission configured based on the PUCCH resource are to be transmitted. The set of symbols can include first symbols of a same duplex type as the PUCCH resource and exclude second symbols of a different duplex type as the PUCCH resource.

In some examples, the PUCCH resource further includes a frequency hopping configuration. In some examples, a frequency hopping pattern of the frequency hopping configuration is based on relative slots with respect to a first available slot for a PUCCH transmission associated with the PUCCH resource. In some examples, the relative slots include slots of a same duplex type as the PUCCH resource. In other examples, the relative slots include sequential slots based on slot index regardless of a duplex type associated with each of the sequential slots.

In some examples, the frequency hopping configuration further includes demodulation reference signal (DMRS) bundling including a time domain window (TDW) length of two or more consecutive slots within which repetitions of a PUCCH transmission associated with the PUCCH resource are transmitted on a same set of frequencies. In some examples, the two or more consecutive slots include slots of a same duplex type as the PUCCH resource. In other examples, the two or more consecutive slots include a set of sequential slots based on slot index regardless of a duplex type associated with each of the sequential slots. In this example, the PUCCH circuitry 2444 may be configured to reset the TDW based on a duplex change to create an actual TDW spanning one or more of the set of consecutive slots of a same duplex type. The PUCCH circuitry 2444 may further be configured to execute PUCCH instructions (software) 2454 stored on the computer-readable medium 2406 to implement one or more functions described herein.

Figure 25:
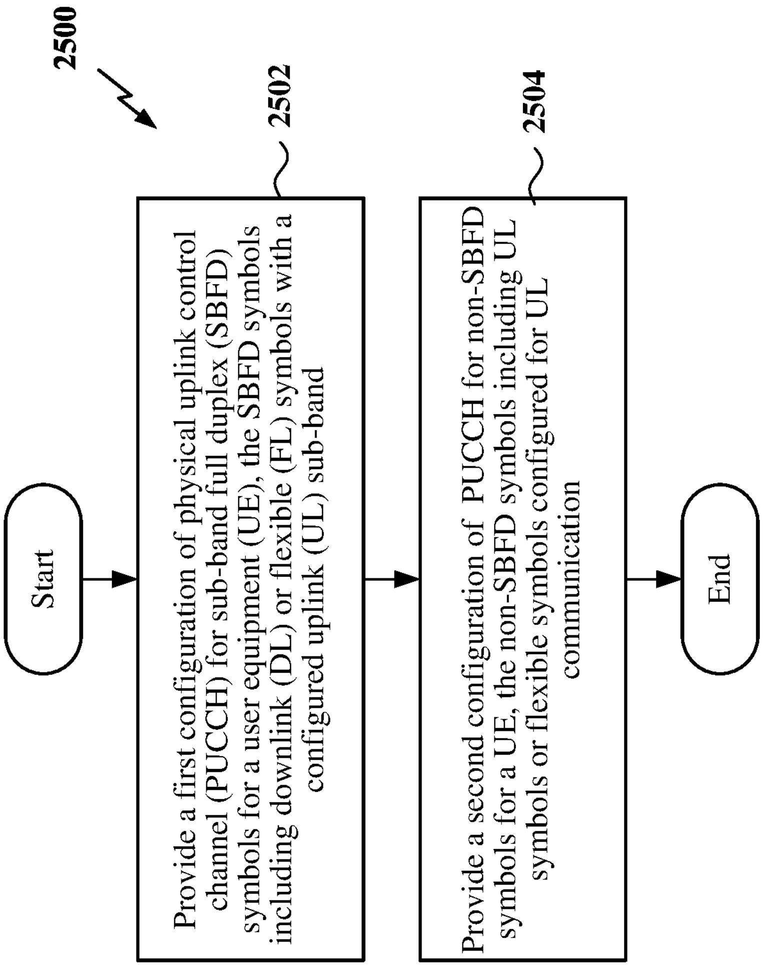
FIG. 25 is a flow chart of another exemplary process for duplex-specific PUCCH according to some aspects.

FIG. 25 is a flow chart illustrating another exemplary process 2500 for duplex-specific PUCCH according to some aspects. As described below, some or all illustrated features may be omitted in a particular implementation within the scope of the present disclosure, and some illustrated features may not be required for implementation of all embodiments. In some examples, the process 2500 may be carried out by the network entity 2400 illustrated in FIG. 24. In some examples, the process 2500 may be carried out by any suitable apparatus or means for carrying out the functions or algorithm described below.

At block 2502, the network entity may provide a first configuration of physical uplink control channel (PUCCH) for sub-band full duplex (SBFD) symbols for a user equipment (UE), the SBFD symbols including downlink (DL) or flexible (FL) symbols with a configured uplink (UL) sub-band. For example, the communication and processing circuitry 2442, together with the PUCCH circuitry 2244 and transceiver 2410 shown and described above in connection with FIG. 24 may provide a means to provide the first configuration.

At block 2504, the network entity may provide a second configuration of PUCCH for non-SBFD symbols for a UE, the non-SBFD symbols including UL symbols or flexible symbols configured for UL communication. For example, the communication and processing circuitry 2442, together with the PUCCH circuitry 2444 and transceiver 2410, shown and described above in connection with FIG. 24 may provide a means to provide the second configuration.

In some examples, the first configuration includes a first radio resource control (RRC) PUCCH configuration and the second configuration includes a second RRC PUCCH configuration separate from the first RRC configuration. The first RRC configuration includes one or more first PUCCH resource sets, each including one or more first PUCCH resources. The second RRC configuration includes one or more second PUCCH resource sets, each including one or more second PUCCH resources.

In other examples, the first configuration includes one or more first PUCCH resource sets within a radio resource control (RRC) PUCCH configuration, each including one or more first PUCCH resources, and the second configuration includes one or more second PUCCH resource sets within the same RRC configuration, each including one or more second PUCCH resources.

In other examples, the first configuration includes a first group of one or more first PUCCH resources within a PUCCH resource set of a radio resource control (RRC) PUCCH configuration, and the second configuration includes a second group of one or more second PUCCH resources within the same PUCCH resource set of the RRC PUCCH configuration. In some examples, the network entity may provide downlink control information (DCI) including a PUCCH resource indicator (PRI) indicating a PUCCH resource of the one or more first PUCCH resources or the one or more second PUCCH resources for a PUCCH transmission carrying uplink control information (UCI). In some examples, the network entity may further be configured to provide downlink control information (DCI) including a bit field identifying a target slot indicating a selected group of the first group and the second group, the DCI further including a PUCCH resource indicator (PRI) indicating a PUCCH resource of the selected group for a PUCCH transmission carrying uplink control information (UCI). In some examples, the network entity may further be configured to provide downlink control information (DCI) scheduling an uplink control information (UCI) transmission from the UE to the network entity. The DCI may further include a PUCCH resource indicator (PRI) indicating a PUCCH resource of a selected group of the first group and the second group for a PUCCH transmission carrying the UCI.

In some examples, at least one of the first configuration or the second configuration is a semi-static configuration of a PUCCH resource and the PUCCH resource includes a periodic or semi-persistent PUCCH resource. In some examples, the network entity may further be configured to receive a first set of periodic or semi-persistent PUCCH transmissions falling within first symbols of a same duplex type as the PUCCH resource, the first set excluding a second set of periodic or semi-persistent PUCCH transmissions falling within second symbols of a different duplex type as the PUCCH resource. In some examples, the network entity may further be configured to identify a set of symbols associated with the PUCCH resource based on the semi-static configuration. The set of symbols can include first symbols of a same duplex type as the PUCCH resource and exclude second symbols of a different duplex type as the PUCCH resource.

In some examples, at least one of the first configuration or the second configuration includes a PUCCH resource configured with repetition. In this example, the network entity may be configured to identify available slots for PUCCH repetitions associated with the PUCCH resource from a group of slots of a same duplex type as the PUCCH resource. In some examples, the network entity may be configured to receive a first set of repetitions of a PUCCH transmission falling within first symbols of a same duplex type as the PUCCH resource, the first set excluding a second set of repetitions of the PUCCH transmission falling within second symbols of a different duplex type as the PUCCH resource.

In some examples, the network entity may be configured to identify available slots for PUCCH repetitions associated with the PUCCH resource based on a set of slots of both a SBFD duplex type and a non-SBFD duplex type. In some examples, the network entity may be configured to identify a set of symbols within which repetitions of a PUCCH transmission configured based on the PUCCH resource are to be transmitted. The set of symbols can include first symbols of a same duplex type as the PUCCH resource and exclude second symbols of a different duplex type as the PUCCH resource.

In some examples, the PUCCH resource further includes a frequency hopping configuration. In some examples, a frequency hopping pattern of the frequency hopping configuration is based on relative slots with respect to a first available slot for a PUCCH transmission associated with the PUCCH resource. In some examples, the relative slots include slots of a same duplex type as the PUCCH resource. In other examples, the relative slots include sequential slots based on slot index regardless of a duplex type associated with each of the sequential slots.

In some examples, the frequency hopping configuration further includes demodulation reference signal (DMRS) bundling including a time domain window (TDW) length of two or more consecutive slots within which repetitions of a PUCCH transmission associated with the PUCCH resource are transmitted on a same set of frequencies. In some examples, the two or more consecutive slots include slots of a same duplex type as the PUCCH resource. In other examples, the two or more consecutive slots include a set of sequential slots based on slot index regardless of a duplex type associated with each of the sequential slots. In this example, the network entity may be configured to reset the TDW based on a duplex change to create an actual TDW spanning one or more of the set of consecutive slots of a same duplex type.

In one configuration, the network entity includes means for providing a first configuration of physical uplink control channel (PUCCH) for sub-band full duplex (SBFD) symbols for a user equipment (UE), the SBFD symbols including downlink (DL) or flexible (FL) symbols with a configured uplink (UL) sub-band, and means for providing a second configuration of PUCCH for non-SBFD symbols for a UE, the non-SBFD symbols including UL symbols or flexible symbols configured for UL communication. In one aspect, the aforementioned means may be the processor 2404 shown in FIG. 24 configured to perform the functions recited by the aforementioned means. In another aspect, the aforementioned means may be a circuit or any apparatus configured to perform the functions recited by the aforementioned means.

Of course, in the above examples, the circuitry included in the processor 2404 is merely provided as an example, and other means for carrying out the described functions may be included within various aspects of the present disclosure, including but not limited to the instructions stored in the computer-readable storage medium 2406, or any other suitable apparatus or means described in any one of the FIGS. 1, 2, and/or 9, and utilizing, for example, the processes and/or algorithms described herein in relation to FIGS. 9, 12, 14, 16, 19, and/or 25.

The following provides an overview of aspects of the present disclosure:

Aspect 1: A method operable at a user equipment (UE), the method comprising: receiving, from a network entity, a first configuration of physical uplink control channel (PUCCH) for sub-band full duplex (SBFD) symbols, the SBFD symbols comprising downlink (DL) or flexible (FL) symbols with a configured uplink (UL) sub-band; and receiving, from the network entity, a second configuration of PUCCH for non-SBFD symbols, the non-SBFD symbols comprising UL symbols or flexible symbols configured for UL communication.

Aspect 2: The method of aspect 1, wherein the first configuration comprises a first radio resource control (RRC) PUCCH configuration and the second configuration comprises a second RRC PUCCH configuration separate from the first RRC configuration, the first RRC configuration comprising one or more first PUCCH resource sets, each first PUCCH resource set comprising one or more first PUCCH resources, the second RRC configuration comprising one or more second PUCCH resource sets, each second PUCCH resource set comprising one or more second PUCCH resources.

Aspect 3: The method of aspect 1, wherein the first configuration comprises one or more first PUCCH resource sets within a radio resource control (RRC) PUCCH configuration, each first PUCCH resource set comprising one or more first PUCCH resources, and the second configuration comprises one or more second PUCCH resource sets within the same RRC configuration, each second PUCCH resource set comprising one or more second PUCCH resources.

Aspect 4: The method of aspect 3, further comprising: selecting one of the first PUCCH resource set or the second PUCCH resource set based on a payload size of uplink control information (UCI) and a symbol type of a symbol within which to transmit the UCI.

Aspect 5: The method of aspect 1, wherein the first configuration comprises a first group of one or more first PUCCH resources within a PUCCH resource set of a radio resource control (RRC) PUCCH configuration, and the second configuration comprises a second group of one or more second PUCCH resources within the same PUCCH resource set of the RRC PUCCH configuration.

Aspect 6: The method of aspect 5, further comprising: receiving downlink control information (DCI) comprising a PUCCH resource indicator (PRI) indicating a PUCCH resource of the one or more first PUCCH resources or the one or more second PUCCH resources for a PUCCH transmission carrying uplink control information (UCI).

Aspect 7: The method of aspect 5, further comprising: receiving downlink control information (DCI) comprising a bit field identifying a target slot indicating a selected group of the first group and the second group, the DCI further comprising a PUCCH resource indicator (PRI) indicating a PUCCH resource of the selected group for a PUCCH transmission carrying uplink control information (UCI).

Aspect 8: The method of aspect 5, further comprising: receiving downlink control information (DCI) scheduling an uplink control information (UCI) transmission from the UE to the network entity; and identifying a target slot indicating a selected group of the first group and the second group, the DCI further comprising a PUCCH resource indicator (PRI) indicating a PUCCH resource of the selected group for a PUCCH transmission carrying the UCI.

Aspect 9: The method of any of aspects 1 through 8, wherein at least one of the first configuration or the second configuration comprises a semi-static configuration of a PUCCH resource, the PUCCH resource comprising a periodic or semi-persistent PUCCH resource.

Aspect 10: The method of aspect 9, further comprising: transmitting a first set of periodic or semi-persistent PUCCH transmissions falling within first symbols of a same duplex type as the PUCCH resource; and dropping a second set of periodic or semi-persistent PUCCH transmissions falling within second symbols of a different duplex type as the PUCCH resource.

Aspect 11: The method of aspect 9, further comprising: identifying a set of symbols associated with the PUCCH resource based on the semi-static configuration, the set of symbols including first symbols of a same duplex type as the PUCCH resource and excluding second symbols of a different duplex type as the PUCCH resource.

Aspect 12: The method of any of aspects 1 through 11, wherein at least one of the first configuration or the second configuration comprises a PUCCH resource configured with repetition.

Aspect 13: The method of aspect 12, further comprising: identifying available slots for PUCCH repetitions associated with the PUCCH resource from a group of slots of a same duplex type as the PUCCH resource.

Aspect 14: The method of aspect 13, further comprising: transmitting a first set of repetitions of a PUCCH transmission falling within first symbols of a same duplex type as the PUCCH resource; and dropping a second set of repetitions of the PUCCH transmission falling within second symbols of a different duplex type as the PUCCH resource.

Aspect 15: The method of aspect 12, further comprising: identifying available slots for PUCCH repetitions associated with the PUCCH resource based on a set of slots of both a SBFD duplex type and a non-SBFD duplex type.

Aspect 16: The method of aspect 15, further comprising: identifying a set of symbols within which repetitions of a PUCCH transmission configured based on the PUCCH resource are to be transmitted, the set of symbols comprising first symbols of a same duplex type as the PUCCH resource and excluding second symbols of a different duplex type as the PUCCH resource.

Aspect 17: The method of any of aspects 12 through 16, wherein the PUCCH resource further comprises a frequency hopping configuration.

Aspect 18: The method of aspect 17, wherein a frequency hopping pattern of the frequency hopping configuration is based on relative slots with respect to a first available slot for a PUCCH transmission associated with the PUCCH resource.

Aspect 19: The method of aspect 18, wherein the relative slots comprise slots of a same duplex type as the PUCCH resource.

Aspect 20: The method of aspect 18, wherein the relative slots comprise sequential slots based on slot index regardless of a duplex type associated with each of the sequential slots.

Aspect 21: The method of any of aspects 17 through 20, wherein the frequency hopping configuration further comprises demodulation reference signal (DMRS) bundling comprising a time domain window (TDW) length of two or more consecutive slots within which repetitions of a PUCCH transmission associated with the PUCCH resource are transmitted on a same set of frequencies.

Aspect 22: The method of aspect 21, wherein the two or more consecutive slots comprise slots of a same duplex type as the PUCCH resource.

Aspect 23: The method of aspect 21, wherein the two or more consecutive slots comprise a set of sequential slots based on slot index regardless of a duplex type associated with each of the sequential slots, and further comprising: resetting the TDW based on a duplex change to create an actual TDW spanning one or more sequential slots of the set of sequential slots of a same duplex type.

Aspect 24: An apparatus for wireless communication at a user equipment (UE) comprising a memory and a processor coupled to the memory, the processor being configured to perform a method of any one of aspects 1 through 23.

Aspect 25: A UE comprising at least one means for performing a method of any one of aspects 1 through 23.

Aspect 26: A non-transitory computer-readable medium having stored therein instructions executable by one or more processors of a UE to perform a method of any one of aspects 1 through 23.

Aspect 27: A method operable at a network entity, the method comprising: providing a first configuration of physical uplink control channel (PUCCH) for sub-band full duplex (SBFD) symbols for a user equipment (UE), the SBFD symbols comprising downlink (DL) or flexible (FL) symbols with a configured uplink (UL) sub-band; and providing a second configuration of PUCCH for non-SBFD symbols for a UE, the non-SBFD symbols comprising UL symbols or flexible symbols configured for UL communication.

Aspect 28: The method of aspect 27, wherein the first configuration comprises a first radio resource control (RRC) PUCCH configuration and the second configuration comprises a second RRC PUCCH configuration separate from the first RRC configuration, the first RRC configuration comprising one or more first PUCCH resource sets, each first PUCCH resource set comprising one or more first PUCCH resources, the second RRC configuration comprising one or more second PUCCH resource sets, each second PUCCH resource set comprising one or more second PUCCH resources.

Aspect 29: The method of aspect 28, wherein the first configuration comprises one or more first PUCCH resource sets within a radio resource control (RRC) PUCCH configuration, each first PUCCH resource set comprising one or more first PUCCH resources, and the second configuration comprises one or more second PUCCH resource sets within the same RRC configuration, each second PUCCH resource set comprising one or more second PUCCH resources.

Aspect 30: The method of aspect 28, wherein the first configuration comprises a first group of one or more first PUCCH resources within a PUCCH resource set of a radio resource control (RRC) PUCCH configuration, and the second configuration comprises a second group of one or more second PUCCH resources within the same PUCCH resource set of the RRC PUCCH configuration.

Aspect 31: The method of aspect 30, further comprising: providing downlink control information (DCI) comprising a PUCCH resource indicator (PRI) indicating a PUCCH resource of the one or more first PUCCH resources or the one or more second PUCCH resources for a PUCCH transmission carrying uplink control information (UCI).

Aspect 32: The method of aspect 30, further comprising: providing downlink control information (DCI) comprising a bit field identifying a target slot indicating a selected group of the first group and the second group, the DCI further comprising a PUCCH resource indicator (PRI) indicating a PUCCH resource of the selected group for a PUCCH transmission carrying uplink control information (UCI).

Aspect 33: The method of aspect 30, further comprising: providing downlink control information (DCI) scheduling an uplink control information (UCI) transmission from the UE to the network entity, the DCI further comprising a PUCCH resource indicator (PRI) indicating a PUCCH resource of a selected group of the first group and the second group for a PUCCH transmission carrying the UCI.

Aspect 34: The method of any of aspects 27 through 33, wherein at least one of the first configuration or the second configuration comprises a semi-static configuration of a PUCCH resource, the PUCCH resource comprising a periodic or semi-persistent PUCCH resource.

Aspect 35: The method of aspect 34, further comprising: receiving a first set of periodic or semi-persistent PUCCH transmissions falling within first symbols of a same duplex type as the PUCCH resource, the first set excluding a second set of periodic or semi-persistent PUCCH transmissions falling within second symbols of a different duplex type as the PUCCH resource.

Aspect 36: The method of aspect 35, further comprising: identifying a set of symbols associated with the PUCCH resource based on the semi-static configuration, the set of symbols including first symbols of a same duplex type as the PUCCH resource and excluding second symbols of a different duplex type as the PUCCH resource.

Aspect 37: The method of any of aspects 27 through 36, wherein at least one of the first configuration or the second configuration comprises a PUCCH resource configured with repetition.

Aspect 38: The method of aspect 37, further comprising: identifying available slots for PUCCH repetitions associated with the PUCCH resource from a group of slots of a same duplex type as the PUCCH resource.

Aspect 39: The method of aspect 38, further comprising: receiving a first set of repetitions of a PUCCH transmission falling within first symbols of a same duplex type as the PUCCH resource, the first set excluding a second set of repetitions of the PUCCH transmission falling within second symbols of a different duplex type as the PUCCH resource.

Aspect 40: The method of aspect 37, further comprising: identifying available slots for PUCCH repetitions associated with the PUCCH resource based on a set of slots of both a SBFD duplex type and a non-SBFD duplex type.

Aspect 42: The method of aspect 40, further comprising: identifying a set of symbols within which repetitions of a PUCCH transmission configured based on the PUCCH resource are to be transmitted, the set of symbols comprising first symbols of a same duplex type as the PUCCH resource and excluding second symbols of a different duplex type as the PUCCH resource.

Aspect 43: The method of any of aspects 37 through 42, wherein the PUCCH resource further comprises a frequency hopping configuration.

Aspect 44: The method of aspect 43, wherein a frequency hopping pattern of the frequency hopping configuration is based on relative slots with respect to a first available slot for a PUCCH transmission associated with the PUCCH resource.

Aspect 45: The method of aspect 44, wherein the relative slots comprise slots of a same duplex type as the PUCCH resource.

Aspect 46: The method of aspect 44, wherein the relative slots comprise sequential slots based on slot index regardless of a duplex type associated with each of the sequential slots.

Aspect 47: The method of any of aspects 43 through 46, wherein the frequency hopping configuration further comprises demodulation reference signal (DMRS) bundling comprising a time domain window (TDW) length of two or more consecutive slots within which repetitions of a PUCCH transmission associated with the PUCCH resource are transmitted on a same set of frequencies.

Aspect 48: The method of aspect 47, wherein the two or more consecutive slots comprise slots of a same duplex type as the PUCCH resource.

Aspect 49: The method of aspect 47, wherein the two or more consecutive slots comprise a set of sequential slots based on slot index regardless of a duplex type associated with each of the sequential slots, and further comprising: resetting the TDW based on a duplex change to create an actual TDW spanning one or more sequential slots of the set of sequential slots of a same duplex type.

Aspect 50: An apparatus for wireless communication at a network entity comprising a memory and a processor coupled to the memory, the processor being configured to perform a method of any one of aspects 27 through 49.

Aspect 51: A network entity comprising at least one means for performing a method of any one of aspects 27 through 49.

Aspect 52: A non-transitory computer-readable medium having stored therein instructions executable by one or more processors of a network entity to perform a method of any one of aspects 27 through 49.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects.

For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 9, 22, and/or 24 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication at a user equipment (UE), the apparatus comprising:

one or more memories; and one or more processors coupled to the one or more memories, the one or more processors being configured to:

receive, from a network entity, a first configuration of physical uplink control channel (PUCCH) for sub-band full duplex (SBFD) symbols, the SBFD symbols comprising downlink (DL) or flexible (FL) symbols with a configured uplink (UL) sub-band;

receive, from the network entity, a second configuration of PUCCH for non-SBFD symbols, the non-SBFD symbols comprising UL symbols or flexible symbols configured for UL communication, wherein at least one of the first configuration or the second configuration comprises a semi-static configuration of a PUCCH resource, the PUCCH resource comprising a periodic or semi-persistent PUCCH resource;

transmit a first set of periodic or semi-persistent PUCCH transmissions falling within first symbols of a same duplex type as the PUCCH resource; and drop a second set of periodic or semi-persistent PUCCH transmissions falling within second symbols of a different duplex type as the PUCCH resource.

2. The apparatus of claim 1, wherein the first configuration comprises a first radio resource control (RRC) PUCCH configuration and the second configuration comprises a second RRC PUCCH configuration separate from the first RRC configuration, the first RRC configuration comprising one or more first PUCCH resource sets, each first PUCCH resource set comprising one or more first PUCCH resources, the second RRC configuration comprising one or more second PUCCH resource sets, each second PUCCH resource set comprising one or more second PUCCH resources.

3. The apparatus of claim 1, wherein the first configuration comprises one or more first PUCCH resource sets within a radio resource control (RRC) PUCCH configuration, each first PUCCH resource set comprising one or more first PUCCH resources, and the second configuration comprises one or more second PUCCH resource sets within the same RRC configuration, each second PUCCH resource set comprising one or more second PUCCH resources.

4. The apparatus of claim 3, wherein the one or more processors are further configured to:

select one of the first PUCCH resource set or the second PUCCH resource set based on a payload size of uplink control information (UCI) and a symbol type of a symbol within which to transmit the UCI.

5. The apparatus of claim 1, wherein the first configuration comprises a first group of one or more first PUCCH resources within a PUCCH resource set of a radio resource control (RRC) PUCCH configuration, and the second configuration comprises a second group of one or more second PUCCH resources within the same PUCCH resource set of the RRC PUCCH configuration.

6. The apparatus of claim 5, wherein the one or more processors are further configured to:

receive downlink control information (DCI) comprising a PUCCH resource indicator (PRI) indicating a selected PUCCH resource of the one or more first PUCCH resources or the one or more second PUCCH resources for a PUCCH transmission carrying uplink control information (UCI).

7. The apparatus of claim 5, wherein the one or more processors are further configured to:

receive downlink control information (DCI) comprising a bit field identifying a target slot indicating a selected group of the first group and the second group, the DCI further comprising a PUCCH resource indicator (PRI) indicating a selected PUCCH resource of the selected group for a PUCCH transmission carrying uplink control information (UCI).

8. The apparatus of claim 5, wherein the one or more processors are further configured to:

receive downlink control information (DCI) scheduling an uplink control information (UCI) transmission from the UE to the network entity; and identify a target slot indicating a selected group of the first group and the second group, the DCI further comprising a PUCCH resource indicator (PRI) indicating a selected PUCCH resource of the selected group for a PUCCH transmission carrying the UCI.

9. The apparatus of claim 1, wherein the one or more processors are further configured to:

identify a set of symbols associated with the PUCCH resource based on the semi-static configuration, the set of symbols including first symbols of a same duplex type as the PUCCH resource and excluding second symbols of a different duplex type as the PUCCH resource.

10. The apparatus of claim 1, wherein at least one of the first configuration or the second configuration comprises an additional PUCCH resource configured with repetition.

11. The apparatus of claim 10, wherein the one or more processors are further configured to:

identify available slots for PUCCH repetitions associated with the additional PUCCH resource from a group of slots of a same duplex type as the additional PUCCH resource.

12. The apparatus of claim 11, wherein the one or more processors are further configured to:

transmit a first set of repetitions of a PUCCH transmission falling within first symbols of a same duplex type as the additional PUCCH resource; and drop a second set of repetitions of the PUCCH transmission falling within second symbols of a different duplex type as the additional PUCCH resource.

13. The apparatus of claim 10, wherein the one or more processors are further configured to:

identify available slots for PUCCH repetitions associated with the additional PUCCH resource based on a set of slots of both a SBFD duplex type and a non-SBFD duplex type.

14. The apparatus of claim 13, wherein the one or more processors are further configured to:

identify a set of symbols within which repetitions of a PUCCH transmission configured based on the additional PUCCH resource are to be transmitted, the set of symbols comprising first symbols of a same duplex type as the additional PUCCH resource and excluding second symbols of a different duplex type as the additional PUCCH resource.

15. The apparatus of claim 10, wherein the additional PUCCH resource further comprises a frequency hopping configuration.

16. The apparatus of claim 15, wherein a frequency hopping pattern of the frequency hopping configuration is based on relative slots with respect to a first available slot for a PUCCH transmission associated with the additional PUCCH resource.

17. The apparatus of claim 16, wherein the relative slots comprise slots of a same duplex type as the additional PUCCH resource.

18. The apparatus of claim 16, wherein the relative slots comprise sequential slots based on slot index regardless of a duplex type associated with each of the sequential slots.

19. The apparatus of claim 15, wherein the frequency hopping configuration further comprises demodulation reference signal (DMRS) bundling comprising a time domain window (TDW) length of two or more consecutive slots within which repetitions of a PUCCH transmission associated with the additional PUCCH resource are transmitted on a same set of frequencies.

20. The apparatus of claim 19, wherein the two or more consecutive slots comprise slots of a same duplex type as the additional PUCCH resource.

21. The apparatus of claim 19, wherein the two or more consecutive slots comprise a set of sequential slots based on slot index regardless of a duplex type associated with each of the sequential slots, and wherein the one or more processors are further configured to:

reset the TDW based on a duplex change to create an actual TDW spanning one or more sequential slots of the set of sequential slots of a same duplex type.

22. The apparatus of claim 1, wherein the PUCCH resource is a SBFD PUCCH resource, and wherein the second symbols comprise non-SBFD symbols.

23. A method operable at a user equipment (UE), the method comprising:

receiving, from a network entity, a first configuration of physical uplink control channel (PUCCH) for sub-band full duplex (SBFD) symbols, the SBFD symbols comprising downlink (DL) or flexible (FL) symbols with a configured uplink (UL) sub-band;

receiving, from the network entity, a second configuration of PUCCH for non-SBFD symbols, the non-SBFD symbols comprising UL symbols or flexible symbols configured for UL communication, wherein at least one of the first configuration or the second configuration comprises a semi-static configuration of a PUCCH resource, the PUCCH resource comprising a periodic or semi-persistent PUCCH resource;

transmitting a first set of periodic or semi-persistent PUCCH transmissions falling within first symbols of a same duplex type as the PUCCH resource; and dropping a second set of periodic or semi-persistent PUCCH transmissions falling within second symbols of a different duplex type as the PUCCH resource.

24. The method of claim 23, wherein the first configuration comprises a first radio resource control (RRC) PUCCH configuration and the second configuration comprises a second RRC PUCCH configuration separate from the first RRC configuration, the first RRC configuration comprising one or more first PUCCH resource sets, each first PUCCH resource set comprising one or more first PUCCH resources, the second RRC configuration comprising one or more second PUCCH resource sets, each second PUCCH resource set comprising one or more second PUCCH resources.

25. The method of claim 23, wherein the first configuration comprises one or more first PUCCH resource sets within a radio resource control (RRC) PUCCH configuration, each first PUCCH resource set comprising one or more first PUCCH resources, and the second configuration comprises one or more second PUCCH resource sets within the same RRC configuration, each second PUCCH resource set comprising one or more second PUCCH resources.

26. The method of claim 25, further comprising:

selecting one of the first PUCCH resource set or the second PUCCH resource set based on a payload size of uplink control information (UCI) and a symbol type of a symbol within which to transmit the UCI.

27. The method of claim 23, wherein the first configuration comprises a first group of one or more first PUCCH resources within a PUCCH resource set of a radio resource control (RRC) PUCCH configuration, and the second configuration comprises a second group of one or more second PUCCH resources within the same PUCCH resource set of the RRC PUCCH configuration.

28. The method of claim 27, further comprising:

receiving downlink control information (DCI) scheduling an uplink control information (UCI) transmission from the UE to the network entity; and identifying a target slot indicating a selected group of the first group and the second group, the DCI further comprising a PUCCH resource indicator (PRI) indicating a selected PUCCH resource of the selected group for a PUCCH transmission carrying the UCI.

29. The method of claim 23, wherein the PUCCH resource is a SBFD PUCCH resource, and wherein the second symbols comprise non-SBFD symbols.

* * * * *